(12) United States Patent
Nagase

(10) Patent No.: US 12,181,578 B2
(45) Date of Patent: Dec. 31, 2024

(54) DISTANCE MEASUREMENT DEVICE, CAMERA, INSPECTION ADJUSTMENT DEVICE, DISTANCE MEASUREMENT DEVICE DRIVE ADJUSTMENT METHOD, AND DISTANCE MEASUREMENT DEVICE INSPECTION ADJUSTMENT METHOD

(71) Applicant: TOPPAN Holdings Inc., Tokyo (JP)

(72) Inventor: Masanori Nagase, Hamamatsu (JP)

(73) Assignee: TOPPAN Holdings Inc., Tokyo (JP)

( * ) Notice: Subject to any disclaimer, the term of this patent is extended or adjusted under 35 U.S.C. 154(b) by 1038 days.

(21) Appl. No.: 17/139,891

(22) Filed: Dec. 31, 2020

(65) Prior Publication Data

US 2021/0270968 A1  Sep. 2, 2021

Related U.S. Application Data

(63) Continuation of application No. PCT/JP2019/025216, filed on Jun. 25, 2019.

(30) Foreign Application Priority Data

Jul. 2, 2018  (JP) .................................. 2018-126347

(51) Int. Cl.
*G01S 17/18* (2020.01)
*G01S 7/4863* (2020.01)
(Continued)

(52) U.S. Cl.
CPC ............ *G01S 17/18* (2020.01); *G01S 7/4863* (2013.01); *G01S 7/497* (2013.01); *G01S 17/14* (2020.01); *G01S 17/26* (2020.01); *G01S 17/894* (2020.01)

(58) Field of Classification Search
CPC .... G01S 7/4861; G01S 7/4863; G01S 7/4865; G01S 7/497; G01S 17/10; G01S 17/14; (Continued)

(56) References Cited

U.S. PATENT DOCUMENTS 7,888,716 B2  2/2011  Ichikawa et al.
2006/0192938 A1*  8/2006  Kawahito ............. G01S 7/4863
356/5.03

(Continued)

FOREIGN PATENT DOCUMENTS

JP  2009-021316 A  1/2009
JP  2010-107448 A  5/2010
(Continued)

OTHER PUBLICATIONS

English Translation of Japanese Application No. 2017-167120A, retrieved on May 10, 2023, 28 pages.
(Continued)

*Primary Examiner* — Yuqing Xiao
*Assistant Examiner* — Benjamin Richard Hebert
(74) *Attorney, Agent, or Firm* — Polsinelli PC

(57) ABSTRACT

A range-measuring device encompasses a light emitter, a light-receiving region for receiving a reflected light of the pulsed light from the target, a driver for transmitting control signals to the light emitter and for transmitting transfer signals to distributing gates, providing offset periods in between on-periods of the transfer signals, distributing gates distribute signal charges to charge-accumulation regions, a range calculator configured to calculate ranges to the target, by using the signals transmitted from the charge-accumulation regions, and a control processor configured to generate control signals for controlling operations of the driver from calculated result delivered from the range calculator, and to transmit the control signals to the driver.

7 Claims, 28 Drawing Sheets

(51) Int. Cl.
  *G01S 7/497*   (2006.01)
  *G01S 17/14*   (2020.01)
  *G01S 17/26*   (2020.01)
  *G01S 17/894*  (2020.01)

(58) Field of Classification Search
  CPC ........ G01S 17/18; G01S 17/26; G01S 17/894; H04N 25/77
  See application file for complete search history.

(56) References Cited

U.S. PATENT DOCUMENTS

| | | | |
|---|---|---|---|
| 2009/0230437 A1* | 9/2009 | Kawahito | H01L 27/14603 257/E27.15 |
| 2009/0273770 A1* | 11/2009 | Bauhahn | G01S 17/10 356/5.01 |
| 2011/0090385 A1 | 4/2011 | Aoyama | |
| 2011/0304842 A1 | 12/2011 | Kao et al. | |
| 2012/0177252 A1 | 7/2012 | Korekado et al. | |
| 2013/0201167 A1* | 8/2013 | Oh | H04N 13/271 345/207 |
| 2014/0160459 A1* | 6/2014 | Huber | G01S 7/4865 356/5.01 |
| 2014/0225173 A1* | 8/2014 | Kim | H01L 27/14605 257/292 |
| 2016/0178734 A1 | 6/2016 | Kawamura et al. | |
| 2020/0412991 A1* | 12/2020 | Ishii | G01S 17/10 |

FOREIGN PATENT DOCUMENTS

| | | |
|---|---|---|
| JP | 2011-064498 A | 3/2011 |
| JP | 2017-167120 A | 9/2021 |
| WO | WO 2009/147862 A1 | 12/2009 |
| WO | WO 2014/207983 A1 | 12/2014 |
| WO | WO 2017/085916 A1 | 5/2017 |

OTHER PUBLICATIONS

Extended European Search Report mailed Mar. 9, 2022, 8 pages, for the corresponding European Patent Application No. 19831119.3.
Keita Yasutomi, et al., "A high-resolution time-of-flight range image sensor with a 3-tap lateral electric field charge modulator"; International Image sensor workshop (IISW) 2017, R24, pp. 254-257, Hiroshima-shi (Japan), May 31, 2017 (Additional) R24_IISW_proc_Yasutomi_2017 which was revised after the publication of the above reference. Both versions consists total of 8 pages.

* cited by examiner

DISTANCE MEASUREMENT DEVICE, CAMERA, INSPECTION ADJUSTMENT DEVICE, DISTANCE MEASUREMENT DEVICE DRIVE ADJUSTMENT METHOD, AND DISTANCE MEASUREMENT DEVICE INSPECTION ADJUSTMENT METHOD

CROSS REFERENCE TO RELATED APPLICATIONS AND INCORPORATION BY REFERENCE

This application is a continuation of International Application PCT/JP2019/025216, with an international filing date of Jun. 25, 2019, which claims benefit of priority under 35 USC 119 based on Japanese Patent Application No. 2018-126347 filed Jul. 2, 2018, the entire contents of which are incorporated by reference herein.

BACKGROUND OF THE INVENTION

1. Field of the Invention

The present invention relates to range-measuring elements, and range-measuring devices (range measurement devices) of 3D imaging devices or the like, and more particularly relates to a CMOS image sensor (CIS) or a range-measuring device using the pixel in the CIS, a camera including the range-measuring device, a test-and-adjusting apparatus of the range-measuring device, and a drive-adjusting method and a testing-and-adjusting method of the range-measuring device.

2. Description of the Related Art

In accordance with the driving method of solid-state imaging devices having conventional lock-in pixel, the on/off-periods of a plurality of charge-transfer gates arranged in a pixel are switched almost simultaneously. And, because directions to which charges shall be directed became uncertain at the timing of the switching, and therefore, the charges were not transferred through the desired appropriate charge-transfer gate, there was a problem that a precision was reduced. In view of the background problem, Non-Patent literature (YASUTOMI) discloses a method of driving a solid-state imaging device for achieving an accurate charge-distributing operation, by slightly shortening an on-period to avoid the almost simultaneous switching, when the on/off-periods are switched.

In a 3D TOF imaging device using the conventional lock-in pixel, there was no break or off-set period in on/off timing schedule. Thus, as the cycle time became longer, each of the on-periods of the plurality of charge-transfer gates became longer. On the contrary, as the cycle time became shorter, the on-periods of the plurality of charge-transfer gates became shorter. The technical problem is similar even in the invention described in YASUTOMI. Thus, as the cycle time became longer, the on-periods of the plurality of charge-transfer gates became longer, and as the charge-transfer gate became shorter, the on-period of the plurality of charge-transfer gates became shorter. Therefore, in the invention described in YASUTOMI, accurate and quick voltage-switching operations (on/off-switching operations) were required for charge-transfer gates by which the charge-distributing operations were performed. Hence, there were problems that the operational margin of the driving circuit in the 3D TOF imaging device was small, and that the designing and manufacturing of the 3D TOF imaging device become difficult by the invention described in YASUTOMI.

SUMMARY OF THE INVENTION

A first aspect of the present invention inheres in a range-measuring device encompassing (a) a light emitter for projecting a pulsed light to a target, (b) a light-receiving region for receiving a reflected light of the pulsed light from the target, (c) a plurality of charge-accumulation regions arranged around the light-receiving region, (d) a plurality of distributing gates for transferring to distribute signal charges in sequence to the plurality of charge-accumulation regions, the signal charges are photo-electrically converted in the light-receiving region, (e) a driver for transmitting control signals to the light emitter and for transmitting transfer signals in sequence to each of the plurality of distributing gates, the transfer signals transmitted to different distributing gates are provided at different timings, providing offset periods in between on-periods of the transfer signals transmitted to the different distributing gates, (f) a readout-amplifier for independently reading out each of the signal charges accumulated in the plurality of charge-accumulation regions, (g) a range calculator configured to calculate ranges to the target, by entering the signals transmitted from the readout-amplifier, and (h) a control processor configured to generate control signals for controlling operations of the driver from calculated result delivered from the range calculator, and to transmit the control signals to the driver. And, in the range-measuring device pertaining to the first aspect of the present invention, the control processor has a set-value judging-circuit configured to judge whether the drive-condition of the driver is correct, by comparing the calculated result delivered from the range calculator with a threshold, and, a time-setting logical-circuit configured to set light-projection time and repetitive-cycle time of the pulsed light, and to modify the light-projection time and the repetitive-cycle time using judged result of the set-value judging-circuit.

A second aspect of the present invention inheres in a camera encompassing (a) an imaging-optical tool, (b) a light emitter for projecting a pulsed light to a target, (c) a solid-state imaging device including, (d) a light-receiving region for receiving a reflected light of the pulsed light from the target through the imaging-optical tool, (e) a plurality of charge-accumulation regions arranged around the light-receiving region, (f) a plurality of distributing gates for transferring to distribute signal charges in sequence to the plurality of charge-accumulation regions, the signal charges are photo-electrically converted in the light-receiving region, (g) a driver for transmitting control signals to the light emitter and for transmitting transfer signals in sequence to each of the plurality of distributing gates, the transfer signals transmitted to different distributing gates are provided at different timings, providing offset periods in between on-periods of the transfer signals transmitted to the different distributing gates, and (h) a readout-amplifier for independently reading out each of the signal charges accumulated in the plurality of charge-accumulation regions, and (i) a control-unit including a range calculator configured to calculate ranges to the target, by controlling the imaging-optical tool, and by entering the signals transmitted from the readout-amplifier, and a control processor configured to generate control signals for controlling operations of the driver from a calculated result delivered from the range calculator, and to transmit the control signals to the driver.

In the camera pertaining to the second aspect of the present invention, the control processor has a set-value judging-circuit configured to judge whether the drive-condition of the driver is correct, by comparing the calculated result delivered from the range calculator with a threshold, and a time-setting logical-circuit configured to set light-projection time and repetitive-cycle time of the pulsed light, and to modify the light-projection time and the repetitive-cycle time using judged result of the set-value judging-circuit.

A third aspect of the present invention inheres in a test-and-adjusting apparatus for testing and adjusting a solid-state imaging device including a light-receiving region, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to the light emitter and transmitting transfer signals in sequence to each of the plurality of distributing gates, the transfer signals transmitted to different distributing gates are provided at different timings, providing offset periods in between on-periods of the transfer signals transmitted to the different distributing gates, and a readout-amplifier for independently reading out each of the signal charges accumulated in the plurality of charge-accumulation regions. In the third aspect of the present invention, the test-and-adjusting apparatus encompasses (a) a light emitter driven by the driver, configured to project a pulsed light to a target for entering a reflected light of the pulsed light from the target to the light-receiving region, (b) an output-difference calculator configured to calculate a difference between outputs delivered respectively from the readout-amplifiers, (c) an output-difference judging-circuit configured to compare a calculated result of the output difference with a threshold and to judge whether the output difference is correct, and (d) a time-setting logical-circuit configured to modify the on-periods of transfer signals to be applied to a particular distributing gate among the plurality of distributing gates, from judged result of the output-difference judging-circuit, and to transmit control signals to the driver, so that the driver can deliver the modified transfer signals.

A fourth of the present invention inheres in a drive-adjusting method of a range-measuring device including a light emitter for projecting a pulsed light to a target, a light-receiving region for receiving a reflected light of the pulsed light from the target, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to the light emitter and transmitting transfer signals in sequence to each of the plurality of distributing gates, the transfer signals transmitted to different distributing gates are provided at different timings, providing offset periods in between on-periods of the transfer signals transmitted to the different distributing gates, a readout-amplifier for independently reading out each of the signal charges accumulated in the plurality of charge-accumulation regions, and a range calculator for entering the control signals transmitted from the readout-amplifier and calculating ranges to the target. In the fourth of the present invention, the drive-adjusting method includes comparing a calculated result delivered from the range calculator with a threshold, and judging whether a drive-condition of the driver is correct, and setting a light-projection time and a repetitive-cycle time of the pulsed light and modifying the light-projection time and the repetitive-cycle time using a judging result of the set-value judging-circuit.

A fifth aspect of the present invention inheres in a test-and-adjustment method for testing and adjusting a solid-state imaging device including a light-receiving region, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to the light emitter and transmitting transfer signals in sequence to each of the plurality of distributing gates, the transfer signals transmitted to different distributing gates are provided at different timings, providing offset periods in between on-periods of the transfer signals transmitted to the different distributing gates, and a readout-amplifier for independently reading out each of the signal charges accumulated in the plurality of charge-accumulation regions. In the fifth aspect of the present invention, the test-and-adjusting method includes (a) projecting a pulsed light to a target, and driving the driver so that a reflected light of the pulsed light from the target is entered to the light-receiving region, (b) calculating a difference between outputs delivered respectively from the readout-amplifiers, (c) comparing a calculated result with a threshold and judging whether the difference is correct, and (d) modifying the on-periods of transfer signals to be applied to a particular distributing gate among the plurality of distributing gates, from the judged result, and transmitting control signals to the driver so that the modified transfer signals can be delivered.

DETAILED DESCRIPTION OF THE INVENTION

Figure 1:
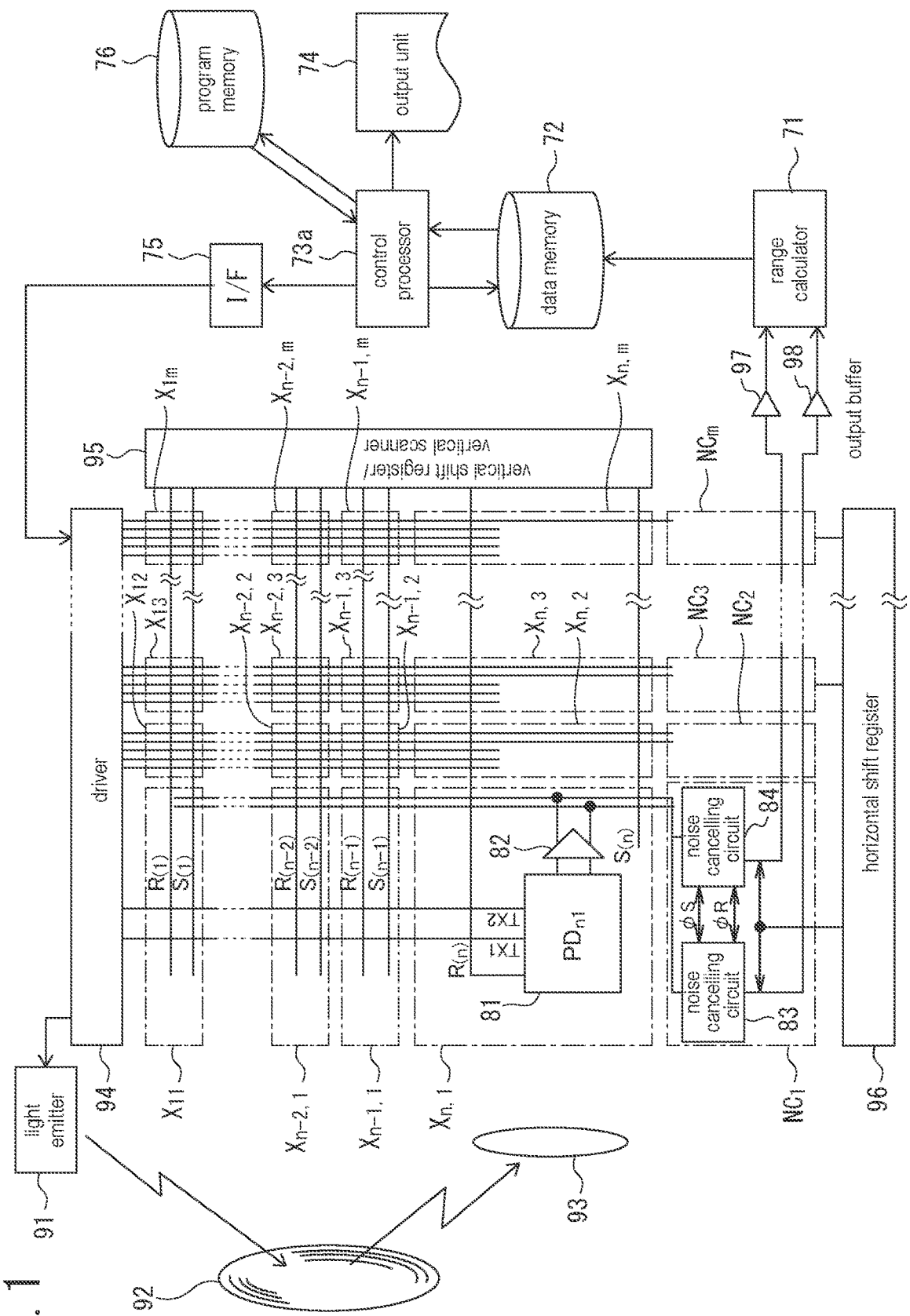
FIG. 1 is a schematic block diagram explaining an outline of a main portion of a range-measuring device pertaining to a first embodiment of the present invention.

Hereinafter, first to sixth embodiments of the present invention will be described with reference to the Drawings. Note that, in the following description of the Drawings, the same or similar reference numerals denote the same or similar elements and portions. In addition, it should be noted that the following first to sixth embodiments each illustrate a device or method embodying the technical ideas of the present invention. The technical ideas of the present invention are not intended to be limited to the following configurations or arrangement of circuit elements and circuit blocks, or alternatively, are not intended to be limited to the following layout on the semiconductor chips described below. Various modifications will be apparent to those skilled in the art within the technical ideas of the present invention.

Also, in the following explanations of the first to sixth embodiments of the present invention, a case when a first conductivity type is "a p-type" and a second conductivity type is "an n-type" is exemplified. However, by inversely selecting the conductivity type, the first conductivity type may be "the n-type", and the second conductivity type may be "the p-type". It is apparent to those skilled in the art that, when the conductivity type is inversely assigned, "the high-level" and "the low-level" shall be appropriately inversely elected, if necessary.

Figure 15:
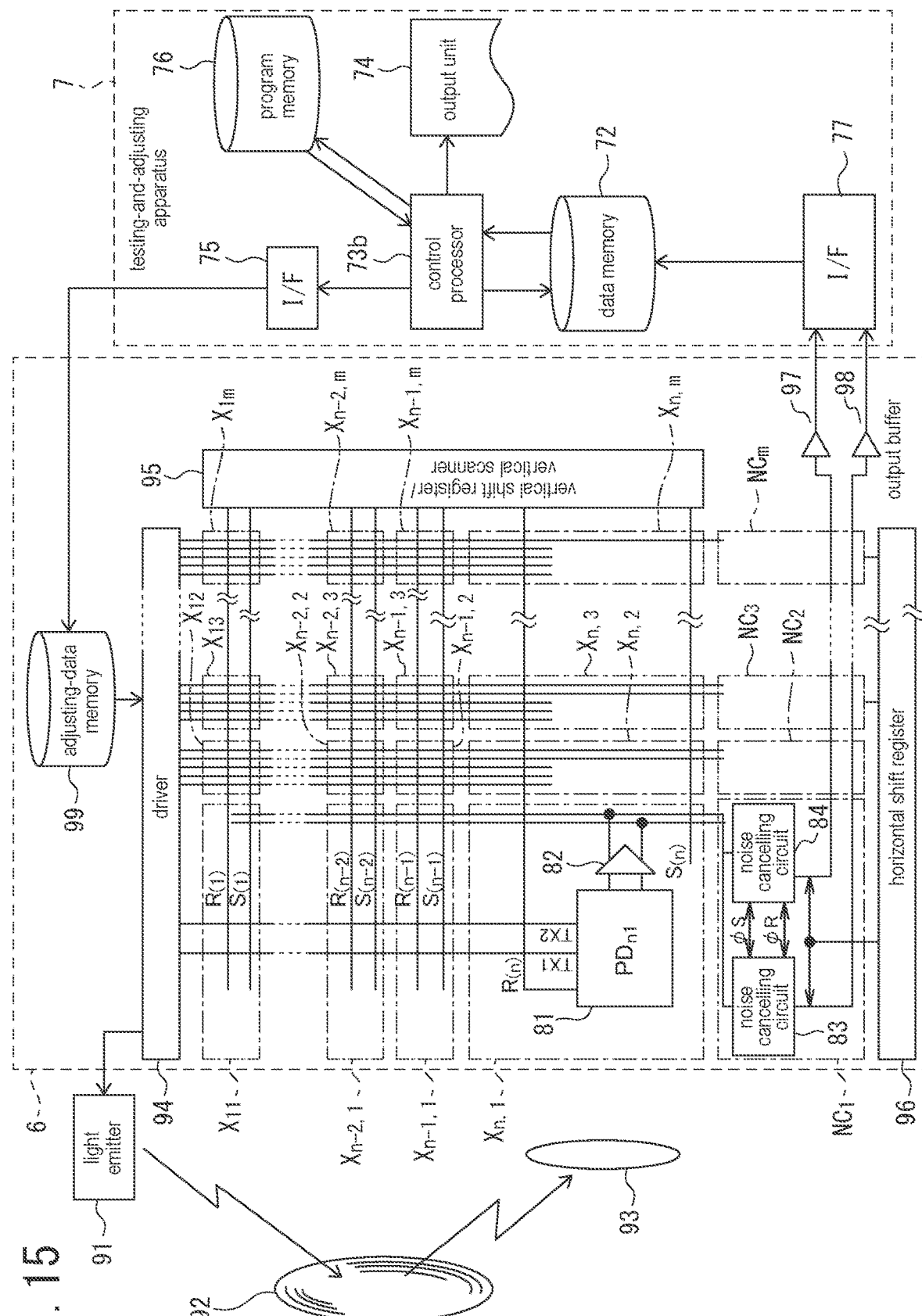
FIG. 15 is a schematic block diagram explaining outlines of a main portion of a range-measuring device pertaining to a fourth embodiment of the present invention and a main portion of a test-and-adjusting apparatus for testing and adjusting the range-measuring device.

For example, in the explanations of the following FIGS. 1 and 15, range-measuring devices based upon 3D imaging devices in which a plurality of pixels (range-measuring elements) is deployed in a pixel-array area so as to implement a two-dimensional matrix, for the sake of convenience, and such explanations do not limit the technical ideas of the present invention. For example, from the content of the above disclosure, it will be easily understood that, in an architecture for the two-dimensional matrix illustrated in FIGS. 1 and 15, a plurality of the pixels can be arrayed one-dimensionally to implement a line sensor. Furthermore, a range sensor having a simple structure, in which only a single range-measuring element is disposed in the pixel-array area, may be included in the technical scope of the present invention.

First Embodiment

As illustrated in FIG. 1, the feature of the range-measuring device pertaining to the first embodiment of the present invention lies in a 2D image sensor (3D imaging device) in which pixel-array area ($X_{11}$ to $X_{1m}$; $X_{21}$ to $X_{2m}$; --- ---; $X_{n1}$ to $X_{nm}$) and peripheral-circuit area (71 to 76, 94 to 96, $NC_1$ to $NC_m$) are merged on the same semiconductor chip. In the pixel-array area ($X_{11}$ to $X_{1m}$; $X_{21}$ to $X_{2m}$; --- ---; $X_{n1}$ to $X_{nm}$), many pixels $X_{ij}$ (i=1 to m; j=1 to n:m and n are positive integers of two or more, respectively) are arrayed in shape of 2D matrix and implement a rectangular imaging area.

And, a driver 94 is arranged in an upper side of the pixel-array area ($X_{11}$ to $X_{1m}$; $X_{21}$ to $X_{2m}$; --- ---; $X_{n1}$ to $X_{nm}$), and a horizontal shift register 96 is arranged in a lower side of the pixel-array area, and each of the driver 94 and the horizontal shift register 96 are arranged along pixel rows $X_{11}$ to $X_{1m}$; $X_{21}$ to $X_{2m}$; --- ----; $X_{n1}$ to $X_{nm}$ directions. Then, in a right side of the pixel-array area, a vertical shift register and vertical scanner 95 are arranged along pixel columns $X_{11}$ to $X_{n1}$; $X_{12}$ to $X_{n2}$; --- ---; $X_{ij}$ to $X_{nj;}$; --- ---; $X_{1m}$ to $X_{nm}$ directions. A light emitter 91 for projecting lights as repetitive pulse signals, the light emitter 91 is required for measuring ranges by each pixel $X_{ij}$ as the range-measuring element, is connected to the driver 94.

To the driver 94, control signals are transmitted for controlling the driver 94 from a control processor 73a through an interface (I/F) 75. A program memory 76 for storing a program to instruct operations of the control processor 73a, and a data memory 72 for storing data, threshold values and the like, which are necessary for logical calculations in the control processor 73a, are connected to the control processor 73a. To the control processor 73a, an output unit 74 is further connected for delivering results of the logical calculations in the control processor 73a. To the data memory 72, a range calculator 71 is connected for performing various calculating processes, which are required to generate a range image, after receiving output signals from the pixel-array area ($X_{11}$ to $X_{1m}$; $X_{21}$ to $X_{2m}$; --- ---; $X_{n1}$ to $X_{nm}$) through output buffers 97 and 98. By the way, although FIG. 1 schematically exemplifies an inner structure as a block diagram in the pixel $X_{n1}$, each pixel $X_{ij}$ includes a photoelectric-conversion transfer-element 81, which includes a photoelectric-conversion element and a signal-charge transfer-element, and a source-follower readout-amplifier 82 and the like.

The pixels $X_{ij}$ within the pixel-array area are sequentially scanned by the driver 94, the horizontal shift register 96 and the vertical shift register and vertical scanner 95, thereby the readout operations of pixel signals and electronic-shutter operations are performed. That is, in the range-measuring device pertaining to the first embodiment of the present invention, after the pixel-array area are scanned vertically at respective pixel rows $X_{11}$ to $X_{1m}$; $X_{21}$ to $X_{2m}$; --- ---; $X_{n1}$ to $X_{nm}$ in units, the pixel signals of the respective pixel rows $X_{11}$ to $X_{1m}$; $X_{21}$ to $X_{2m}$; --- ---; $X_{n1}$ to $X_{nm}$ are read out by vertical-output signal-lines assigned to the respective pixel columns $X_{11}$ to $X_{n1}$; $X_{12}$ to $X_{n2}$; --- ---; $X_{ij}$ to $X_{nj;}$; --- ---; $X_{1m}$ to $X_{nm}$. By the way, FIG. 1 illustrates the structure in which the range calculator 71, the interface 75, the control processor 73a, the program memory 76, the data memory 72 and the output unit 74 are merged in the same semiconductor chip. However, the structure illustrated in FIG. 1 is mere exemplification. The structure of the range-measuring device pertaining to the first embodiment is not limited to the topology and layout illustrated in FIG. 1. Thus, other configuration is allowed in which at least partial circuits and other elements of the range calculator 71, the interface 75, the control processor 73a, the program memory 76, the data memory 72 and the output unit 74 are assigned to different chips or substrates.

The signal readout operations from the respective pixels $X_{11}$ to $X_{1m}$; $X_{21}$ to $X_{2m}$; --- ---; $X_{n1}$ to $X_{nm}$ as the range-measuring elements are approximately similar to a known normal CMOS image sensor. However, the transfer signals TX1 and TX2 for transferring signal charges from respective photodiodes in the respective pixels $X_{11}$ to $X_{1m}$; $X_{21}$ to $X_{2m}$; --- ---; $X_{n1}$ to $X_{nm}$ are applied to all of the pixels $X_{11}$ to $X_{1m}$; $X_{21}$ to $X_{2m}$; --- ---; $X_{n1}$ to $X_{nm}$ from the driver 94 at the same time. Moreover, since the above transfer signals are the signals of high frequencies, switching noise is generated in the signal-readout periods. Thus, the signal readout operations from the pixel units are performed by preparing the signal-readout period after the completion of processes in the noise cancelling circuits $NC_1$ to $NC_m$.

Figure 2:
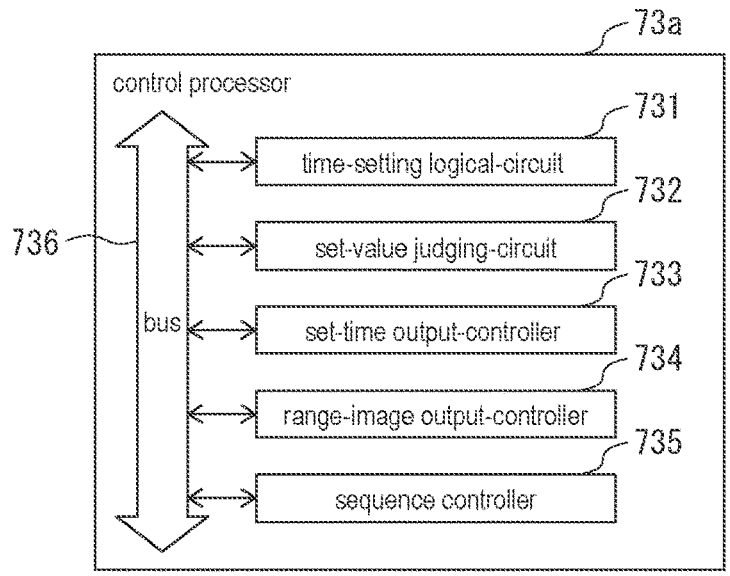
FIG. 2 is a logical block-diagram explaining an inner structure of a control processor included in a peripheral circuit of the range-measuring device pertaining to the first embodiment as a hardware resource.

As illustrated in the logical block-diagram in FIG. 2, the control processor 73a includes a time-setting logical-circuit 731, a set-value judging-circuit 732, a set-time output-controller 733, a range-image output-controller 734 and a sequence controller 735, as hardware resources. The time-setting logical-circuit 731 sets the values of a repetitive-cycle time $T_c$, a light-projection time $T_o$, a charge-accumulation time $T_a$ and a charge-transfer time $T_{on}$ and others, as illustrated in FIGS. 5 to 8 which will be described later. Or, the time-setting logical-circuit 731 is a logical circuit for properly modifying the values of the repetitive-cycle time $T_c$, the light-projection time $T_o$, the charge-accumulation time $T_a$ and the charge-transfer time $T_{on}$ and others, as illustrated in FIGS. 5 to 8 which will be described later, in response to output signals of the set-value judging-circuit 732. Then, the time-setting logical-circuit 731 performs specific time settings so that the transfer signals TX1 and TX2 applied to distributing gates have timings differ from each other, by providing an offset period in between the on-periods of the transfer signals TX1 and TX2, as illustrated in FIGS. 5 to 8.

The set-value judging-circuit 732 is a logical circuit for judging whether or not a detected value of a range calculated by the range calculator 71 is less than a threshold, which has been pre-stored in the data memory 72, and also judging whether or not the repetitive-cycle time $T_c$ is the minimum value, and then feeding the judged result to the time-setting logical-circuit 731 or range-image output-controller 734. The set-time output-controller 733 is a logical circuit in order that the repetitive-cycle time $T_c$, the light-projection time $T_o$, the charge-accumulation time $T_a$ and the charge-transfer time $T_{on}$ and others, which are set or modified by the time-setting logical-circuit 731, are provided as the control signals to the driver 94 through the interface 75. The periods of the charge-transfer times $T_o$, defined respectively as the pulse widths of the transfer signals TX1 and TX2 are respectively assigned to the time regimes (regions), which differ from each other, thereby providing the offset period in between on-periods of the transfer signals TX1 and TX2 as illustrated in FIGS. 5 to 8. The range-image output-controller 734 is a logical circuit for synthesizing the detected values of the distances calculated by the range calculator 71 as the data of range image, and the range-image output-controller 734 delivers the synthesized detected values to the output unit 74, if the set-value judging-circuit 732 judges that the detected value of the distance is equal to or more than the threshold.

The sequence controller 735 illustrated in FIG. 2 is a logical circuit for sequentially controlling the respective operations of the time-setting logical-circuit 731, the set-value judging-circuit 732, the set-time output-controller 733, the range-image output-controller 734, the interface 75, the program memory 76 and the data memory 72, on the basis of a clock signal. Each of the time-setting logical-circuit 731, the set-value judging-circuit 732, the set-time output-controller 733, the range-image output-controller 734 and the sequence controller 735 can transmit and receive information through a bus 736.

In a computer system illustrated in FIG. 1, the data memory can be organized by any combination of components that are properly selected from a group including a plurality of registers, a plurality of cache memories, a main memory (primary memory) and a secondary memory. Also, the cache memory may encompass a hierarchy implemented by a combination of a primary cache memory and a secondary cache memory. Moreover, the hierarchy of the cache memory may have a tertiary cache memory. Although illustration is omitted, in a case that the data memory 72 includes a plurality of registers, the bus 736 may be extended to the interface 75, the program memory 76 and the data memory 72 and others.

The control processor 73a illustrated in FIG. 2 can organize a computer system, by using microprocessors (MPUs) assembled as microchips and others. Also, as the control processor 73a implementing the computer system, a digital signal processor (DSP), which has an enhanced function of arithmetic calculation and is specialized and dedicated in signal processing, can be used. Furthermore, a micro controller, which includes memories and peripheral circuits, configured to control embedded devices can be used as the control processor 73a. Or, a main CPU in a current general-purpose computer system may be used for the control processor 73a.

Figure 31:
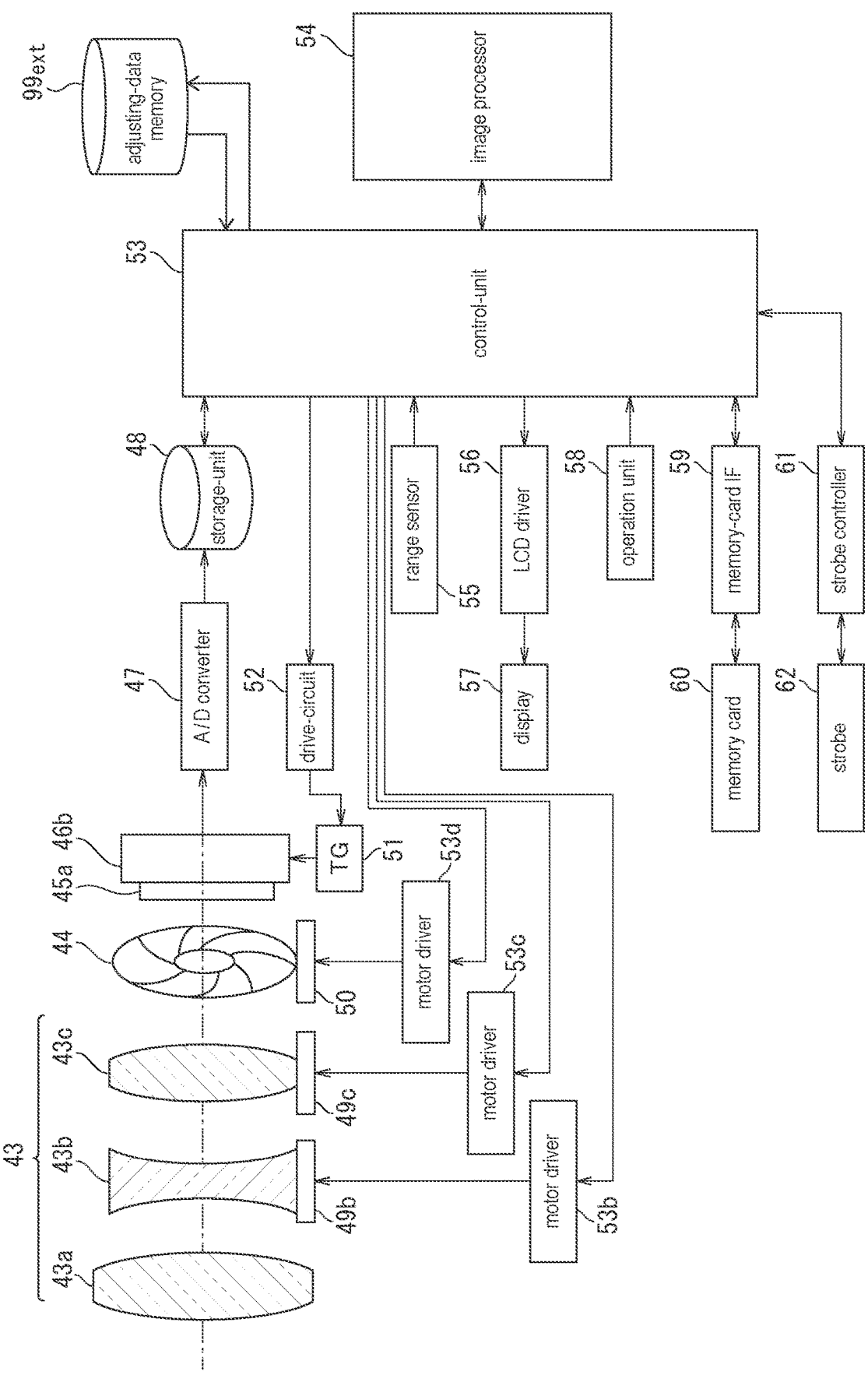
FIG. 31 is a block diagram explaining an outline of a structure of a camera, the camera is one example of the devices, for explain industrial applicability of the range-measuring devices pertaining to the first to sixth embodiments of the present invention.

For example, when a 3D imaging device 45a implementing the main portion of the range-measuring device pertaining to the first embodiment can be incorporated in a camera, which will be explained later as an application example, the control processor 73a, range calculator 71 and others illustrated in FIG. 1 may be merged in a chip-mounting substrate (package substrate) 46, on which a 3D imaging device 45a illustrated in FIG. 31 is assembled. Or alternatively, the control processor 73a, range calculator 71 and others illustrated in FIG. 1 may be assembled on the chip-mounting substrate 46 as part in any of a timing generator (TG) 51, a drive-circuit 52 and a control-unit 53 illustrated in FIG. 31. When the camera is assembled by the components illustrated in FIG. 31, a strobe 62 illustrated in FIG. 31 can serve as the light emitter 91 illustrated in FIG. 1.

Moreover, a partial configuration or whole configuration of the control processor 73a may be implemented by a programmable logical device (PLD) such as a field programmable gate array (FPGA). In a case that the part or whole of the control processor 73a is implemented by the PLD, the data memory 72 can embrace a memory component such as memory blocks included in a part of logical blocks implementing the PLD. Moreover, the control processor 73a may be structured by a configuration that arrays like CPU-cores and programmable cores like PLDs are merged in the same chip. Here, the arrays like CPU-cores may include hard macro-CPUs and soft macro-CPUs. The hard macro-CPUs are pre-embedded in the PLD, and the soft macro-CPUs are implemented by the logical blocks of the PLD. In short, a configuration, in which a software process and a hardware process are mixed inside the PLD, can be used as the part or whole of the control processor 73a.

Figure 3:
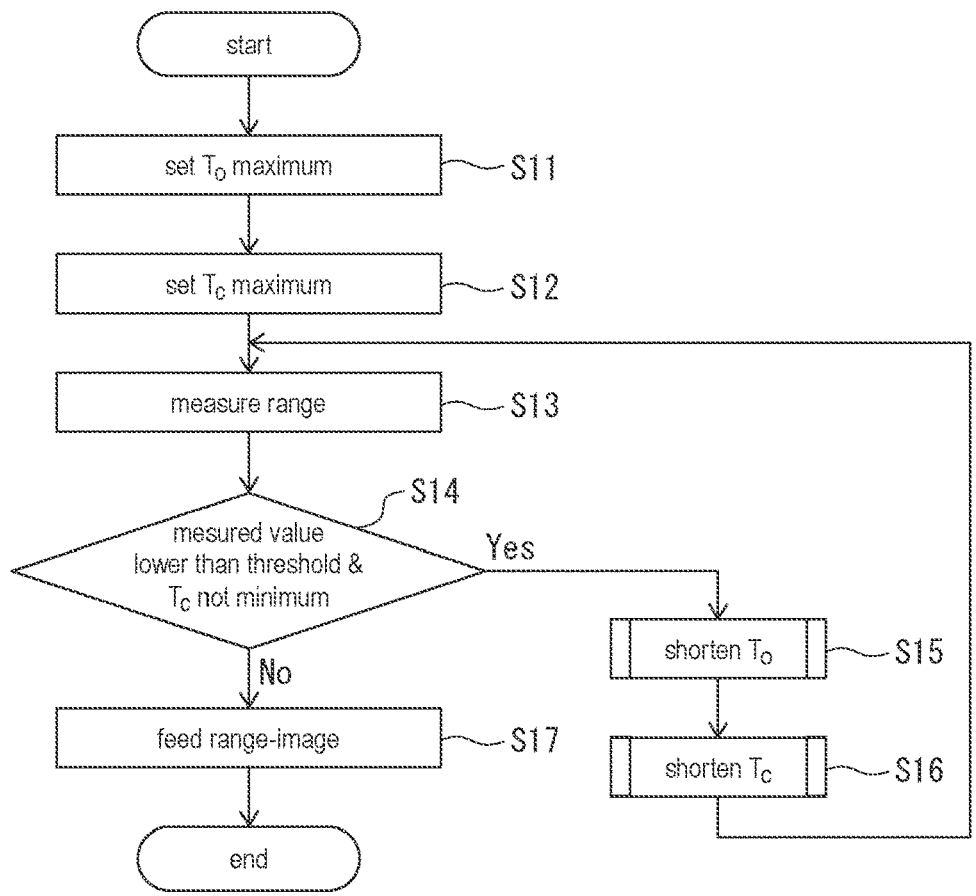
FIG. 3 is a flowchart explaining an outline of a flow of an adjusting operation by the peripheral circuit pertaining to the first embodiment, focusing to the operation of the control processor illustrated in FIG. 2.

The outline of the operation of the control processor 73a in the range-measuring device pertaining to the first embodiment illustrated in FIG. 2 can be explained along the procedure of the flow in the flowchart illustrated in FIG. 3. At Step S11 in FIG. 3, the time-setting logical-circuit 731 of the control processor 73a sets the light-projection time $T_o$ to a maximum value. Continuously, at Step S12, the time-setting logical-circuit sets the repetitive-cycle time $T_c$ to a maximum value. The set-time output-controller 733 feeds the set light-projection time $T_o$ and repetitive-cycle time $T_c$ as the control signal to the driver 94 through the interface 75 illustrated in FIG. 1. In response to the control signals transmitted via the driver 94 from the set-time output-controller 733 of the control processor 73a, pulsed light is emitted from the light emitter 91. In the pulsed light emission, for example, near-infrared laser diode (LD) or near-infrared LED is used. Pulsed light reflected by a target 92 is irradiated through a lens 93, band pass filter (BPF) or others to the pixel-array area ($X_{11}$ to $X_{1m}$; $X_{21}$ to $X_{2m}$; --- ---; $X_{n1}$ to $X_{nm}$) illustrated in FIG. 1.

At Step S13 in FIG. 3, the operations of the respective pixels $X_{ij}$ of the pixel-array area ($X_{11}$ to $X_{1m}$; $X_{21}$ to $X_{2m}$; --- ---; $X_{n1}$ to $X_{nm}$) are controlled by the driver 94. That is, at Step S13, electrons (photoelectrons) generated by the received-lights in respective pixels $X_{ij}$ are driven by the control signals transmitted via the driver 94 from the time-setting logical-circuit 731 of the control processor 73a, and the output signals from the pixel-array area ($X_{11}$ to $X_{1m}$; $X_{21}$ to $X_{2m}$; --- ---; $X_{n1}$ to $X_{nm}$) are transmitted through the output buffers 97 and 98 to the range calculator 71. Then, as illustrated in FIGS. 5 to 8, the transfer signals TX1 and TX2 are applied respectively at the timings differing from each other, providing the offset period in between the on-periods of the transfer signals TX1 and TX2. At Step S13, the range calculator 71 further sends the calculated result of distance calculation and the collateral information of the calculated result to the time-setting logical-circuit 731 of the control processor 73a. Here, "the collateral information" is, for example, output data obtained from a first charge-accumulation region 23a and a second charge-accumulation region 23b of each pixel $X_{ij}$, and the difference data between the output values of the first charge-accumulation region 23a and the second charge-accumulation region 23b of each pixel $X_{ij}$.

At Step S14 in FIG. 3, the set-value judging-circuit 732 of the control processor 73a judges whether a drive setting is correct, for the calculated result of the range and the collateral information of the calculated result which are fed from the range calculator 71. At Step S14, if the set-value judging-circuit 732 judges the value of the drive setting as "NO", the data is transmitted to the time-setting logical-circuit 731 of the control processor 73a. The time-setting logical-circuit 731 reduces the light-projection time $T_o$, at Step S15 in FIG. 3. Continuously, at Step S16, the time-setting logical-circuit 731 reduces the repetitive-cycle time $T_c$. The light-projection time $T_o$ and the repetitive-cycle time $T_c$ are reduced, and the control signals, in which drive-conditions are modified, are transmitted through the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$), and the range is measured at Step S13 in FIG. 3. After that, loops that return to Step S13 through Steps S13, S14, S15 and S16 are repeated until the set-value judging-circuit 732 judges the values of drive-settings as "OK" at Step S14. And, if the set-value judging-circuit 732 judges the values of drive-settings as "OK" at Step S17, the range-image output-controller 734 of the control processor 73a transfers the data to the output unit 74, and the output signals are delivered from the output unit 74.

Figure 4:
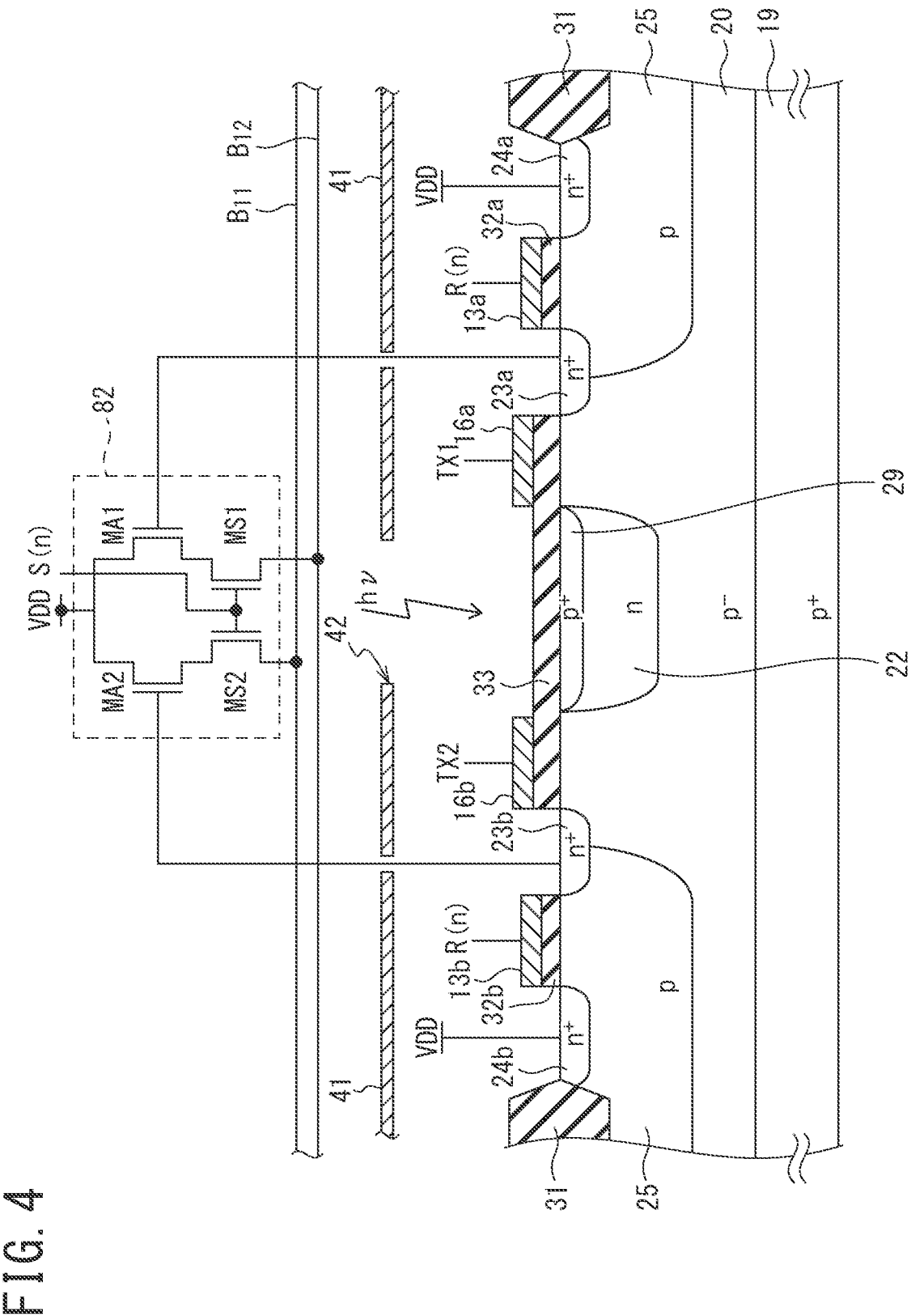
FIG. 4 is a cross-sectional view explaining one example of a structure focusing to a photoelectric-conversion transfer-unit of each pixel (range-measuring element) in the range-measuring device pertaining to the first embodiment.

Although illustration of a plan view is omitted, FIG. 4 illustrates one example of a cross-sectional structure of a portion serving as the photoelectric-conversion transfer-element 81 within each of the pixels $X_{11}$ to $X_{1m}$; $X_{21}$ to $X_{2m}$; --- ---; $X_{n1}$ to $X_{nm}$ of the range-measuring device pertaining to the first embodiment. A photoelectric-conversion element (range-measuring element) is provided in a light-receiving region illustrated in the center of FIG. 4, and a first charge-transfer gate 16a and a second charge-transfer gate 16b for alternately distributing (sorting) and transferring the signal charges, which are converted photo-electrically in the light-receiving region, are arranged on both sides of the light-receiving region. The light projected (irradiated) as a repetitive pulse signal from the light emitter 91 in FIG. 1 is reflected by the target 92 and entered to the light-receiving region through an opening 42 of a light shielding film 41 covering the periphery of the light-receiving region in FIG. 4. That is, the light-receiving region of the photoelectric-conversion element receives the pulsed light entered through the opening 42 of the light shielding film 41 as optical signals and converts the optical signals into the signal charges.

Moreover, a first charge-accumulation region 23a for accumulating the signal charges transferred by the first charge-transfer gate 16a is arranged as a floating drain region on the right side in FIG. 4. Similarly, a second charge-accumulation region 23b for accumulating the signal charges transferred by the second charge-transfer gate 16b is arranged as a floating drain region on the left side in FIG. 4. Moreover, a first reset-gate electrode 13a, adjacent to the first charge-accumulation region 23a, is arranged on the right side in FIG. 4. And, a first reset-drain region 24a which is opposite to the first charge-accumulation region 23a through the first reset-gate electrode 13a is arranged on the right side in FIG. 4.

On the other hand, a second reset-gate electrode 13b adjacent to the second charge-accumulation region 23b, and a second reset-drain region 24b which is opposite to the second charge-accumulation region 23b through the second reset-gate electrode 13b are arranged on the left side in FIG. 4. A MOS transistor (MOSFET) serving as a first reset transistor is built by the first charge-accumulation region 23a, the first reset-gate electrode 13a and the first reset-drain region 24a, and a MOS transistor serving as a second reset transistor is built by the second charge-accumulation region 23b, the second reset-gate electrode 13b and the second reset-drain region 24b. For all of the respective first reset-gate electrode 13a and second reset-gate electrode 13b, control signals R are set to a high (H) level, and the signal charges accumulated in the first charge-accumulation region 23a and the second charge-accumulation region 23b are exhausted to the first reset-drain region 24a and the second reset-drain region 24b, respectively, and the first charge-accumulation region 23a and the second charge-accumulation region 23b are reset respectively.

As illustrated in FIG. 4, according to the pixel (range-measuring element) pertaining to the first embodiment, the signal charges generated in the pixel as the photoelectric-conversion element are transferred to directions opposite to each other (left-right direction), such that respective central lines (whose illustrations are omitted) of the first charge-transfer gate and the second charge-transfer gate are arranged on the same straight line on a planar surface pattern. And, each width of the first charge-transfer gate 16a and the second charge-transfer gate 16b, along a direction orthogonal to the transfer direction of the signal charges (in a front-rear direction in FIG. 4), is designed to be narrower than a width of the light-receiving region along the orthogonal direction. Thus, even if an area of the light-receiving portion just under the light-receiving region is made larger, the signal charges can be perfectly transferred by the first charge-transfer gate 16a and the second charge-transfer gate 16b.

The cross-sectional structure of the pixel illustrated in FIG. 4 exemplifies a semiconductor substrate 19 made of silicon (Si) having a first conductive type (p-type), a functional-substrate layer 20 made of a semiconductor layer (epitaxial growth layer) of p-type arranged on the semiconductor substrate 19, a surface-buried region 22 of the second conductive type (n-type) arranged on the functional-substrate layer 20, and a pinning layer 29 of $p^+$ type provided in contact with the surface of the surface-buried region 22. A gate insulating film 33 at a position included in the light-receiving region in the center, the surface-buried region 22, the functional-substrate layer 20 and the semiconductor substrate 19 implement the main portion of the physical and essential structure of the photoelectric-conversion element. A part of the functional-substrate layer of p-type located in the light-receiving region serves as the signal-charge generation-region of the photoelectric-conversion element. Carriers (electrons) generated in the signal-charge generation-region are injected into a part of the surface-buried region 22 just on the signal-charge generation-region. The light-receiving-portion providing-region (29, 22) composed of the surface-buried region 22 and pinning layer 29 illustrated in FIG. 4 is located at the center of the main portion of the photoelectric-conversion transfer-element 81 illustrated in FIG. 1.

The gate insulating-film 33 extends from just under the light-receiving region to under the first charge-transfer gate 16a and the second charge-transfer gate 16b of the right and left sides, respectively. Under the gate insulating-film 33, the surface-buried region 22 is arranged to extend in left-right direction from just under the light-receiving region to under the left end of the first charge-transfer gate 16a and the right end of the second charge-transfer gate 16b. That is, the region on the surface side of the functional-substrate layer 20 adjacent to the right side of the surface-buried region 22 located in the light-receiving region services as a first transfer channel. On the other hand, the region on the surface side of the functional-substrate layer 20 adjacent to the left side of the surface-buried region 22 located in the light-receiving region services as a second transfer channel. And, the first charge-transfer gate 16a and the second charge-transfer gate 16b statically control the potentials of the first and second transfer channels through the gate insulating-films 33 respectively assigned in the upper portions of those first and second transfer channels. With the electrostatic control, the signal charges are transferred to the first charge-accumulation region 23a and the second charge-accumulation region 23b of n-type through the first and second transfer channels, alternately and respectively. Each of the first charge-accumulation region 23a and the second charge-accumulation region 23b is the semiconductor region having a higher impurity concentration than the surface-buried region 22.

As illustrated in FIG. 4, a gate electrode of a signal readout transistor (amplifying transistor) MA1 implementing the source-follower readout-amplifier 82 is connected to the first charge-accumulation region 23a, and a gate electrode of a signal readout transistor (amplifying transistor) MA2 of the readout-amplifier 82 is connected to the second charge-accumulation region 23b. A drain electrode of the signal readout transistor (amplifying transistor) MA 1 is connected to a power supply VDD, and a source electrode is connected to a drain electrode of a switching transistor MS1 for pixel selection. A source electrode of the switching transistor MS1 for pixel selection is connected to a first vertical-output signal-line (right vertical-output signal-line) $B_{12}$, and to a gate electrode, a horizontal line selection-control signal S is applied from a vertical shift register and a vertical scanner 95.

A drain electrode of a signal readout transistor (amplifying transistor) MA 2 is connected to the power supply VDD, and a source electrode is connected to a drain electrode of a switching transistor MS2 for pixel selection. The source electrode of the switching transistor MS2 for pixel selection is connected to a second vertical-output signal-line (left vertical-output signal-line) $B_{11}$, and to a gate electrode, the horizontal line selection-control signal S is applied from the vertical shift register and the vertical scanner 95. By setting the selection-control signal S to the high level, the switching transistors MS1 and MS2 are turned on. And then, the first vertical-output signal-line $B_{12}$ and the second vertical-output signal-line $B_{11}$ will have the potentials corresponding to the potentials of the first charge-accumulation region 23a and the second charge-accumulation region 23b. The potentials of the first charge-accumulation region 23a and the second charge-accumulation region 23b are amplified by the signal readout transistors (amplifying transistors) MA1 and MA2, respectively.

An impurity concentration of the functional-substrate layer 20 serving as the signal-charge generation-region is lower than the impurity concentration of the semiconductor substrate 19. That is, the semiconductor substrate 19 is preferred to have an impurity concentration of about $4 \times 10^{17}$ $cm^{-3}$ or more and about $1 \times 10^{21}$ $cm^{-3}$ or less, and the functional-substrate layer 20 serving as the signal-charge generation-region is preferred to have an impurity concentration of about $6 \times 10^{11}$ $cm^{-3}$ or more and about $2 \times 10^{15}$ $cm^{-3}$ or less.

In particular, when the semiconductor substrate 19 is assumed to be a silicon substrate having the impurity concentration of about $4 \times 10^{17}$ $cm^{-3}$ or more and about $1 \times 10^{21}$ $cm^{-3}$ or less and the functional-substrate layer 20 is assumed to be a silicon epitaxial growth layer having the impurity concentration of about $6 \times 10^{11}$ $cm^{-3}$ or more and about $2 \times 10^{15}$ $cm^{-3}$ or less, it is possible to use a usual CMOS process. In a peripheral area of the gate insulating-film 33, it is possible to use a field oxide film 31 for element isolation, made by local oxidation of silicon (LOCOS) or shallow trench isolation (STI) method. From the standpoint of industrial aspect, the semiconductor substrate 19 having an impurity concentration of about $8 \times 10^{17}$ $cm^{-3}$ or more and about $1 \times 10^{20}$ $cm^{-3}$ or less and the silicon epitaxial growth layer having an impurity concentration of about $6 \times 10^{13}$ $cm^{-3}$ or more and about $1.5 \times 10^{15}$ $cm^{-3}$ or less are preferable, because silicon wafers having the above impurity concentrations are easily available on market. A thickness of the silicon epitaxial growth layer is about four to twenty micrometers, and in a case that the light emitter 91 uses visible light, the thickness may be about six to ten micrometers.

On the other hand, in the case of the surface-buried region 22, it is possible to employ a value of an impurity concentration of about $5 \times 10^{14}$ $cm^{-3}$ or more and about $5 \times 10^{16}$ $cm^{-3}$ or less, and typically, for example, it is possible to employ a value of an impurity concentration of about $1 \times 10^{15}$ $cm^{-3}$. Its thickness can be about 0.1 to three micrometers, preferably about 0.5 to 1.5 micrometers.

When the gate insulating-film 33 is made of thermal oxide film, a thickness of the thermal oxide film may be about 1 nm or more and about 30 nm or less, preferably about three nanometers or more and about fifteen nanometers or less. When the gate insulating-film 33 is dielectric film other than the thermal oxide film, its thickness may be an equivalent thickness converted by a relative dielectric constant $\varepsilon_r$ ($\varepsilon_r$=3.8 at 1 MHz) for the thermal oxide film. For example, when a CVD oxide film of a relative dielectric constant $\varepsilon_r$=4.4 is used, it is possible to employ a thickness obtained by multiplying the above thickness by 4.4/3.8=1.16, and when a silicon nitride film ($Si_3N_4$) film of a relative dielectric constant $\varepsilon_r$=7 is used, it is possible to employ a thickness obtained by multiplying the above thickness by 7/3.8=1.84. However, it is preferable to use an oxide film ($SiO_2$ film) fabricated by a standard CMOS technique.

The first transfer signal TX1 in FIGS. 5 to 8 is applied to the first charge-transfer gate 16a laminated on the gate insulating-film 33, and the second transfer signal TX2 in FIGS. 5 to 8 is applied to the second charge-transfer gate 16b. For example, when the first transfer signal TX1=3.3 volts (VDD) is applied to the first charge-transfer gate 16a, and the second transfer signal TX2=zero volt (GND) is applied to the second charge-transfer gate 16b, with a potential distribution established in the surface-buried region 22, electrons generated by optical signals are transported to the charge-accumulation region 23a on the right side. Reversely, when the first transfer signal TX1=zero volt (GND) is applied to the first charge-transfer gate 16a, and the second transfer signal TX2=3.3 volts (VDD) is applied to the second charge-transfer gate 16b, the electrons generated by the optical signals are transported to the charge-accumulation region 23b on the left side.

Figure 5:
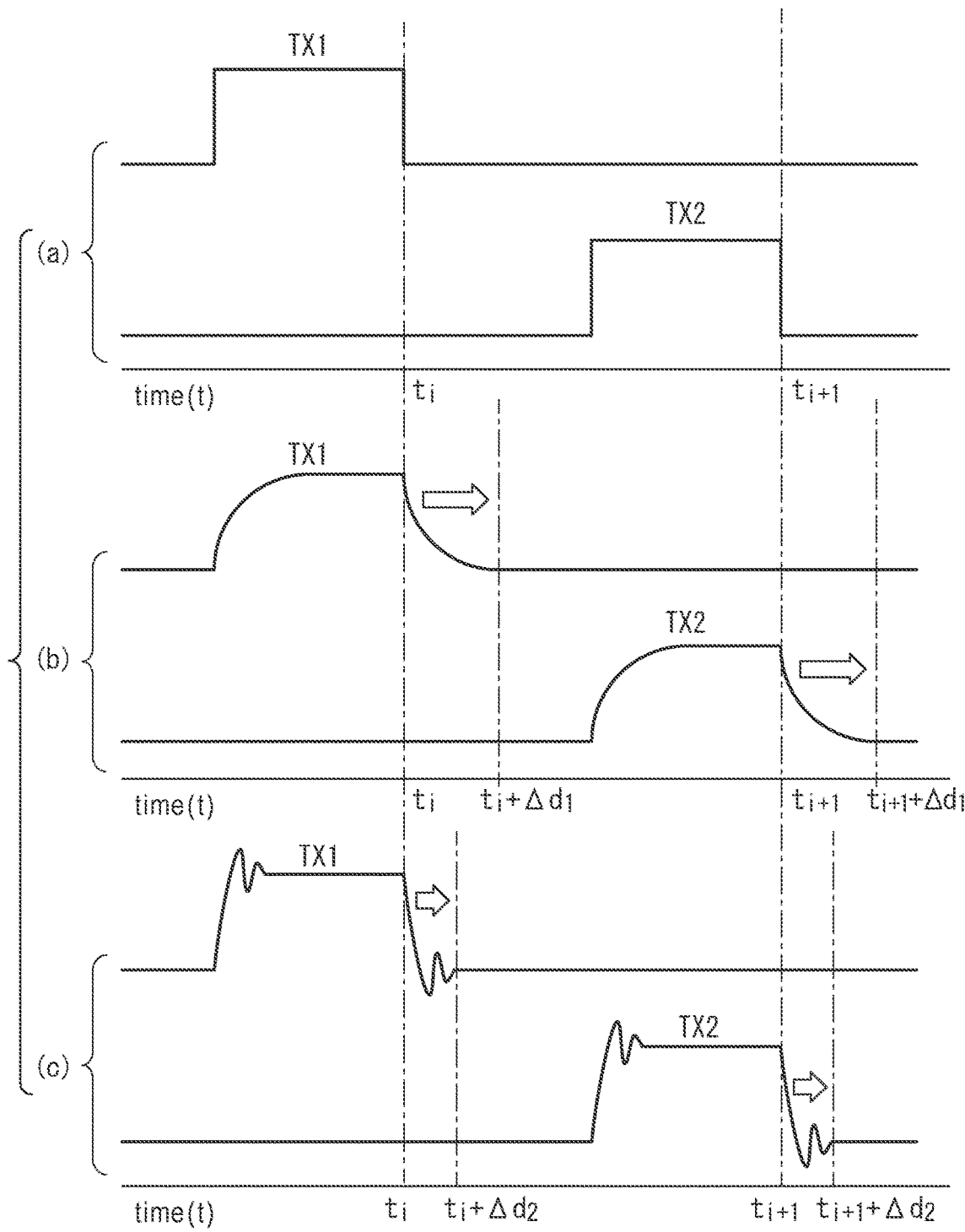
FIG. 5 is a view illustrating respective ideal waveforms with reference (a) showing a first transfer signal TX1 applied to a first charge-transfer gate and a second transfer signal TX2 applied to a second charge-transfer gate, in the pixel in the range-measuring device pertaining to the first embodiment, with reference (b) showing when a CR delay exists in the first transfer signal TX1 and the second transfer signal TX2, and with reference (c) showing when ringing exists in the first transfer signal TX1 and the second transfer signal TX2.

The upper site or the upper side wave forms in FIG. 5 at reference (a) illustrates ideal waveforms of the first transfer signal TX1 applied to the first charge-transfer gate 16a. The lower site or the lower side wave forms in FIG. 5 at reference (a) illustrates ideal waveforms of the second transfer signal TX2 applied to the second charge-transfer gate 16b. As indicated by Eq. (1), an estimated range L by the photoelectric-conversion element for range measurement pertaining to the first embodiment is obtained by an allocation ratio of signal charges Q1 transferred by the first transfer signal TX1 on the right side, which are transferred to and accumulated in the charge-accumulation region 23a, and signal charges Q2 transferred by the second transfer signal TX2 on the left side, which are transferred to and accumulated in the charge-accumulation region 23b.

$$L=(cT_o/2)(Q2/(Q1+Q2)) \quad (1)$$

Here, c is light velocity, and $T_o$ is light-projection time of pulsed light (pulse width).

The charge-accumulation time $T_a$ required to measure the estimated range L is not a period defined when the first transfer signal TX1 and the second transfer signal TX2 are at high level. But, the charge-accumulation time $T_a$ is defined as a period from a time $t_i$ when high level of a previous first transfer signal TX1 illustrated in the upper site in FIG. 5 at reference (a) is changed to low level to a time $t_{i+1}$ when high level of a next second transfer signal TX2 illustrated in the lower site in FIG. 5 at reference (a) is changed to low level. The charge-transfer time $T_{on}$, defined for the period when the first transfer signal TX1 and the second transfer signal TX2 are on-state (at high level), may have a time or more than the period for the signal charges can be transferred through the first charge-transfer gate 16a and the second charge-transfer gate 16b. Thus, the charge-transfer times $T_{on}$, defined for the period when the first transfer signal TX1 applied to the first charge-transfer gate 16a and the second transfer signal TX2 applied to the second charge-transfer gate 16b are at high level, may the same time regardless of the variations in repetitive-cycle time $T_c$. As can be understood by comparing the upper and lower sites in FIG. 5 at reference (a) with each other, an offset period exists between the first transfer signal TX1 and the second transfer signal TX2. And therefore, the first transfer signal TX1 and the second transfer signal TX2 are applied to the first charge-transfer gate 16a and the second charge-transfer gate 16b, respectively, at the timings differing from each other.

The upper site or the upper side wave forms in FIG. 5 at reference (b) illustrates real waveforms representing a typical CR delay of the first transfer signal TX1 applied to the first charge-transfer gate 16a. And the lower site or the lower side wave forms in FIG. 5 at reference (b) illustrates real waveforms representing the typical CR delay of the second transfer signal TX2 applied to the second charge-transfer gate 16b. The delays of the first transfer signal TX1 and the second transfer signal TX2 in FIG. 5 at reference (b) are determined by the driving capability of the driver and the parasitic capacitances C and parasitic resistances R of the wirings on the pixels $X_{ij}$ and the pixel-array area ($X_{11}$ to $X_{1m}$; $X_{21}$ to $X_{2m}$; --- ---; $X_{n1}$ to $X_{nm}$). Thus, the transfer times are delayed similarly every time. Thus, even if those CR delay times are generated, the charge-accumulation time $T_a$ is defined by an interval between a time $t_i+\Delta d_1$ when the high level of the previous first transfer signal TX1 illustrated in the upper site in FIG. 5 at reference (b) is changed through the CR delay time to low level and a time $t_{i+1}+\Delta d_1$ when the high level of the next second transfer signal TX2 illustrated in the lower site in FIG. 5 at reference (b) is changed through the CR delay time to low level. According to the waveform in FIG. 5 at reference (b), it is understood that the offset period in which both of the first transfer signal TX1 and the second transfer signal TX2 are off-states may be provided, not only for a period in which the typical delay of the CR delay exists but also for a period in which the transfer signal is delayed systematically every time. Namely, the offset period is provided for a period until the high levels of the first transfer signal TX1 and the second transfer signal TX2 are changed perfectly, through the CR delay time, to a steady state of low level. As can be understood from FIG. 5 at reference (b), the first transfer signal TX1 and the second transfer signal TX2 are applied to the first charge-transfer gate 16a and the second charge-transfer gate 16b, respectively, at timings differing from each other, in such a way that the offset period exists between the first transfer signal TX1 and the second transfer signal TX2, even if the CR delay is generated.

The upper site in FIG. 5 at reference (c) illustrates real waveforms in which there is ringing response of the typical first transfer signal TX1 applied to the first charge-transfer gate 16a. The lower site in FIG. 5 at reference (c) illustrates real waveforms in which there is ringing response of the typical second transfer signal TX2 applied to the second charge-transfer gate 16b. Even if those ringing response are generated, the charge-accumulation time $T_a$ is defined during an interval between a time $t_i+\Delta d_2$ when the high level of the previous first transfer signal TX1 illustrated in the upper site in FIG. 5 at reference (c) is changed through the ringing response to low level and a time $t_{i+1}+\Delta d_2$ when the high level of the next second transfer signal TX2 illustrated in the lower site in FIG. 5 at reference (c) is changed through the ringing response to low level. According to the waveforms in FIG. 5 at reference (c), it is known that the offset period in which both of the first transfer signal TX1 and the second transfer signal TX2 are off-states may be provided only for a period until the high levels of the first transfer signal TX1 and the second transfer signal TX2 are systematically changed through the ringing oscillation to low level. As illustrated in FIG. 5, according to the range-measuring device pertaining to the first embodiment, because the offset period is provided in between the on-periods of the first transfer signal TX1 and the second transfer signal TX2, which are applied to the first charge-transfer gate 16a and the second charge-transfer gate 16b, respectively, a requirement of the quick voltage-switching operations (on/off-switching operations) is relaxed. Since the relaxed condition of the quick voltage switching makes the operational margin of the driver 94 wider, it becomes easy to design and manufacture the 3D imaging device.

Figure 6:
FIG. 6 is a drive-timing chart explaining an operation, when the range-measuring device pertaining to the first embodiment is adjusted in a case that a distance to a subject is close.

Hereinafter, the adjusting operation of the range-measuring device pertaining to the first embodiment will be described by using FIGS. 6 to 8. FIG. 6 is a view exemplifying a drive-timing chart in which drive-conditions are changed by instructions prescribed by the program, in accordance with the flow represented by the flowchart illustrated in FIG. 3. At first, at Step S11 in the flowchart illustrated in FIG. 3, the time-setting logical-circuit 731 of the control processor 73a in FIG. 2 sets the light-projection time $T_o$ to a maximum value. Continuously, at Step S12, the time-setting logical-circuit 731 sets the repetitive-cycle time $T_c$ to a maximum value. The set-time output-controller 733 feeds the set light-projection time $T_o$ and repetitive-cycle time $T_c$ as control signals transmitted through the interface 75 illustrated in FIG. 1 to the driver 94, and the pulsed lights are emitted from the light emitter 91, and the range-measuring device pertaining to the first embodiment is accordingly driven.

Because the drive-timing chart explaining the adjust-operation of the range-measuring device pertaining to the first embodiment illustrated in FIG. 6 corresponds to a case when a distance to the target 92 illustrated in FIG. 1 is short, a delay time $T_d$ of received light is very small. At Step S13 in FIG. 3, the range calculator 71 executes the calculation for calculating a distance by Eq. (1), using data of the difference between the signal charges transferred through the transfer channels just under the first charge-transfer gate 16a and the second charge-transfer gate 16b, under the drive of the range-measuring device of the first embodiment. The calculated result of the range, which is ascribable to the range calculator 71, together with the collateral information is once stored in the data memory 72. Here, the collateral information is, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S14 in FIG. 3, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. In the condition represented by FIG. 6 (a), as can be understood from the drive-timing chart, although the distance can be calculated, a distance-precision level is low because a rate of signal-charge amount accumulated in the second charge-accumulation region 23b transferred by the second charge-transfer gate 16b is very small, as compared with a rate of signal-charge amount accumulated in the first charge-accumulation region 23a transferred by the first charge-transfer gate 16a. By determining a threshold on the basis of the rate of the signal-charge amount, and by storing the threshold in the data memory 72, the drive condition in FIG. 6 (a) is judged to be not correct, at Step S14. Or, for example, if data of thresholds are defined to respective drive-conditions for various calculated distances, and by storing the data of the thresholds in the data memory 72, the set-value judging-circuit 732 can read out the data of thresholds from the data memory 72, and can judge whether or not the light-projection time $T_o$ and the repetitive-cycle time $T_c$ are correct.

At Step S14, if in the condition represented by FIG. 6 (a), "NO" is judged by the set-value judging-circuit 732, but an agreed-answer (Yes) is judged in the flowchart illustrated in FIG. 3, the data is not transmitted to the output unit 74. If the agreed-answer (Yes) is obtained in the flowchart illustrated in FIG. 3, the light-projection time $T_o=T_{omax}$ is reduced at Step S15 in FIG. 3. Continuously, at Step S16, the time-setting logical-circuit 731 reduces the repetitive-cycle time $T_c=T_{cmax}$. The light-projection time $T_o=T_{omax}$ and the repetitive-cycle time $T_c=T_{cmax}$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$). Then, at Step S13 in FIG. 3, the range is again measured in the condition illustrated by FIG. 6 (b).

In the condition represented by FIG. 6 (b), because the half period of the repetitive-cycle time $T_{c(i)}$ is the light-projection time $T_{o(i)}$ and the charge-accumulation time $T_{c(i)}$, respectively, the light-projection time $T_{o(i)}$ and the charge-accumulation time $T_{a(i)}$ change synchronously with the repetitive-cycle time $T_{c(i)}$. On the other hand, the charge-transfer time $T_{on}$ does not synchronize with the repetitive-cycle time $T_{c(i)}$, and the cycle time $T_{c(i)}$ does not change the charge-transfer time $T_{on}$. Even in the condition represented by FIG. 6 (b), the range can be calculated. However, the rate of the signal-charge amount transported just under the second charge-transfer gate 16b and accumulated in the second charge-accumulation region 23b is still smaller than the rate of the signal-charge amount transported just under the first charge-transfer gate 16a and accumulated in the first charge-accumulation region 23a. Thus, the distance-precision level becomes low. Therefore, at Step S14 in FIG. 3, the set-value judging-circuit judges that the drive in the condition represented by FIG. 6 (b) is not the correct drive-condition. If "NO" is judged for the condition represented by FIG. 6 (b), namely, if the agreed-answer (Yes) is obtained in the flowchart illustrated in FIG. 3, the data is not transmitted to the output unit 74.

At Step S14, if "NO" is judged by the set-value judging-circuit for the condition represented by FIG. 6 (b), the data is again transmitted to the control processor 73a. At Steps S15 and S16, as indicated by the condition illustrated in FIG. 6 (c), the control processor 73a modifies the drive-condition by further reducing the light-projection time $T_o$ and the repetitive-cycle time $T_c$. After that, again at Step S13, the calculation operation of the range is performed, and the range is measured. For the condition represented by FIG. 6 (c), because the half period of the repetitive-cycle time $T_{c(i+1)}$ is the light-projection time $T_{o(i+1)}$ and the charge-accumulation time $T_{a(i+1)}$, respectively, the light-projection time $T_{o(i+1)}$ and the charge-accumulation time $T_{a(i+1)}$ change synchronously with the repetitive-cycle time $T_{a(i+1)}$. On the other hand, the charge-transfer time $T_{on}$ does not synchronize with the repetitive-cycle time $T_{c(i)}$, and the cycle time $T_{c(i)}$ does not change the charge-transfer time $T_{on}$. Also, here, the condition represented by FIG. 6 (c) is the available minimum repetitive-cycle time $T_c$.

For the condition represented by FIG. 6 (c), as can be understood from the drive-timing chart, the range can be calculated, and the difference between the rates of the signal-charge amount transported just under the first charge-transfer gate 16a and accumulated in the first charge-accumulation region 23a and the signal-charge amount transported just under the second charge-transfer gate 16b and accumulated in the second charge-accumulation region 23b is small, which makes the distance-precision level higher. Therefore, at Step S14 in FIG. 3, the set-value judging-circuit 732 judges that the drive-condition illustrated in FIG. 6 (c) is correct, and the range-image output-controller 734 feeds the calculated result of the range to the output unit 74. Then, the collateral information may be fed to the output unit 74 at the same time.

Figure 7:
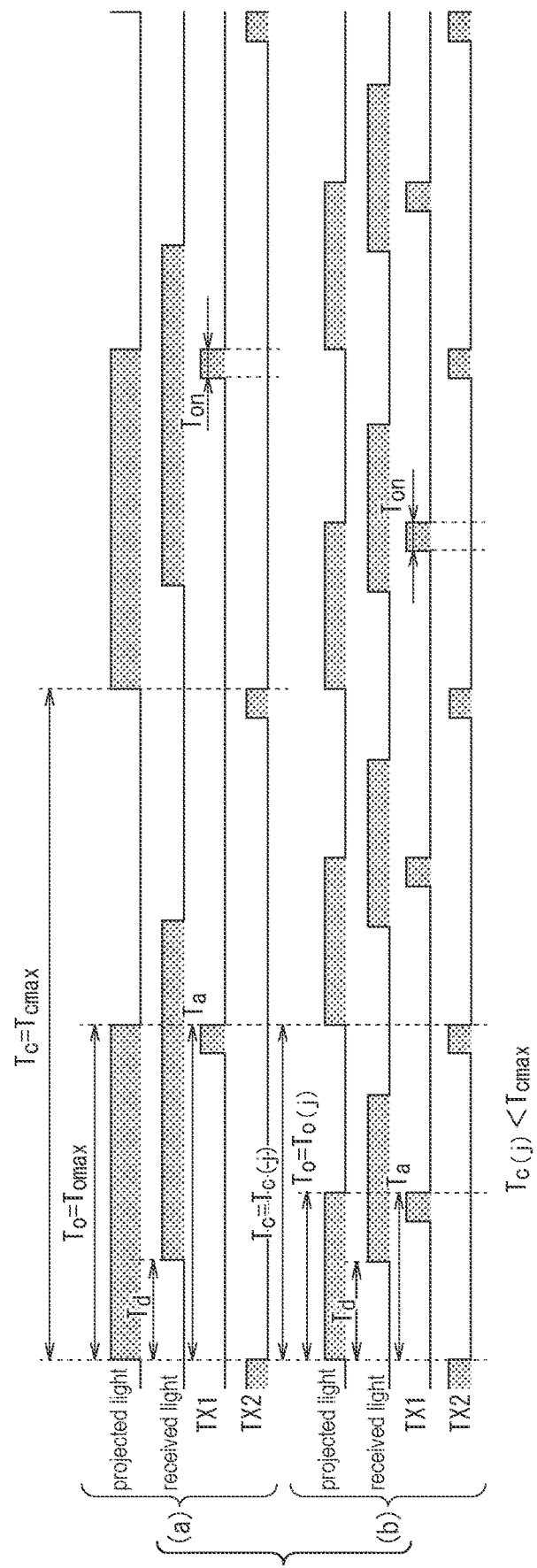
FIG. 7 is a drive-timing chart explaining an operation, when the range-measuring device pertaining to the first embodiment is adjusted in a case that a distance to the subject is middle.

FIG. 7 exemplifies the drive-timing chart in which the drive-condition changes by the instructions prescribed by the program, in accordance with the flow represented by the flowchart illustrated in FIG. 3. At first, at Step S11 in the flowchart illustrated in FIG. 3, the time-setting logical-circuit 731 in the control processor 73a in FIG. 2 sets the light-projection time $T_o$ to a maximum value. Continuously, at Step S12, the time-setting logical-circuit 731 sets the repetitive-cycle time $T_c$ to a maximum value. The set-time output-controller 733 feeds the set light-projection time $T_o$ and repetitive-cycle time $T_c$ as the control signals transmitted through the interface 75 illustrated in FIG. 1 to the driver 94, and the pulsed lights are emitted from the light emitter 91, and the range-measuring device of the first embodiment is accordingly driven.

Because the drive-timing chart explaining the adjust-operation of the range-measuring device of the first embodiment illustrated in FIG. 7 corresponds to a case when the range to the target 92 illustrated in FIG. 1 is longer (middle distance) than the distance of FIG. 6, the delay time $T_d$ of the received light is slightly larger than FIG. 6. At Step S13 in FIG. 3, the range calculator 71 calculates the range by Eq.

(1), using data of the difference between the signal charges transferred through the transfer channels just under the first charge-transfer gate 16a and the second charge-transfer gate 16b, under the drive of the range-measuring device of the first embodiment. The calculated result of the range, which is ascribable to the range calculator 71, together with the collateral information is once stored in the data memory 72. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S14 in FIG. 3, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. For the condition represented by FIG. 7 (a), as can be understood from the drive-timing chart, although the range can be calculated, the distance-precision level is low because the rate of the signal-charge amount accumulated in the second charge-accumulation region 23b transferred by the second charge-transfer gate 16b is relatively smaller than the rate of the signal-charge amount accumulated in the first charge-accumulation region 23a transferred by the first charge-transfer gate 16a. In advance, by determining the threshold from the data of the rate of the signal-charge amount, and storing the threshold in the data memory 72, the drive-condition illustrated in FIG. 7 (a) is judged to be not correct, at Step S14. Or, for example, in a case that for the calculated distances, the thresholds are defined under the respective drive-conditions, by storing the data of thresholds in the data memory 72, the set-value judging-circuit 732 can read out the data of thresholds from the data memory 72 and judge whether or not the light-projection time $T_o$ and the repetitive-cycle time $T_c$ are correct.

At Step S 14, if "NO" is judged by the set-value judging-circuit 732 for the condition represented by FIG. 7 (a), namely, if the agreed-answer (Yes) is obtained in the flow-chart illustrated in FIG. 3, the data is not transmitted to the output unit 74. If the agreed-answer (Yes) is obtained in the flowchart illustrated in FIG. 3, the light-projection time $T_o=T_{omax}$ is reduced at Step S15 in FIG. 3. Continuously, at Step S16, the time-setting logical-circuit 731 reduces the repetitive-cycle time $T_c=T_{cmax}$. The light-projection time $T_o$ and the repetitive-cycle time $T_c$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$). Then, at Step S13 in FIG. 3, the range is again measured in the condition illustrated by FIG. 7 (b).

For the condition represented by FIG. 7 (b), because the half period of the repetitive-cycle time $T_{c(j)}$ is the light-projection time $T_{o(j)}$ and the charge-accumulation time $T_{a(j)}$, respectively, the light-projection time $T_{o(j)}$ and the charge-accumulation time $T_{a(j)}$ are changed synchronously with the repetitive-cycle time $T_c$. On the other hand, the charge-transfer time $T_{on}$ does not synchronize with the repetitive-cycle time $T_{c(j)}$, and the cycle time $T_{c(j)}$ does not change charge-transfer time $T_{on}$. The condition represented by FIG. 7 (b) is the available minimum repetitive-cycle time $T_{c(j)}$.

In the condition represented by FIG. 7 (b), the range can be calculated, as can be understood from the drive-timing chart, and because the difference between the rates of the signal-charge amount transported just under the first charge-transfer gate 16a and accumulated in the first charge-accumulation region 23a and the signal-charge amount transported just under the second charge-transfer gate 16b and accumulated in the second charge-accumulation region 23b is small, the distance-precision level becomes higher. Therefore, at Step S14 in FIG. 3, the set-value judging-circuit 732 judges that the drive-condition illustrated in FIG. 7 (b) is correct, and the range-image output-controller 734 feeds the calculated result of the range to the output unit 74. Then, the collateral information may be fed to the output unit 74 at the same time.

Figure 8:
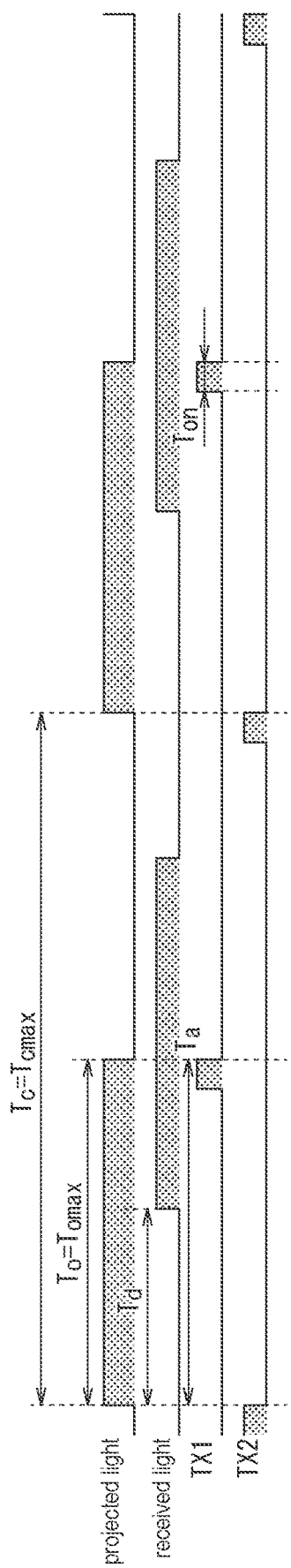
FIG. 8 is a drive-timing chart explaining an operation, when the range-measuring device pertaining to the first embodiment is adjusted in a case that a distance to the subject is long and distant.

FIG. 8 exemplifies the drive-timing chart in which the drive-conditions are modified by the instructions prescribed by the program, in accordance with the flow represented by the flowchart illustrated in FIG. 3. At first, at Step S11 in the flowchart illustrated in FIG. 3, the time-setting logical-circuit 731 in the control processor 73a in FIG. 2 sets the light-projection time $T_o$ to a maximum value $T_{omax}$. Continuously, at Step S12, the time-setting logical-circuit 731 sets the repetitive-cycle time $T_c$ to a maximum value $T_{cmax}$. The set-time output-controller 733 feeds the set light-projection time $T_o$ and repetitive-cycle time $T_c$ as the control signals transmitted through the interface 75 illustrated in FIG. 1 to the driver 94, and the pulsed lights are emitted from the light emitter 91, and the range-measuring device of the first embodiment is accordingly driven.

The drive-timing chart explaining the adjust-operation of the range-measuring device of the first embodiment illustrated in FIG. 8 for a case when the range to the target 92 illustrated in FIG. 1 is longer (long distance) than the distance of FIG. 7. Thus, the delay time $T_d$ of the received light is larger than the delay time $T_d$ of FIG. 7. At Step S13 in FIG. 3, the range calculator 71 calculates the range by Eq. (1), using data of the difference between the signal charges transferred through the transfer channels just under the first charge-transfer gate 16a and the second charge-transfer gate 16b, under the drive of the range-measuring device of the first embodiment. The calculated result of the range, which is ascribable to the range calculator 71, together with the collateral information are once stored in the data memory 72. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S14 in FIG. 3, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71.

For the condition represented by FIG. 8, as can be understood from the drive-timing chart, although the range can be calculated, because the difference of the rate between the signal-charge amount transported just under the first charge-transfer gate 16a and accumulated in the first charge-accumulation region 23a and the signal-charge amount transported just under the second charge-transfer gate 16b and accumulated in the second charge-accumulation region 23b is small, the distance-precision level becomes higher. Therefore, at Step S14 in FIG. 3, the set-value judging-circuit 732 judges that the drive-condition illustrated in FIG. 8 is correct, and the range-image output-controller 734 feeds the calculated result of the range to the output unit 74. Then, the collateral information may be also fed to the output unit 74 at the same time.

As mentioned above, according to the range-measuring device of the first embodiment of the present invention, when the repetitive-cycle time $T_c$ is changed in accordance with the procedure of the flowchart in FIG. 3, by using the drive-adjusting method that maintains the value of the on-period $T_{on}$ regardless of the variations in repetitive-cycle time $T_c$, it is possible to achieve the accurate charge distributing, or the accurate charge sorting by the first charge-transfer gate 16a and the second charge-transfer gate 16b. Moreover, according to the range-measuring device of the first embodiment of the present invention, it is possible to enlarge the operational margin of the driver 94 and make the performance of the 3D imaging device with the lock-in pixel higher and higher. According to the range-measuring device of the first embodiment of the present invention, the quick voltage-switching operations (on/off-switching operations) in the first charge-transfer gate 16a and the second charge-transfer gate 16b for executing the charge distribution are relaxed, respectively, which makes the operational margin of the driver 94 wider, and it becomes easy to design and manufacture the 3D imaging device. Therefore, for example, the global wiring on the pixels implementing the 3D imaging device can be slimmed, which can increase the opening rate of each pixel. Moreover, for example, by making the structure of the transistors of the driver 94 finer and finer, it is possible to reduce an asset of a chip area.

Variation of First Embodiment

Figure 9:
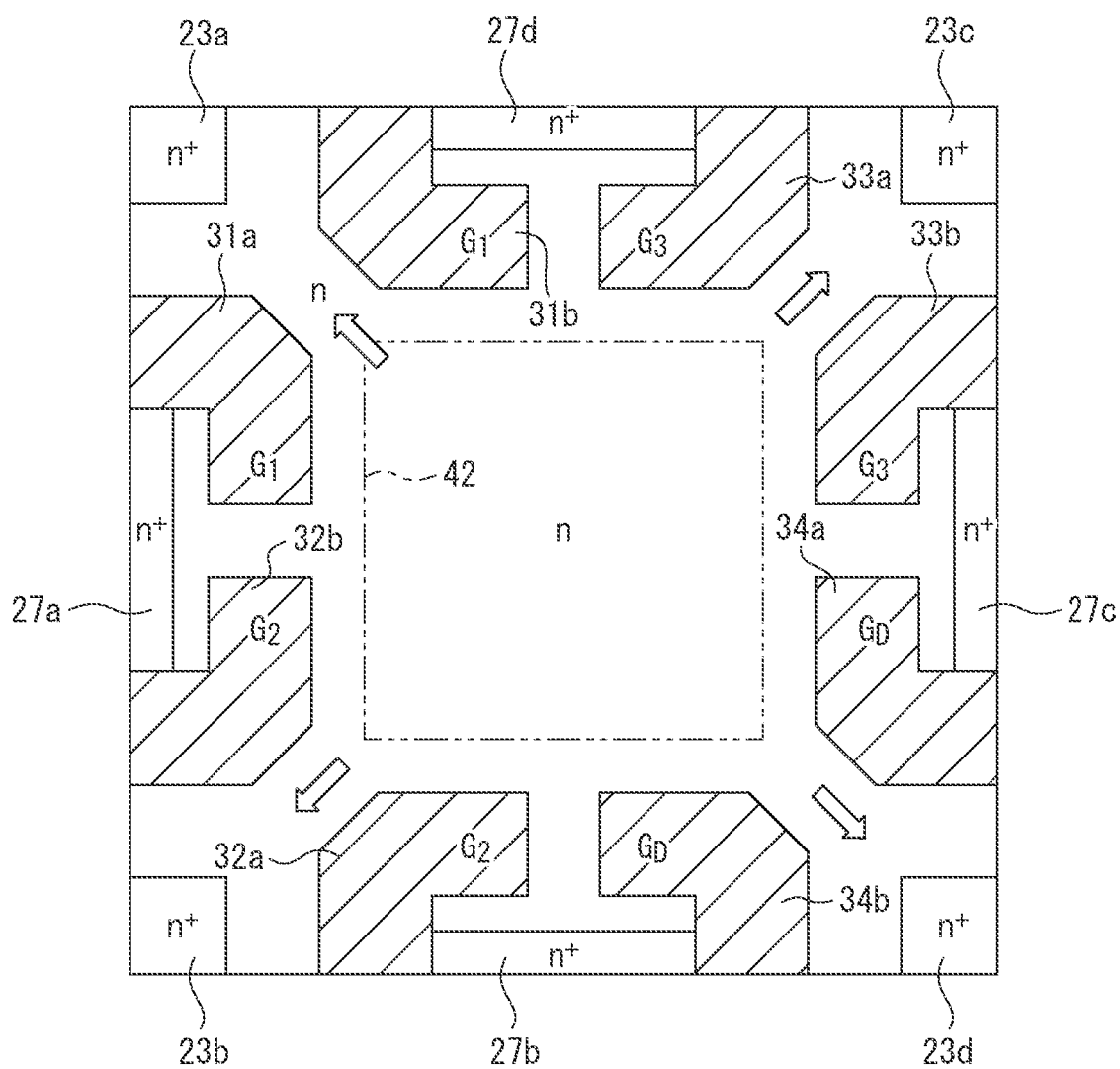
FIG. 9 is a plan view explaining an outline of a structure of a 3-tap pixel of a range-measuring device pertaining to a variation of the first embodiment of the present invention.

"Distributing gate" in the present invention is not limited to the first charge-transfer gate 16a or the second charge-transfer gate 16b of MOS architecture, as illustrated in FIG. 4. Each of the distributing gates in the present invention may have a structure of Lateral Electric Field Charge Modulator (LEFM), as illustrated in FIG. 9. Although the illustration of a cross-sectional view is omitted, in each pixel of a range-measuring device pertaining to the variation of the first embodiment of the present invention, the functional-substrate layer 20 composed of p-type semiconductor, the n-type surface-buried region 22 buried in a part of the upper portion of the functional-substrate layer 20, the light-receiving-portion providing-region (29, 22) including $p^+$ type pinning layer 29 provided in contact with the surface of the surface-buried region 22, the gate insulating-film 33 laminated on the light-receiving-portion providing-region (29, 22), and the center of the light-receiving-portion providing-region (29, 22) are defined as the light-receiving region, similarly to the cross-sectional structure illustrated in FIG. 4. And, as illustrated in the plan view in FIG. 9, each pixel includes an $n^+$ type first charge-accumulation region 23a, an $n^+$ type second charge-accumulation region 23b, an $n^+$ type third charge-accumulation region 23c and an $n^+$ type fourth charge-accumulation region 23d, which are arranged at four positions symmetric with respect to the central position of the light-receiving region, separately from each other, so as to surround the light-receiving region. And, each of the first charge-accumulation region 23a, the second charge-accumulation region 23b, the third charge-accumulation region 23c and the fourth charge-accumulation region 23d has a higher impurity concentration than the functional-substrate layer 20. And, moreover, at positions surrounding the light-receiving region, each pixel includes a first electric-field control (EFC) electrode pair (31a, 31b), a second EFC electrode pair (32a, 32b), a third EFC electrode pair (33a, 33b) and a fourth EFC electrode pair (34a, 34b), each of which is arranged in pairs on both sides of a charge-transfer route diagonally extending towards each of the first charge-accumulation region 23a, the second charge-accumulation region 23b, the third charge-accumulation region 23c and the fourth charge-accumulation region 23d, from the central position of the light-receiving region on the gate insulating-film 33.

The first EFC electrode pair (31a, 31b) in the photoelectric-conversion element implementing each pixel is an electrode pair encompassing a hook-shaped first static-induction (SI) electrode 31a and a hook-shaped second SI electrode 31b, which are opposite to each other. The first SI electrode 31a and the second SI electrode 31b in island shapes define the charge-transfer route extending in a diagonal direction towards an upper-left portion in between the first SI electrode 31a and the second SI electrode 31b. In situation in which a predetermined driving voltage is applied to the first SI electrode 31a, a height of a potential barrier against signal charges in the charge-transfer route, which extends in the diagonal direction towards an upper-left portion, is lowered to establish a potential profile for assisting the transport of the signal charges in the charge-transfer route.

The second EFC electrode pair (32a, 32b) is an electrode pair in which a hook-shaped third SI electrode 32a and a hook-shaped fourth SI electrode 32b, which are opposite to each other. The third SI electrode 32a and the fourth SI electrode 32b in island shapes define the charge-transfer route extending in a diagonal direction towards a lower-left portion in between the third SI electrode 32a and the fourth SI electrode 32b. The third EFC electrode pair (33a, 33b) is an electrode pair in which a hook-shaped fifth SI electrode 33a and a hook-shaped sixth SI electrode 33b, which are opposite to each other. The fifth SI electrode 33a and the sixth SI electrode 33b in island shapes define the charge-transfer route extending in a diagonal direction towards an upper-right direction in between the fifth SI electrode 33a and the sixth SI electrode 33b. The fourth EFC electrode pair (34a, 34b) is an electrode pair in which a hook-shaped seventh SI electrode 34a and a hook-shaped eighth SI electrode 34b are opposite to each other. The seventh SI electrode 34a and the eighth SI electrode 34b in island shapes define the charge-transfer route extending in a diagonal direction towards a lower-right direction in between the seventh SI electrode 34a and the eighth SI electrode 34b.

As can be understood from the plan view in FIG. 9, the topology of the first charge-accumulation region 23a, the second charge-accumulation region 23b, the third charge-accumulation region 23c and the fourth charge-accumulation region 23d is rotationally symmetric four times with respect to the central position of the light-receiving region. Moreover, as illustrated in FIG. 9, in the pixel of the range-measuring device pertaining to the variation of the first embodiment, n-type charge-exhaust assist-regions 27a, 27b, 27c and 27d, each of which having a higher impurity concentration than the functional-substrate layer 20, are buried separately from each other, in the peripheral portion surrounding the light-receiving region.

The first SI electrode 31a and the second SI electrode 31b are arranged oppositely to each other, in mirror image relationship, on both sides of the charge-transfer route towards the first charge-accumulation region 23a. The third SI electrode 32a and the fourth SI electrode 32b are arranged oppositely to each other, in mirror image relationship, on both sides of the charge-transfer route towards the second charge-accumulation region 23b. The fifth SI electrode 33a and the sixth SI electrode 33b are arranged oppositely to each other, in mirror image relationship, on both sides of the charge-transfer route towards the third charge-accumulation region 23c. The seventh SI electrode 34a and the eighth SI electrode 34b are arranged oppositely to each other, in mirror image relationship, on both sides of the charge-transfer route towards the fourth charge-accumulation region 23d.

Figure 10:
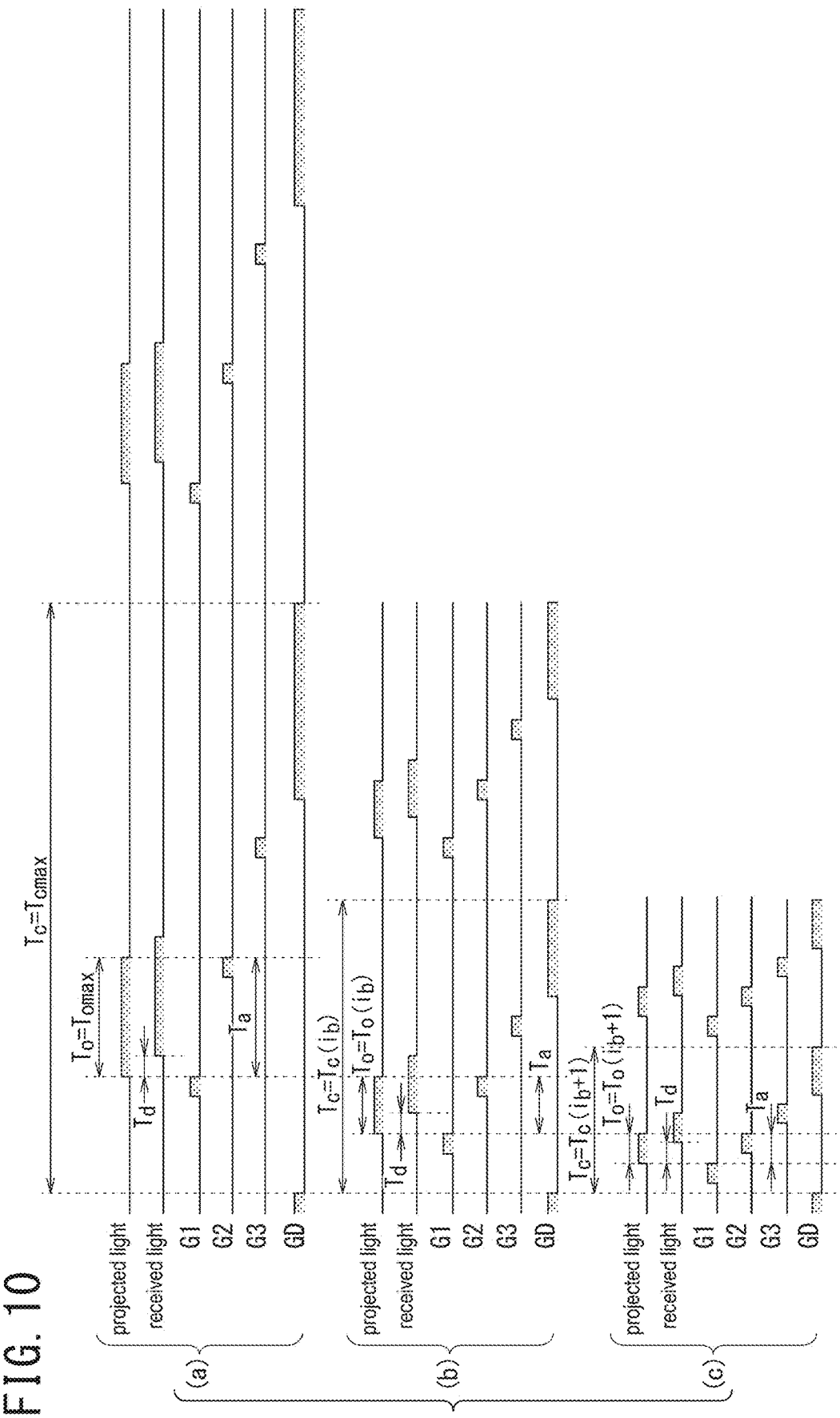
FIG. 10 is a drive-timing chart explaining an operation, when the range-measuring device pertaining to the variation of the first embodiment illustrated in FIG. 9 is adjusted, in the case that the distance to the subject is close.

In the pixel of the range-measuring device pertaining to the variation of the first embodiment, as illustrated in FIG. 10, a first transfer signal G1, a second transfer signal G2, a third transfer signal G3 and a exhausting signal GD are cyclically applied as electric-field control-pulses to the first EFC electrode pair (31a, 31b), the second EFC electrode pair (32a, 32b), the third EFC electrode pair (33a, 33b) and the fourth EFC electrode pair (34a, 34b). Then, depletion potential of the surface-buried region 22 is alternately changed. Accordingly, a potential gradient towards a direction in which charges are transported is alternately generated in any of the charge-transfer routes. Accordingly, transport destinations of the signal charges generated in the surface-buried region 22 are controlled to be sequentially set to any of the first charge-accumulation region 23a, the second charge-accumulation region 23b, the third charge-accumulation region 23c and the fourth charge-accumulation region 23d. Also, as illustrated in FIG. 9, the charge-exhaust assist-regions 27a, 27b, 27c and 27d are buried in peripheral portions. Thus, a charge-exhausting pulse of a second potential level higher than driving voltages G1, G2, G3 and GD of a first potential level, which are used when the charge-transfer route is set, is applied to the first EFC electrode pair (31a, 31b). Hence, charges becoming noise current components against the ranging operation, which is caused by background light and the like, can be exhausted to the first charge-exhaust assist-region 27a and the fourth charge-exhaust assist-region 27d.

Similarly, since the charge-exhausting pulse of the second potential level is applied to the second EFC electrode pair (32a, 32b), the charges becoming the noise current component against the ranging operation can be exhausted to the second charge-exhaust assist-region 27b and the first charge-exhaust assist-region 27a. By applying the charge-exhausting pulse of the second potential level to the third EFC electrode pair (33a, 33b), the charges becoming the noise current component against the ranging operation can be exhausted to the third charge-exhaust assist-region 27c and the fourth charge-exhaust assist-region 27d. By applying the charge-exhausting pulse of the second potential level to the fourth EFC electrode pair (34a, 34b), the charges becoming the noise current component against the ranging operation can be exhausted to the second charge-exhaust assist-region 27b and the third charge-exhaust assist-region 27c. For example, when the voltage of each of the driving voltages G1, G2, G3 and GD is defined as two volts, the voltage of the second potential level for the charge-exhausting pulse may be set to about five volts.

In the pixel of the range-measuring device pertaining to the variation of the first embodiment, the charge-transfer routes are set to implement an X-shape in which the charge-transfer routes cross each other at a center. In a direction across each charge-transfer route, by the first EFC electrode pair (31a, 31b), the second EFC electrode pair (32a, 32b), the third EFC electrode pair (33a, 33b) and the fourth EFC electrode pair (34a, 34b) each of which performs electric field control by the SI effect, photoelectrons generated in the light-receiving region can be transferred at high speed by the electric field control, in four directions of X-shape, along the charge-transfer routes implementing the X-shape. Accordingly, it is possible to perform charge modulation.

In the pixel of the range-measuring device pertaining to the variation of the first embodiment, in a case that the electrons generated in the light-receiving region are transferred in the upper-left direction in FIG. 9 along the charge-transfer route exhibiting the X-shape and transferred between the first EFC electrode pair (31a, 31b), when each of the second EFC electrode pair (32a, 32b), the third EFC electrode pair (33a, 33b) and the fourth EFC electrode pair (34a, 34b) is biased to zero (connected to ground potential GND) and then, a first electric-field control-pulse G1 of a driving voltage G1=two volts is applied to the first EFC electrode pair (31a, 31b), a potential gradient is generated along a diagonal direction towards an upper-left portion, from the charge-accumulation region 23d to the first charge-accumulation region 23a. Reversely, in a case that the electrons generated in the light-receiving region are transferred towards a lower-right direction in FIG. 9 along the potential gradient route exhibiting the X-shape and transferred between the fourth EFC electrode pair (34a, 34b), when each of the first EFC electrode pair (31a, 31b), the second EFC electrode pair (32a, 32b) and the third EFC electrode pair (33a, 33b) is biased to zero (connected to ground potential GND) and then, a fourth electric-field control-pulse GD of a driving voltage G1=two volts is applied to the fourth EFC electrode pair (34a, 34b), a potential gradient towards a lower-right direction is generated.

FIG. 10 (a) to (c) illustrate the drive-timing charts each of which explains the adjustment operation of the range-measuring device pertaining to the variation of the first embodiment. On/off-periods of the drive pulse G1 applied to the first EFC electrode pair (31a, 31b), the drive pulse G2 applied to the second EFC electrode pair (32a, 32b) and the drive pulse G3 applied to the third EFC electrode pair (33a, 33b) are equal to each other. And, the on/off-periods of each of the drive pulses G1, G2 and G3 is separated from each other by the charge-accumulation time $T_a$. An on-period of the drive pulse GD applied to the fourth EFC electrode pair (34a, 34b) is longer than that of each of drive pulses G1, G2 and G3, and the period in which the drive pulse GD is turned on/off is the repetitive cycle ($T_c$). The light-projection time illustrated in FIG. 10 is synchronous with the charge-accumulation time provided by the drive pulse G2. Thus, the range can be measured in a time interval, defined between the charge-accumulation times provided by the drive pulses G2 and G3, in which the received light can be arrived. The charge-accumulation time provided by the drive pulse G1 is a period for excluding (offset) background light, dark current and the like. The drive pulse GD is an exhausting-gate pulse for exhausting the photoelectrons so that the received lights, which have arrived in a time interval defined after the charge-accumulation time provided by the drive pulse G3, do not serve as noise against the range measurement.

According to the photoelectric-conversion element pertaining to the variation of the first embodiment, the estimated range L is given by an allocation ratio between signal charges Q1 transferred by the first EFC electrode pair (31a, 31b) G1 and accumulated in the charge-accumulation region 23a, signal charges Q2 transferred by the second EFC electrode pair (32a, 32b) G2 and accumulated in the charge-accumulation region 23b and signal charges Q3 transferred by the third EFC electrode pair (33a, 33b) G3 and accumulated in the charge-accumulation region 23c. Namely, as represented by Eqs. (2a), (2b) and (3), each of which is modified from Eq. (1):

$$Q2'=Q2-Q1 \quad (2a)$$

$$Q3'=Q3-Q1 \quad (2b)$$

$$L=(cT_o/2)(Q3'/(Q2'+Q3')) \quad (3)$$

Here, c is light velocity, and $T_o$ is light-projection time (pulse width) of pulsed light.

The drive-timing charts illustrated in FIGS. 10 (a) to (c) indicate a case when the range to the target 92 illustrated in FIG. 1 is short. Thus, the delay time $T_d$ of the received light is very small. At Step S13 in FIG. 3, the range calculator 71 calculates the range by Eqs. (2a), (2b) and (3), using data of the difference between each of the signal charges being transported by four charge-transfer routes, each of which is defined between the first EFC electrode pair (31a, 31b), the second EFC electrode pair (32a, 32b), the third EFC electrode pair (33a, 33b) and the fourth EFC electrode pair (34a, 34b), respectively. Here, the first EFC electrode pair (31a, 31b), the second EFC electrode pair (32a, 32b), the third EFC electrode pair (33a, 33b) and the fourth EFC electrode pair (34a, 34b) are driven by the scheme of the range-measuring device pertaining to the variation of the first embodiment. The calculated result of the range, which is ascribable to the range calculator 71, together with the collateral information are stored once in the data memory 72.

At Step S14 in FIG. 3, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. FIG. 10 (a) illustrate a drive-timing chart, which represents the period of the repetitive-cycle time $T_c$ is four times longer than the repetitive-cycle time $T_c$ defined in FIG. 10 (c). Here, the period of the repetitive-cycle time $T_c$ is determined by four on/off actions of the first EFC electrode pair (31a, 31b), the second EFC electrode pair (32a, 32b), the third EFC electrode pair (33a, 33b) and the fourth EFC electrode pair (34a, 34b) in FIGS. 10 (a) and (c).

For the condition represented by FIG. 10 (a), as can be understood from the drive-timing chart, although the range can be calculated, the rate of the signal-charge amount accumulated in the third charge-accumulation region 23c transported through the charge-transfer route between the third EFC electrode pair (33a, 33b) is very smaller than the rate of the signal-charge amount accumulated in the second charge-accumulation region 23b transported through the charge-transfer route between the second EFC electrode pair (32a, 32b). Thus, the distance-precision level becomes low. Therefore, in advance, by determining the threshold in view of the rate of the signal-charge amount and storing the data of the threshold in the data memory 72, at Step S14, the drive-condition illustrated in FIG. 10 (a) can be judged to be not correct. Or, for example, in a case that the thresholds are defined previously for the calculated distances in the respective drive-conditions, by storing the data of thresholds in the data memory 72, the set-value judging-circuit 732 may read out the data of thresholds from the data memory 72 and judge whether or not the light-projection time $T_o$ and the repetitive-cycle time $T_c$ are correct.

At step S14, if for the condition represented by FIG. 10 (a), "NO" is judged by the set-value judging-circuit 732, namely, if the agreed-answer (Yes) is obtained in the flowchart illustrated in FIG. 3, the data is not transmitted to the output unit 74. If the agreed-answer (Yes) is obtained in the flowchart illustrated in FIG. 3, the light-projection time $T_o=T_{omax}$ is reduced at Step S15 in FIG. 3. Continuously, at Step S16, the time-setting logical-circuit 731 reduces the repetitive-cycle time $T_c=T_{cmax}$. The light-projection time $T_o$ and the repetitive-cycle time $T_c$ are reduced, and the control signals, in which the drive-conditions are modified, are transmitted from the driver 94 illustrated in FIG. 1 to the light emitter 91 and the pixel-array area. Then, at Step S13 in FIG. 3, the range is again measured in the condition illustrated by FIG. 10 (b). FIG. 10 (b) is the drive-timing chart when the repetitive-cycle time $T_c=T_c(i_b)$ is two times longer than the repetitive-cycle time $T_c$ of FIG. 10 (c). A representation that the repetitive-cycle time $T_c$ is "two times" or "four times" shall not be construed as limiting the technical idea of the present invention, because the multiples represented by FIGS. 10 (a) to (c) are mere examples, in the meaning that the drive-timing chart can be appropriately modified, by arbitrarily changing the periods of the repetitive-cycle time $T_c$.

For the condition represented by FIG. 10 (b), because the half period of the repetitive-cycle time $T_c=T_c(i_b)$ is the light-projection time $T_o=T_o(i_b)$ and the charge-accumulation time $T_a$, respectively, the light-projection time $T_o=T_o(i_b)$ and the charge-accumulation time $T_a$ are changed synchronously with the repetitive-cycle time $T_c$. On the other hand, the charge-transfer time $T_o$, does not synchronize with the repetitive-cycle time $T_c$, and therefore, the repetitive-cycle time $T_c$ does not change the charge-transfer time $T_{on}$. Even for the condition represented by FIG. 10 (b), the range can be calculated. However, the rate of the signal-charge amount that is transferred between the third EFC electrode pair (33a, 33b) and accumulated in the third charge-accumulation region 23c is still smaller than the rate of the signal-charge amount that is transferred between the second EFC electrode pair (32a, 32b) and accumulated in the second charge-accumulation region 23b. Thus, the distance-precision level becomes low. Therefore, at Step S14 in FIG. 3, the set-value judging-circuit judges that the drive-condition illustrated in FIG. 10 (b) is not correct. If "NO" is judged for the condition represented by FIG. 10 (b), namely, if the agreed-answer (Yes) is obtained in the flowchart illustrated in FIG. 3, the data is not transmitted to the output unit 74.

At Step S14, if "NO" is judged by the set-value judging-circuit for the condition represented by FIG. 10 (b), the data is again transmitted to the control processor 73a. At Steps S15 and S16, as indicated by the condition illustrated in FIG. 10 (c), the control processor 73a modifies the drive-condition by further reducing the light-projection time $T_o$ and the repetitive-cycle time $T_c$. After that, again at Step S13, the calculation operation of the range is performed so that the range can be measured. For the condition represented by FIG. 10 (c), because the half period of the repetitive-cycle time $T_c=T_c(i_{b+1})$ is the light-projection time $T_o=T_o(i_{b+1})$ and the charge-accumulation time $T_a$, the light-projection time $T_o=T_o(i_{b+1})$ and the charge-accumulation time $T_a$ are changed synchronously with the repetitive-cycle time $T_c$. On the other hand, the charge-transfer time $T_{on}$ does not synchronize with the repetitive-cycle time $T_c(i)$, and therefore, the repetitive-cycle time $T_c(i)$ does not change the charge-transfer time $T_{on}$. In the lock-in pixel of optical-pulse synchronized architecture, the charge-accumulation time $T_a$=the light-projection time $T_o$, in many cases. Also, FIG. 10 (c) indicates the available shortest repetitive-cycle time $T_c$ in the example.

For the condition represented by FIG. 10 (c), as can be understood from the drive-timing chart, the range can be calculated, and the difference between the rate of the signal-charge amount accumulated in the second charge-accumulation region 23b transported through the charge-transfer route between the second EFC electrode pair (32a, 32b) and the rate of the signal-charge amount accumulated in the third charge-accumulation region 23c transported through the charge-transfer route between the third EFC electrode pair (33a, 33b) is small, which makes the distance-precision level higher. Therefore, at Step S14 in FIG. 3, the set-value judging-circuit 732 judges that the drive-condition illustrated in FIG. 10 (c) is correct, and the range-image output-controller 734 feeds the calculated result of the range to the output unit 74. Then, the collateral information may be fed to the output unit 74 at the same time.

As explained in FIG. 5, the charge-accumulation time $T_a$ differs from the time in which each of the driving voltages G1, G2 and G3 is at high level. As illustrated in FIG. 10, the charge-accumulation time $T_a$ is an interval between a time when the previous driving voltage GD changes to low level and a time when the next driving voltage G1 changes to low level, an interval between a time when the previous driving voltage G1 changes to low level and a time when the next driving voltage G2 changes to low level, or an interval between a time when the previous driving voltage G2 changes to low level and a time when the next driving voltage G3 changes to low level. Therefore, it is enough that the charge-transfer time $T_o$ in which each of the driving voltages G1, G2 and G3 is at high level has a longer time than the time, in which the signal charge can be transferred by the first EFC electrode pair (31a, 31b), the second EFC electrode pair (32a, 32b) and the third EFC electrode pair (33a, 33b).

From the above explanations, in the drive-adjusting method of the range-measuring device pertaining to the variation of the first embodiment, as illustrated in FIGS. 10 (a) to (c), it is enough that the charge-transfer times $T_{on}$, in which each of the driving voltages G1, G2 and G3 is at high level, have the same time, regardless of the variations in repetitive-cycle time $T_c$. According to the drive-adjusting method of the range-measuring device pertaining to the variation of the first embodiment, the precision is made higher, as compared with the conventional driving. In particular, as to a case of a ranging sensor (range-measuring element), the distance-precision level is made higher.

As mentioned above, according to the range-measuring device pertaining to the variation of the first embodiment, the range-measuring device uses the electric field control by the SI effect of the lateral direction (that is orthogonal to the direction of the charge-transfer route), as compared with a case when each pixel (photoelectric-conversion element) uses the conventional MOS structure and controls the potential just under the gate electrode in a vertical direction (upright direction to main surface of the semiconductor substrate). Thus, the signal charges are transported at high-speed while keeping the symmetry of transport directions, in such a way that the electric field is kept substantially constant over the long distance of the charge-transfer route. Therefore, by applying the technical idea of the range-measuring device pertaining to the variation of the first embodiment to a TOF range sensor (range-measuring element), the range can be measured more accurately. Moreover, as a result that the symmetry of the charge-transfer routes is excellent, it is also less susceptible to the displacement of mask alignment. Also, as compared with a range image sensor using a conventional buried photodiode, naturally, the X-shape topology of the charge-transfer route can be easily adopted, which can create a symmetry of high level. In the adoption of the X-shape topology, the length of the charge-transfer route can be made long. And therefore, according to the range-measuring device pertaining to the variation of the first embodiment, the effective light-receiving area can be made larger, which achieves the higher sensibility.

Second Embodiment

Figure 11:
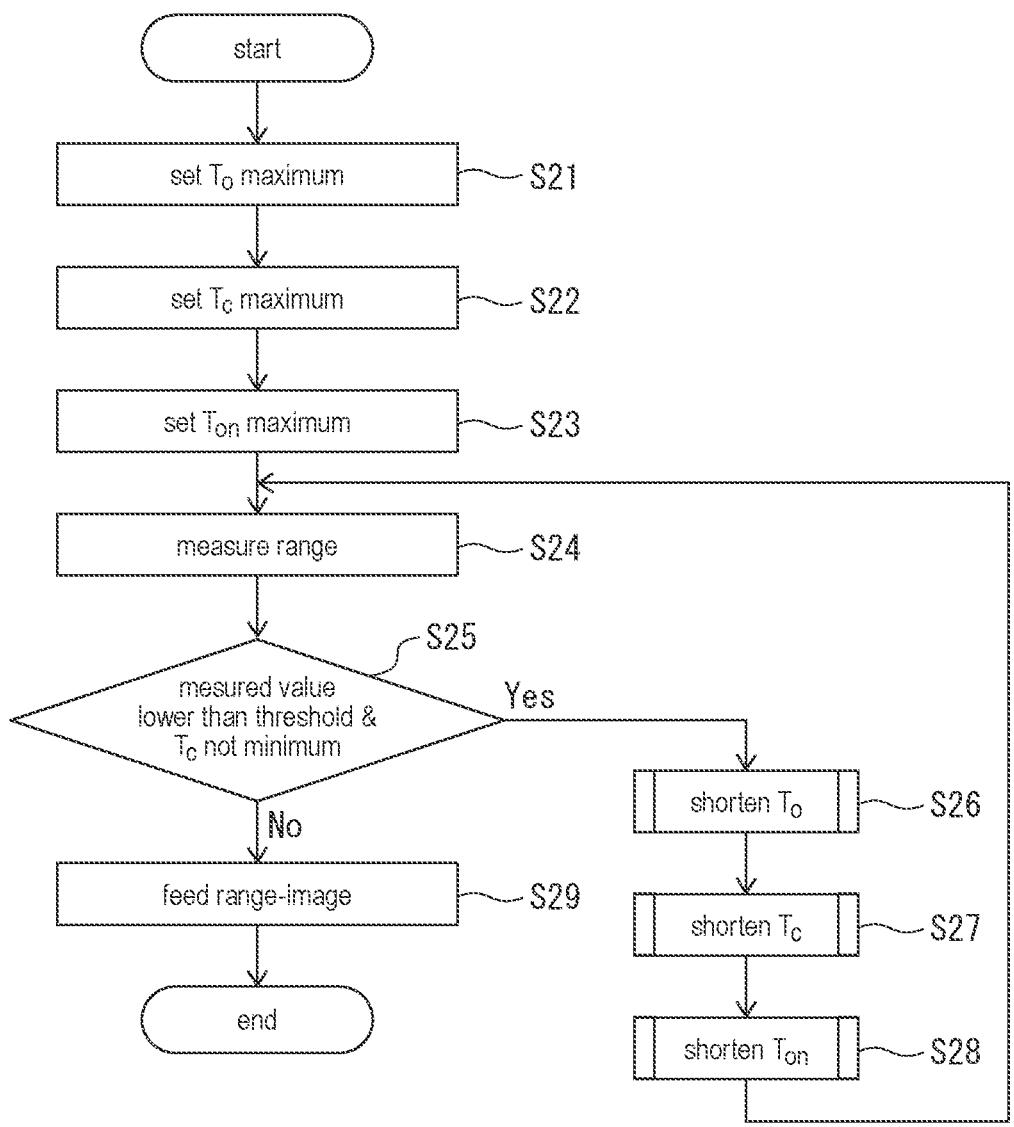
FIG. 11 is a flowchart explaining an outline of a flow in an adjusting operation by a peripheral circuit of a range-measuring device pertaining to a second embodiment of the present invention.

A range-measuring device pertaining to a second embodiment of the present invention is approximately same as the configuration of the range-measuring device of the first embodiment illustrated in FIGS. 1 and 2. However, the outline of operations of a control processor 73a of the range-measuring device pertaining to the second embodiment becomes an operation based on a flowchart as illustrated in FIG. 11. Thus, the adjusting operations of the range-measuring device according to the second embodiment differs from the adjusting operation of the range-measuring device of the first embodiment illustrated in FIG. 3. At Step S21 in FIG. 11, the time-setting logical-circuit 731 in the control processor 73a sets the light-projection time $T_o$ to a maximum value. Continuously, at Step S22, the time-setting logical-circuit 731 sets the repetitive-cycle time $T_c$ to a maximum value.

Moreover, at Step S23, the time-setting logical-circuit 731 sets the charge-transfer time $T_{on}$ to a maximum value. The set-time output-controller 733 feeds the set light-projection time $T_o$, repetitive-cycle time $T_c$ and charge-transfer time $T_{on}$ as the control signals transmitted through the interface 75 illustrated in FIG. 1 to the driver 94. In response to the control signals transmitted via the driver 94 from the set-time output-controller 733 in the control processor 73a, the pulsed lights are emitted from the light emitter 91. In the pulsed light emission, for example, the near-infrared LD or the near-infrared LED is used. The pulsed lights reflected by the target 92 are irradiated through the lens 93, BPF or others to the pixel-array area ($X_{11}$ to $X_{1m}$; $X_{21}$ to $X_{2m}$; --- ---; $X_{n1}$ to $X_{nm}$) illustrated in FIG. 1.

At Step S24 in FIG. 11, the operations of the respective pixels $X_{ij}$ of the pixel-array area ($X_{11}$ to $X_{1m}$; $X_{21}$ to $X_{2m}$; --- ---; $X_{n1}$ to $X_{nm}$) are controlled by the driver 94. That is, at Step S24, the electrons (photoelectrons) generated by the received-lights in respective pixels $X_{ij}$ are controlled to be driven by the control signals transmitted via the driver 94 from the time-setting logical-circuit 731 in the control processor 73a. Therefore, at Step S24, the output signals from the pixel-array area ($X_{11}$ to $X_{1m}$; $X_{21}$ to $X_{2m}$; --- ---; $X_{n1}$ to $X_{nm}$) are transmitted through the output buffers 97 and 98 to the range calculator 71. At Step S24, the range calculator 71 calculates a range with signals supplied from each pixel $X_{ij}$ of the pixel-array area ($X_{11}$ to $X_{1m}$; $X_{21}$ to $X_{2m}$; --- ---; $X_{n1}$ to $X_{nm}$), and measures the range. At Step S24, the range calculator 71 further sends the calculated result of the range and the collateral information associated with the calculated result to the time-setting logical-circuit 731 in the control processor 73a. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S25 in FIG. 11, the set-value judging-circuit 732 in the control processor 73a judges whether the drive-setting is correct, using the calculated result of the range and the collateral information associated with the calculated result, which are fed from the range calculator 71. At Step S25, if the set-value judging-circuit 732 judges the value of the drive setting as "NO", the data is transmitted to the time-setting logical-circuit 731 in the control processor 73a. The time-setting logical-circuit 731 reduces the light-projection time $T_o$, at Step S26 in FIG. 11. Continuously, at Step S27, the time-setting logical-circuit 731 reduces the repetitive-cycle time $T_c$. Moreover, at Step S28, the time-setting logical-circuit 731 reduces the charge-transfer time $T_{on}$.

The light-projection time $T_o$, the repetitive-cycle time $T_c$ and the charge-transfer time $T_{on}$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$), and the range is measured at Step S24 in FIG. 11. After that, the loops that return to Step S24 through Steps S24, S25, S26, S26, S27 and S28 are repeated until the set-value judging-circuit 732 judges the values of drive-settings as "OK", as Step S25. And, if the set-value judging-circuit 732 judges the values of drive-settings as "OK" at Step S29, the range-image output-controller 734 in the control processor 73a transfers the data to the output unit 74, and the output signals are delivered from the output unit 74.

Figure 12:
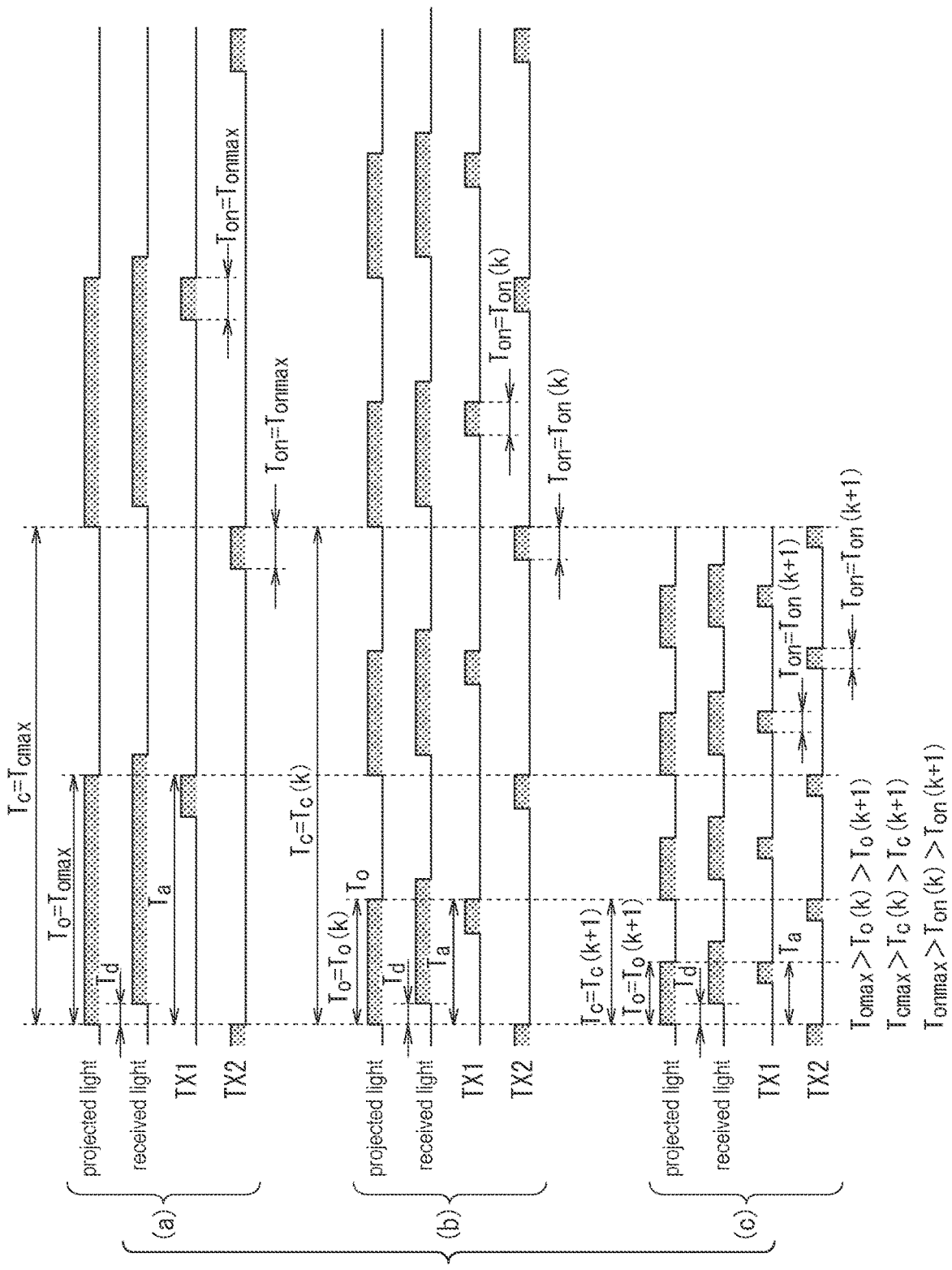
FIG. 12 is a drive-timing chart explaining the outline of the flow in the adjusting operation of the range-measuring device pertaining to the second embodiment, which is based on the flowchart in FIG. 11.

FIGS. 12 (a) to (c) exemplify the drive-timing charts in which the driving methods of the range-measuring device pertaining to the second embodiment are modified by instructions prescribed by the program, in accordance with the flow represented by the flowchart illustrated in FIG. 11. At first, at Step S21 in the flowchart illustrated in FIG. 11, the time-setting logical-circuit 731 in the control processor 73a in FIG. 2 sets the light-projection time $T_o$ to a maximum value $T_{omax}$. Continuously, at Step S22, the time-setting logical-circuit 731 sets the repetitive-cycle time $T_c$ to a maximum value. The set-time output-controller 733 feeds the set light-projection time $T_o$ and repetitive-cycle time $T_c$ as the control signals transmitted through the interface 75 illustrated in FIG. 1 to the driver 94, and the pulsed lights are emitted from the light emitter 91, and the range-measuring device pertaining to the second embodiment is accordingly driven.

The drive-timing charts explaining the adjust-operations of the range-measuring device pertaining to the second embodiment illustrated in FIG. 12 for a case when the range to the target 92 illustrated in FIG. 1 is short. Thus, the delay time $T_d$ of the received light is very small. At Step S24 in FIG. 11, the range calculator 71 calculates the range by Eq. (1), using data of the difference between the signal charges transferred through the transfer channels just under the first charge-transfer gate 16a and the second charge-transfer gate 16b, which serve as the distributing gates, under the drive of the range-measuring device pertaining to the second embodiment. The calculated result of the range, which is ascribable to the range calculator 71, together with the collateral information are once stored in the data memory 72. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S25 in FIG. 11, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. For the condition represented by FIG. 12 (a), as can be understood from the drive-timing chart, although the range can be calculated, the rate of the signal-charge amount accumulated in the second charge-accumulation region 23b transferred by the second charge-transfer gate 16b is very smaller than the rate of the signal-charge amount accumulated in the first charge-accumulation region 23a transferred by the first charge-transfer gate 16a. Thus, the distance-precision level is low.

In advance, by determining the threshold in view of the rates of the signal-charge amounts, and by storing the data of thresholds in the data memory 72, at Step S25, the drive-condition illustrated in FIG. 12 (a) can be judged to be not correct. Or, for example, in a case that the thresholds are defined previously for the calculated distances in the respective drive-conditions, by storing the data of thresholds in the data memory 72, the set-value judging-circuit 732 may read out the data of thresholds from the data memory 72 and judge whether or not the light-projection time $T_o$, the repetitive-cycle time $T_c$ and the charge-transfer time $T_{on}$ are correct.

At step S25, if "NO" is judged by the set-value judging-circuit for the condition represented by FIG. 12 (a), namely, if the agreed-answer (Yes) is obtained in the flowchart illustrated in FIG. 11, the data is not transmitted to the output unit 74. If the agreed-answer (Yes) is obtained in the flowchart illustrated in FIG. 11, the light-projection time $T_o$ is reduced at Step S26 in FIG. 11. Continuously, at Step S27, the time-setting logical-circuit 731 reduces the repetitive-cycle time $T_c=T_{cmax}$ and reduces the charge-transfer time $T_o=T_{omax}$. The light-projection time $T_o=T_{omax}$, the repetitive-cycle time $T_c$ and the charge-transfer time $T_{on}$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$). Then, at Step S24 in FIG. 11, the range is again measured in the condition illustrated by FIG. 12 (b).

For the condition represented by FIG. 12 (b), the half period of the repetitive-cycle time $T_c=T_c(k)$ is the light-projection time $T_o=T_o(k)$ and the charge-accumulation time $T_a$. Thus, the light-projection time $T_o=T_o(k)$ and the charge-accumulation time $T_a$ are changed synchronously with the repetitive-cycle time $T_c$. On the other hand, the charge-transfer time $T_{on}$ does not synchronize with the repetitive-cycle time $T_c$, and the repetitive-cycle time $T_c$ exhibits a different change from the charge-transfer time $T_{on}$. In the range-measuring device pertaining to the second embodiment, each of the repetitive-cycle time $T_c$ is reduced to fraction ½, for example, from the condition of FIG. 12 (a) to the condition of FIG. 12 (b). However, the charge-transfer time $T_{on}$ is reduced by a rate of about 70%, from the condition of FIG. 12 (a) to the condition of FIG. 12 (b). Even for the condition represented by FIG. 12 (b), the range can be calculated. However, the rate of the signal-charge amount transported just under the second charge-transfer gate 16b and accumulated in the second charge-accumulation region 23b is still smaller than the rate of the signal-charge amount transported just under the first charge-transfer gate 16a and accumulated in the first charge-accumulation region 23a. Thus, the distance-precision level becomes low. Therefore, at Step S25 in FIG. 11, the set-value judging-circuit 732 judges that the drive-condition illustrated in FIG. 12 (b) is not correct. If "NO" is judged for the condition represented by FIG. 12 (b), namely, if the agreed-answer (Yes) is obtained in the flowchart illustrated in FIG. 11, the data is not transmitted to the output unit 74.

At Step S25, if for the condition represented by FIG. 12 (b), "NO" is judged by the set-value judging-circuit 732, the data is again transmitted to the control processor 73a. At Steps S26, S27 and S28, as indicated by the condition illustrated in FIG. 12 (c), the control processor 73a further reduces the light-projection time $T_o=T_o(k)$, the repetitive-cycle time $T_c=T_c(k)$ and the charge-transfer time $T_{on}(k)$. After that, again at Step S24, the calculation operation of the range is performed so that the range can be measured. For the condition represented by FIG. 12 (c), the half period of the repetitive-cycle time $T_c=T_c(k+1)$ is the light-projection time $T_o=T_o(k+1)$ and the charge-accumulation time $T_a$. Thus, the light-projection time $T_o=T_o(k+1)$ and the charge-accumulation time $T_a$ are changed synchronously with the repetitive-cycle time $T_c$. On the other hand, the charge-transfer time $T_{on}$ does not synchronize with the repetitive-cycle time $T_c$, and the repetitive-cycle time $T_c$ exhibits a different change from the charge-transfer time $T_{on}$.

In the range-measuring device pertaining to the second embodiment, the repetitive-cycle time $T_c$ is reduced to fraction ½, for example, from the condition of FIG. 12 (b) to the condition of FIG. 12 (c). However, the charge-transfer time $T_{on}$ is reduced to fraction ½, from the condition of FIG. 12 (a) to the condition of FIG. 12 (c), and from the condition of FIG. 12 (b) to the condition of FIG. 12 (c), the charge-transfer time $T_{on}$ is reduced by a rate of about 70%. And, at the condition of FIG. 12 (c) that exhibits the minimum repetitive-cycle times, the charge-transfer time $T_{on}$ is also set to an available minimum charge-transfer time $T_{on}$ that enables the operation of the range-measuring element.

In the condition represented by FIG. 12 (c), the range can be calculated, as can be understood from the drive-timing chart, and the difference between the rate of the signal-charge amount transported just under the first charge-transfer gate 16a and accumulated in the first charge-accumulation region 23a and the rate of the signal-charge amount transported just under the second charge-transfer gate 16b and accumulated in the second charge-accumulation region 23b is small, which makes the distance-precision level higher. Therefore, at Step S25 in FIG. 11, the set-value judging-circuit 732 judges that the drive-condition illustrated in FIG. 12 (c) is correct, and the range-image output-controller 734 feeds the calculated result of the range to the output unit 74. Then, the collateral information may be fed to the output unit 74 at the same time.

As mentioned above, according to the range-measuring device pertaining to the second embodiment of the present invention, an on-period $T_{on}$ can be intentionally shorten within the on/off-period of the first charge-transfer gate 16a and the second charge-transfer gate 16b, which serve as the distributing gates, respectively, in accordance with the procedure of the flowchart illustrated in FIG. 11. According to the range-measuring device pertaining to the second embodiment of the present invention, the quick voltage-switching operations (on/off-switching operations) in the first charge-transfer gate 16a and the second charge-transfer gate 16b for executing the charge distribution are relaxed, respectively, which makes the operational margin of the driver 94 wider, and it becomes easy to design and manufacture the 3D imaging device. According to the range-measuring device pertaining to the second embodiment of the present invention, for example, the global wiring on the pixels implementing the 3D imaging device can be slimmed, which can increase the opening rate of each pixel. Moreover, for example, by making the structure of the transistors of the driver 94 finer and finer, it is possible to reduce the chip area.

Variation of Second Embodiment

Although the illustration is omitted, similarly to the illustration of the plan view in FIG. 9, each pixel of a range-measuring device pertaining to a variation of the second embodiment of the present invention includes a first EFC electrode pair (31a, 31b), a second EFC electrode pair (32a, 32b), a third EFC electrode pair (33a, 33b) and a fourth EFC electrode pair (34a, 34b), which are arranged at four positions symmetric with respect to the central position of the light-receiving region, separately from each other, so as to surround the light-receiving region. And each of the first EFC electrode pair (31a, 31b), the second EFC electrode pair (32a, 32b), the third EFC electrode pair (33a, 33b) and the fourth EFC electrode pair (34a, 34b) are disposed in pairs, respectively, on both sides of one of the charge-transfer routes, each of the charge-transfer routes extends in diagonal directions to implement X-shape.

Figure 13:
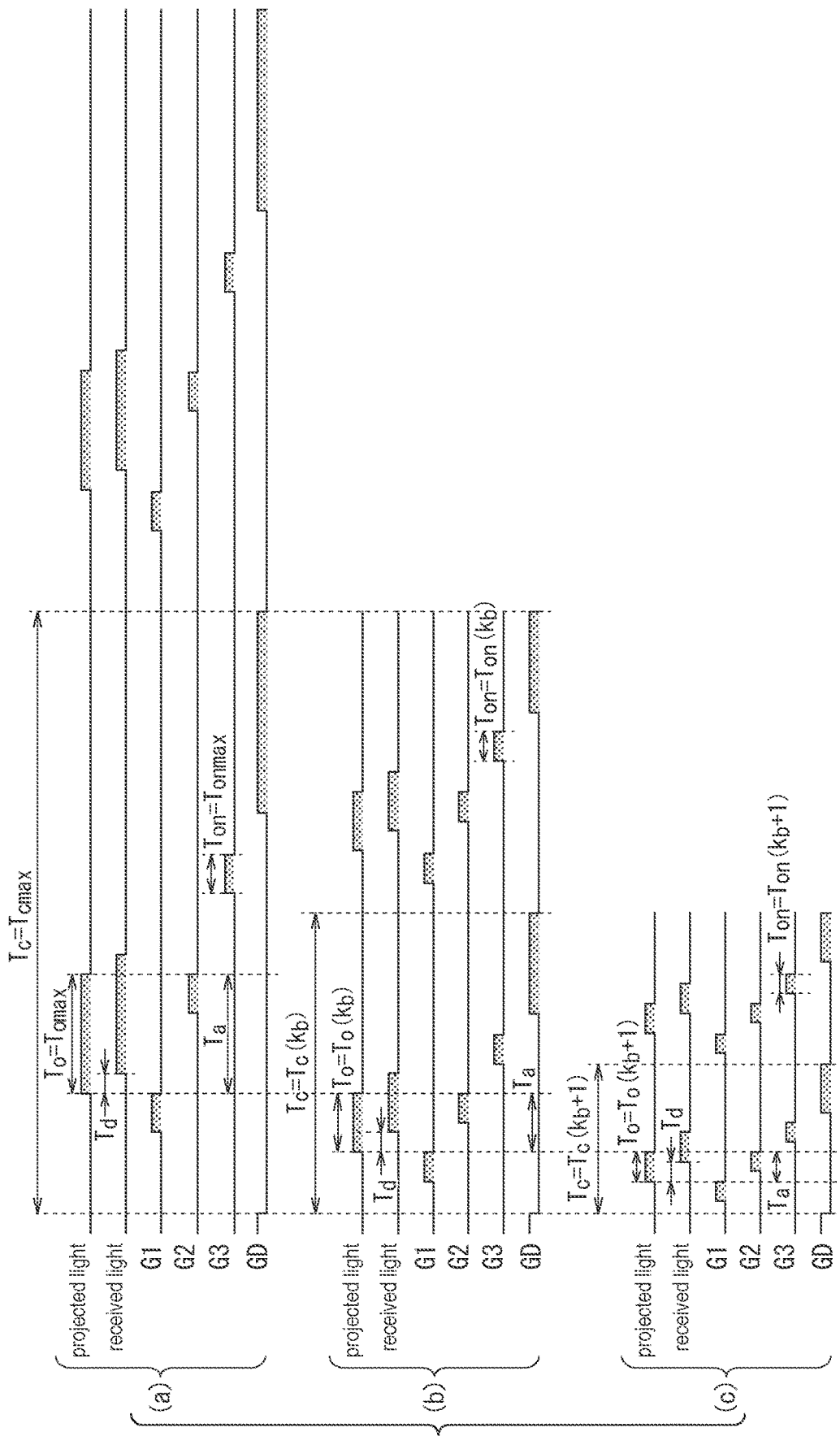
FIG. 13 is a drive-timing chart explaining an outline of a flow in an adjusting operation of a solid-state imaging device pertaining to a variation (a case of 3 taps) of the second embodiment, which is based on the flowchart in FIG. 11.

In the pixel of the range-measuring device pertaining to the variation of the second embodiment, as illustrated in FIGS. 13 (a) to (c), the first transfer signal G1, the second transfer signal G2, the third transfer signal G3 and the exhausting signal GD are cyclically applied as electric-field control-pulses to the first EFC electrode pair (31a, 31b), the second EFC electrode pair (32a, 32b), the third EFC electrode pair (33a, 33b) and the fourth EFC electrode pair (34a, 34b). Then, the depletion potential of the surface-buried region 22 is alternately changed. Accordingly, the potential gradient towards the direction in which the charges are transported is alternately generated in any of the charge-transfer routes. Accordingly, the transport destinations of the signal charges generated in the surface-buried region 22 are controlled to be sequentially set to any of the first charge-accumulation region 23a, the second charge-accumulation region 23b, the third charge-accumulation region 23c and the fourth charge-accumulation region 23d.

The drive-timing charts illustrated in FIGS. 13 (a) to (c) indicate cases when the range to the target 92 illustrated in FIG. 1 is short. Thus, the delay time $T_d$ of the received light is very small. At Step S21 in FIG. 11, the time-setting logical-circuit 731 in the control processor 73a sets the light-projection time $T_o$ to a maximum value $T_{omax}$. Continuously, at Step S22, the time-setting logical-circuit 731 sets the repetitive-cycle time $T_c$ to a maximum value. Moreover, at Step S23, the time-setting logical-circuit 731 sets the repetitive-cycle time $T_c$ to a maximum value. The set-time output-controller 733 feeds the set light-projection time $T_o$, repetitive-cycle time $T_c$ and charge-transfer time $T_{on}$ as the control signals transmitted through the interface 75 illustrated in FIG. 1 to the driver 94. In response to the control signals transmitted via the driver 94 from the set-time output-controller 733 in the control processor 73a, the pulsed light is emitted from the light emitter 91.

At Step S24 in FIG. 11, the operations of the respective pixels $X_{ij}$ of the pixel-array area are controlled by the driver 94. That is, at Step S24, the electrons (photoelectrons) generated by the received-lights in respective pixels $X_{ij}$ are controlled by the control signals transmitted via the driver 94 from the time-setting logical-circuit 731 in the control processor 73a. Namely, electrons are driven by, and the movement of electrons are controlled by the control signals applied from the time-setting logical-circuit 731. Therefore, at Step S24, the output signals from the pixel-array area are transmitted, through the output buffers 97 and 98, to the range calculator 71. At Step S24, the range calculator 71 calculates the range, using the data of the signals transmitted from each pixels $X_{ij}$ of the pixel-array area, and measures the range. At Step S24, the range calculator 71 further sends the calculated result of the range and the collateral information associated with the calculated result to the time-setting logical-circuit 731 in the control processor 73a. Here, the collateral information includes, for example, the output data obtained from the first charge-accumulation region 23a, the second charge-accumulation region 23b, the third charge-accumulation region 23c and the fourth charge-accumulation region 23d of each pixel $X_{ij}$, and the difference data between the output values of the first charge-accumulation region 23a, the second charge-accumulation region 23b, the third charge-accumulation region 23c and the fourth charge-accumulation region 23d of each pixel $X_{ij}$.

At Step S25 in FIG. 11, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. For the condition represented by FIG. 13 (*a*), as can be understood from the drive-timing chart, although the range can be calculated, the rate of the signal-charge amount accumulated in the third charge-accumulation region 23c transported through the charge-transfer route between the third EFC electrode pair (33a, 33b) is very smaller than the rate of the signal-charge amount accumulated in the second charge-accumulation region 23b transported through the charge-transfer route between the second EFC electrode pair (32a, 32b) serving as the distributing gates. Thus, the distance-precision level is low. In advance, by determining the threshold from the data of the signal-charge amount, and by storing the data of thresholds in the data memory 72, at Step S24, the drive-condition illustrated in FIG. 13 (*a*) is judged to be not correct. Or, for example, in a case that the thresholds are defined previously for the calculated distances in the respective drive-conditions, by storing the data of thresholds in the data memory 72, in advance, because the set-value judging-circuit 732 can read out the data of thresholds from the data memory 72, the set-value judging-circuit 732 may judge whether or not the light-projection time $T_o$ and the repetitive-cycle time $T_c$ are correct.

At step S25, if "NO" is judged by the set-value judging-circuit 732 for the condition represented by FIG. 13 (*a*), namely, if the agreed-answer (Yes) is obtained in the flowchart illustrated in FIG. 11, the data is not transmitted to the output unit 74. If the agreed-answer (Yes) is obtained in the flowchart illustrated in FIG. 11, the light-projection time $T_o = T_{omax}$ is reduced at Step S26 in FIG. 11. Continuously, at Step S27, the time-setting logical-circuit 731 reduces the repetitive-cycle time $T_c = T_{cmax}$. At Step S28, the time-setting logical-circuit 731 reduces the charge-transfer time $T_{on} = T_{onmax}$. In the range-measuring device pertaining to the variation of the second embodiment, the repetitive-cycle time $T_c$ is reduced to fraction ½, for example, from the condition of FIG. 13 (*a*) to the condition of FIG. 13 (*b*). The light-projection time $T_o$, the repetitive-cycle time $T_c$ and the charge-transfer time $T_{on}$ are reduced, and the control signals, in which the drive-conditions are modified, are transmitted from the driver 94 illustrated in FIG. 1 to the light emitter 91 and the pixel-array area. Then, at Step S23 in FIG. 11, the range is again measured for the condition represented by FIG. 13 (*b*). FIG. 13 (*b*) is the drive-timing chart when the repetitive-cycle time $T_c = T_c(k_b)$ is two times longer than the repetitive-cycle time $T_c(k_b+1)$ in FIG. 13 (*c*). A representation that the repetitive-cycle time $T_c$ is two times or four times is merely the exemplification. A representation that the repetitive-cycle time $T_c$ is "two times" or "four times" shall not be construed as limiting the technical idea of the present invention, because the multiples represented by FIGS. 13 (*a*) to (*c*) are mere examples, in the meaning that the drive-timing chart can be appropriately modified, by arbitrarily changing the periods of the repetitive-cycle time $T_c$.

Even for the condition represented by FIG. 13 (*b*), the range can be calculated. However, the rate of the signal-charge amount transported in the charge-transfer route between the third EFC electrode pair (33a, 33b) and accumulated in the third charge-accumulation region 23c is still smaller than the rate of the signal-charge amount transported in the charge-transfer route between the second EFC electrode pair (32a, 32b) and accumulated in the second charge-accumulation region 23b. Thus, the distance-precision level becomes low. Therefore, at Step S24 in FIG. 11, the set-value judging-circuit 732 judges that the drive-condition illustrated in FIG. 13 (*b*) is not correct. If "NO" is judged for the condition represented by FIG. 13 (*b*), namely, if the agreed-answer (Yes) is obtained in the flowchart illustrated in FIG. 11, the data is not transmitted to the output unit 74.

At Step S24, if "NO" is judged by the set-value judging-circuit for the condition represented by FIG. 13 (*b*), the data is again transmitted to the control processor 73a. At Steps S25 and S26, as indicated by the condition illustrated in FIG. 13 (*c*), the control processor 73a modifies the drive-condition by further reducing the light-projection time $T_o = T_o(k_b)$ and the repetitive-cycle time $T_c = T_c(k_b)$. Moreover, at Step S28, the time-setting logical-circuit 731 reduces the charge-transfer time $T_{on} = T_{on}(k_b)$. The charge-transfer time $T_{on}$ is reduced to fraction ½, from the condition of FIG. 13 (*a*) to the condition of FIG. 13 (*c*). And, from the condition of FIG. 13 (*b*) to the condition of FIG. 13 (*c*), the charge-transfer time $T_{on}$ is reduced by a rate of about 70%. And, at the condition of FIG. 13 (*c*) that exhibits the minimum repetitive-cycle times. The charge-transfer time $T_{on} = T_{on}(k_b+1)$ is also set to an available minimum charge-transfer time $T_{on} = T_{onmin}$ that enables the operation of the range-measuring element.

After that, again at Step S24, the calculation operation of the range is performed so that the range can be measured. In the condition represented by FIG. 13 (*c*), as can be understood from the drive-timing chart, although the range can be measured, the difference between the rate of the signal-charge amount accumulated in the second charge-accumulation region 23b transported through the charge-transfer route between the second EFC electrode pair (32a, 32b) and the rate of the signal-charge amount accumulated in the third charge-accumulation region 23c transported through the charge-transfer route between the third EFC electrode pair (33a, 33b) is small, which makes the distance-precision level higher. Therefore, at Step S24 in FIG. 11, the set-value judging-circuit 732 judges that the drive-condition illustrated in FIG. 13 (*c*) is correct, and the range-image output-controller 734 feeds the calculated result of the range to the output unit 74. Then, the collateral information may be fed to the output unit 74 at the same time.

As mentioned above, according to the range-measuring device pertaining to the variation of the second embodiment, the range-measuring device uses the electric field control by the SI effect of the lateral direction (that is orthogonal to the direction of the charge-transfer route), as compared with the case when each pixel (photoelectric-conversion element) uses the conventional MOS structure and controls the potential just under the gate electrode in the vertical direction (upright direction to main surface of the semiconductor substrate). Thus, the signal charges are transported at the high-speed while keeping the symmetry of transport directions, in such a way that the electric field is kept substantially constant over the long distance of the charge-transfer route. Therefore, by applying the range-measuring device pertaining to the variation of the second embodiment to the TOF range sensor (range-measuring element), the range can be measured more accurately. Moreover, as the result that the symmetry of the charge-transfer routes is excellent, it is also less susceptible to the displacement of mask alignment. Also, as compared with a range image sensor using a conventional buried photodiode, naturally, the X-shape topology of the charge-transfer route can be easily adopted, which can create a symmetry of high level. In the adoption of the X-shape topology, the length of the charge-transfer route can be made long. And therefore, according to the range-measuring device pertaining to the variation of the second embodiment, the effective light-receiving area can be made larger, which achieves the higher sensitivity.

Third Embodiment

A range-measuring device pertaining to a third embodiment of the present invention is approximately same as the configuration of the range-measuring device of the first embodiment illustrated in FIGS. 1 and 2. However, the outline of an operation of a control processor 73a of the range-measuring device pertaining to the third embodiment becomes the operation based on the flowchart as illustrated in FIG. 11. Thus, the adjusting operation of range-measuring device pertaining to the third embodiment differs from the adjusting operation of the range-measuring device of the first embodiment illustrated in FIG. 3. At Step S21 in FIG. 11, the time-setting logical-circuit 731 in the control processor 73a sets the light-projection time $T_o$ to a maximum value. Continuously, at Step S22, the time-setting logical-circuit 731 sets the repetitive-cycle time $T_c$ to a maximum value.

Moreover, at Step S23, the charge-transfer time $T_{on}$ is set to a maximum value. The set-time output-controller 733 feeds the set light-projection time $T_o=T_{omax}$, repetitive-cycle time $T_c=T_{cmax}$, charge-accumulation time $T_a$ and charge-transfer time $T_{on}$ as the control signals transmitted through the interface 75 illustrated in FIG. 1 to the driver 94. In response to the control signals transmitted via the driver 94 from the set-time output-controller 733 in the control processor 73a, the pulsed lights are emitted from the light emitter 91. In the pulsed light emission, for example, the near-infrared LD or the near-infrared LED is used. The pulsed lights reflected by the target 92 are irradiated through the lens 93, BPF or others to the pixel-array area ($X_{11}$ to $X_{1m}$; $X_{21}$ to $X_{2m}$; --- ---; $X_{n1}$ to $X_{nm}$) illustrated in FIG. 1.

At Step S24 in FIG. 11, the operations of the respective pixels $X_{ij}$ of the pixel-array area ($X_{11}$ to $X_{1m}$; $X_{21}$ to $X_{2m}$; --- ---; $X_{n1}$ to $X_{nm}$) are controlled by the driver 94. That is, at Step S24, the electrons (photoelectrons) generated by the received-lights in respective pixels $X_{ij}$ are controlled by the control signals transmitted via the driver 94 from the time-setting logical-circuit 731 in the control processor 73a. Namely, electrons are driven by, and the movement of electrons are controlled by the control signals applied from the time-setting logical-circuit 731. Therefore, at Step S24, the output signals from the pixel-array area ($X_{11}$ to $X_{1m}$; $X_{21}$ to $X_{2m}$; --- ---; $X_{n1}$ to $X_{nm}$) are transmitted through the output buffers 97 and 98 to the range calculator 71. At Step S35, the range calculator 71 calculates the range, using the data of the signals transmitted from each pixels $X_{ij}$ of the pixel-array area ($X_{11}$ to $X_{1m}$; $X_{21}$ to $X_{2m}$; --- ---; $X_{n1}$ to $X_{nm}$), and measures the range. At Step S24, the range calculator 71 further sends the calculated result of the range and the collateral information associated with the calculated result to the time-setting logical-circuit 731 in the control processor 73a. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S25 in FIG. 11, the set-value judging-circuit 732 in the control processor 73a judges whether the drive-setting is correct, using the calculated result of the range and the collateral information associated with the calculated result, which are fed from the range calculator 71. At Step S25, if the set-value judging-circuit 732 judges the value of the drive setting as "NO", the data is transmitted to the time-setting logical-circuit 731 in the control processor 73a. The time-setting logical-circuit 731 reduces the light-projection time $T_o$, at Step S26 in FIG. 11. Continuously, at Step S27, the time-setting logical-circuit 731 reduces the repetitive-cycle time $T_c$.

Moreover, at Step S28, the time-setting logical-circuit 731 reduces the charge-transfer time $T_{on}$. The light-projection time $T_o$, the repetitive-cycle time $T_c$, the charge-accumulation time $T_a$ and the charge-transfer time $T_{on}$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$), and the range is measured at Step S24 in FIG. 11. After that, the loops that return to Step S24 through Steps S24, S25, S26, S26, S27 and S28 are repeated until the set-value judging-circuit 732 judges the values of drive-settings as "OK", as Step S25. And, if the set-value judging-circuit 732 judges the values of drive-settings as "OK", at Step S29, the range-image output-controller 734 in the control processor 73a transfers the data to the output unit 74, and the output signals are delivered from the output unit 74.

Figure 14:
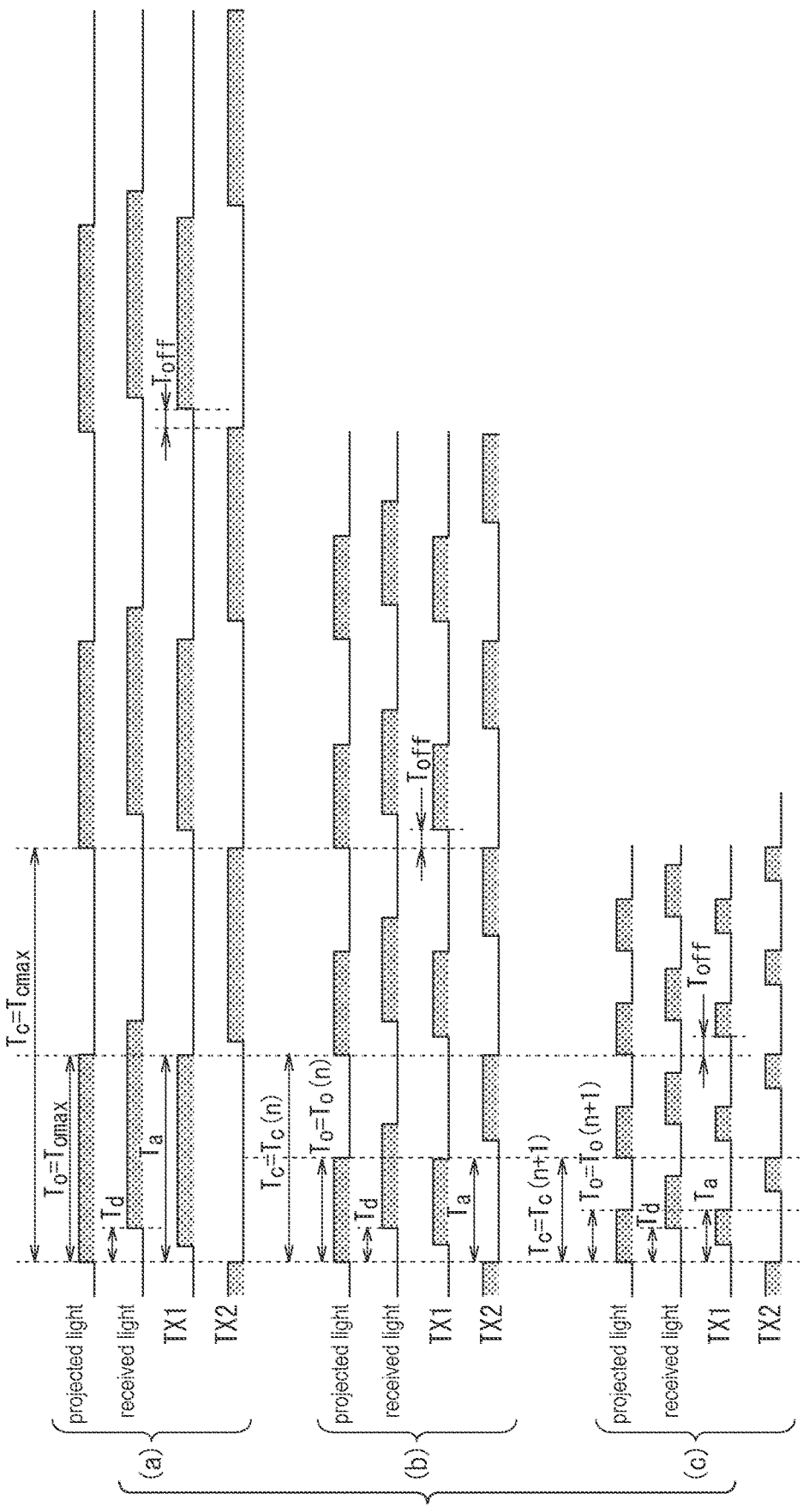
FIG. 14 is a drive-timing chart explaining an outline of a flow in an adjusting operation of a range-measuring device pertaining to a third embodiment, which is based on the flowchart in FIG. 11.

FIG. 14 exemplifies the drive-timing chart in which the driving method of the range-measuring device pertaining to the third embodiment is modified by instructions prescribed by the program, in accordance with the flow represented by the flowchart illustrated in FIG. 11. At first, at Step S21 in the flowchart illustrated in FIG. 11, the time-setting logical-circuit 731 in the control processor 73a in FIG. 2 sets the light-projection time $T_o$ to a maximum value $T_{omax}$. Continuously, at Step S22, the time-setting logical-circuit 731 sets the repetitive-cycle time $T_c$ to a maximum value. The set-time output-controller 733 feeds the set light-projection time $T_0$, charge-accumulation time $T_a$ and repetitive-cycle time $T_c$ as the control signals transmitted through the interface 75 illustrated in FIG. 1 to the driver 94, and the pulsed lights are emitted from the light emitter 91, and the range-measuring device pertaining to the second embodiment is accordingly driven.

The drive-timing chart explaining the adjust-operation of the range-measuring device pertaining to the third embodiment illustrated in FIG. 14 is adjusted illustrates the case when the range to the target 92 illustrated in FIG. 1 is short. Thus, the delay time $T_d$ of the received light is very small. At Step S24 in FIG. 11, the range calculator 71 calculates the range by Eq. (1), using data of the difference between the signal charges transferred through the transfer channels just under the first charge-transfer gate 16a and the second charge-transfer gate 16b, which serve as the distributing gates, respectively, under the drive of the range-measuring device pertaining to the third embodiment. The calculated result of the range, which is ascribable to the range calculator 71, together with the collateral information are once stored in the data memory 72. Here, the collateral information includes, for example, the output data obtained from the first charge-accumulation region 23a and the second charge-accumulation region 23b of each pixel $X_{ij}$, and the difference data between the output values of the first charge-accumulation region 23a and the second charge-accumulation region 23b of each pixel $X_{ij}$.

At Step S25 in FIG. 11, the set-value judging-circuit 732 in the control processor 73a reads out the calculated result of the range, which is ascribable to the range calculator 71, and the collateral information together with data of thresholds from the data memory 72. The set-value judging-circuit 732 judges whether the drive-setting is correct, using the calculated result of the range and the collateral information associated with the calculated result, which are fed from the range calculator 71. For the condition represented by FIG. 14 (a), as can be understood from the drive-timing chart, although the range can be calculated, the rate of the signal-charge amount accumulated in the second charge-accumulation region 23b transferred by the second charge-transfer gate 16b is very smaller than the rate of the signal-charge amount accumulated in the first charge-accumulation region 23a transferred by the first charge-transfer gate 16a. Thus, the distance-precision level is low.

In advance, by determining the threshold in view of the rates of the signal-charge amounts, and by storing the data of thresholds in the data memory 72, at Step S25, the drive-condition illustrated in FIG. 14 (a) is judged to be not correct. Or, for example, in the case that the thresholds are defined previously for the calculated distances in the respective drive-conditions, by storing the data of thresholds in the data memory 72, the set-value judging-circuit 732 may read out the data of thresholds from the data memory 72, and therefore, the set-value judging-circuit 732 can judge whether or not the light-projection time $T_o$, the repetitive-cycle time $T_c$, the charge-accumulation time $T_a$ and the charge-transfer time $T_{on}$ are correct.

At step S25, if "NO" is judged by the set-value judging-circuit for the condition represented by FIG. 12 (a), namely, if the agreed-answer (Yes) is obtained in the flowchart illustrated in FIG. 11, the data is not transmitted to the output unit 74. If the agreed-answer (Yes) is obtained in the flowchart illustrated in FIG. 11, the light-projection time $T_o=T_{omax}$ is reduced at Step S26 in FIG. 11. Continuously, at Step S27, the time-setting logical-circuit 731 reduces the repetitive-cycle time $T_c=T_{cmax}$. The light-projection time $T_o$, the repetitive-cycle time $T_c$, the charge-accumulation time $T_a$ and the charge-transfer time $T_{on}$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$). Then, at Step S25 in FIG. 11, the range is again measured in the condition illustrated by FIG. 14 (b).

For the condition represented by FIG. 14 (b), because the half period of the repetitive-cycle time $T_c=T_c(n)$ is the light-projection time $T_o=T_o(n)$ and the charge-accumulation time $T_a=T_a(n)$, the light-projection time $T_o=T_o(n)$ and the charge-accumulation time $T_a=T_a(n)$ change synchronously with the repetitive-cycle time $T_c$. On the other hand, the charge-transfer time $T_{on}$ does not synchronize with the repetitive-cycle time $T_c$, and the repetitive-cycle time $T_c$ exhibits a different change from the charge-transfer time $T_{on}$. In the range-measuring device pertaining to the third embodiment, the repetitive-cycle time $T_c$ is reduced to fraction ½, for example, from the condition of FIG. 14 (a) to the condition of FIG. 14 (b). However, the charge-transfer time $T_{on}$ is increased larger than fraction ½ so that an offset period $T_{off}$ is not changed, from the condition of FIG. 14 (a) to the condition of FIG. 14 (b).

Even for the condition represented by FIG. 14 (b), the range can be calculated. However, the rate of the signal-charge amount transported just under the second charge-transfer gate 16b and accumulated in the second charge-accumulation region 23b is still smaller than the rate of the signal-charge amount transported just under the first charge-transfer gate 16a and accumulated in the first charge-accumulation region 23a. Thus, the distance-precision level becomes low. Therefore, at Step S36 in FIG. 14, the set-value judging-circuit 732 judges that the drive-condition illustrated in FIG. 14 (b) is not correct. If "NO" is judged for the condition represented by FIG. 14 (b), namely, if the agreed-answer (Yes) is obtained in the flowchart illustrated in FIG. 14, the data is not transmitted to the output unit 74.

At Step S25, if "NO" is judged by the set-value judging-circuit for the condition represented by FIG. 14 (b), the data is again transmitted to the control processor 73a. At Steps S26 and S27, as indicated by the condition illustrated in FIG. 14 (c), the control processor 73a modifies the drive-condition by further reducing the light-projection time $T_o$, the charge-accumulation time $T_a$ and the repetitive-cycle time $T_c$. After that, again at Step S24, the calculation operation of the range is performed so that the range can be measured. For the condition represented by FIG. 14 (c), because the half period of the repetitive-cycle time $T_c=T_c(n+1)$ is the light-projection time $T_o$ and the charge-accumulation time $T_a=T_a(n+1)$, the light-projection time $T_o$ and the charge-accumulation time $T_a=T_a(n+1)$ change synchronously with the repetitive-cycle time $T_c$. On the other hand, the charge-transfer time $T_{on}$ does not synchronize with the repetitive-cycle time $T_c$, and the repetitive-cycle time $T_c$ exhibits a different change from the charge-transfer time $T_{on}$.

In the range-measuring device pertaining to the third embodiment, the repetitive-cycle time $T_c$ is reduced to fraction ½, for example, from the condition of FIG. 14 (b) to the condition of FIG. 14 (c). However, the charge-transfer time $T_{on}$ is increased larger than fraction ½ so that the offset period $T_{off}$ is not changed. And, at the condition of FIG. 14 (c) that exhibits the minimum repetitive-cycle time, the charge-transfer time $T_{on}$ is also set to an available minimum charge-transfer time $T_{on}$ that enables the operation of the range-measuring element.

In the condition represented by FIG. 14 (c), the range can be calculated as can be understood from the drive-timing chart, and the difference between the rate of the signal-charge amount transported just under the first charge-transfer gate 16a and accumulated in the first charge-accumulation region 23a and the rate of the signal-charge amount transported just under the second charge-transfer gate 16b and accumulated in the second charge-accumulation region 23b is small, which makes the distance-precision level higher. Therefore, at Step S36 in FIG. 14, the set-value judging-circuit 732 judges that the drive-condition illustrated in FIG. 14 (c) is correct, and the range-image output-controller 734 feeds the calculated result of the range to the output unit 74. Then, the collateral information may be fed to the output unit 74 at the same time.

Fourth Embodiment

A test-and-adjusting apparatus pertaining to a fourth embodiment of the present invention is directed to perform adjustments and settings at a time of calibration in the pre-shipment test (inspection) of a 3D imaging device, which implements a main portion of a range-measuring device. And furthermore, the test-and-adjusting apparatus pertaining to the fourth embodiment is directed to perform the adjustment-and-setting operations at a time of calibration after shipment. The adjustments and the settings at calibrations in pre-shipment test and after shipment are supposed to improve the drive-conditions and characteristics of the 3D imaging device, considering the variations and dispersions in the manufacturing process. As illustrated in FIG. 15, the 3D imaging device has a structure in which the pixel-array area ($X_{11}$ to $X_{1m}$; $X_{21}$ to $X_{2m}$; --- ---; $X_{n1}$ to $X_{nm}$) and peripheral-circuit area (94 to 96, 99 and $NC_1$ to $NC_m$) are integrated on the same semiconductor chip 6.

As illustrated in FIG. 15, a configuration such that a plurality of pixels $X_{ij}$ (i=1 to m; j=1 to n:m and n are positive integers of two or more, respectively) are arrayed in a shape of 2D matrix in a pixel-array area ($X_{11}$ to $X_{1m}$; $X_{21}$ to $X_{2m}$; --- ---; $X_{n1}$ to $X_{nm}$) in the 3D imaging device, which is a target for test (inspection) and adjustment based upon the results of the test, and that, as the outline, the arrangement of the pixels $X_{ij}$, which implements a rectangular imaging area, is same as the structure illustrated in FIG. 1. And, the driver 94 is disposed in the upper side of the pixel-array area ($X_{11}$ to $X_{1m}$; $X_{21}$ to $X_{2m}$; --- ---; $X_{n1}$ to $X_{nm}$), and the horizontal shift register 96 is arranged in the lower side, and each of the driver 94 and the horizontal shift register 96 is arranged along the pixel rows $X_{11}$ to $X_{1m}$; $X_{21}$ to $X_{2m}$; --- ---; $X_{n1}$ to $X_{nm}$ directions. Then, in the right side of the pixel-array area, the vertical shift register and vertical scanner 95 is arranged along the pixel columns $X_{11}$ to $_{n1}$; $X_{12}$ to $X_{n2}$; --- ---; $X_{ij}$ to $X_{nj}$; --- ---; $X_{1m}$ to $X_{nm}$ directions. The light emitter 91 for projecting the light, which is required for each pixel $X_{ij}$ to measure a range is connected to the driver 94. An adjusting-data memory 99 for storing an adjustment data transmitted from a test-and-adjusting apparatus 7 is connected to the driver 94 on the semiconductor chip 6, which is the target for the testing or inspection and the adjustment by the inspected data.

A control signal for controlling the driver 94 is transmitted from a control processor 73b of the test-and-adjusting apparatus 7 through the interface 75 to the adjusting-data memory 99 integrated on the semiconductor chip 6. A program memory 76 for storing a program instructing various operations of the control processor 73b and a data memory 72 for storing data, threshold and others, which are necessary for logical calculations by the control processor 73b are connected to the control processor 73b. An output-difference calculator 738 is connected through the bus 736b to the data memory 72. The output-difference calculator 738 controls so that the output signals from the pixel-array area ($X_{11}$ to $X_{1m}$; $X_{21}$ to $X_{2m}$; --- ---; $X_{n1}$ to $X_{nm}$) are entered through the output buffers 97 and 98. The output-difference calculator 738 for calculating an output difference between an output value on the side of the first charge-transfer gate 16a and an output value on the side of the second charge-transfer gate 16b, wherein the first charge-transfer gate 16a and the second charge-transfer gate 16b serving as the distributing gates, respectively, is connected through the bus 736b. By the way, in FIG. 15, as an example of block diagram of an inner structure of the pixel $X_{nj}$ is schematically illustrated, each pixel $X_{ij}$ includes a photoelectric-conversion transfer-element 81 encompassing a photoelectric-conversion element and a signal-charge transfer-element and a source-follower readout-amplifier 82, and the like.

A technical feature such that the pixels $X_{ij}$ within the pixel-array area are sequentially scanned by the driver 94, the horizontal shift register 96 and the vertical shift register and vertical scanner 95, and that the readout operation of the pixel signals and the electronic shutter operation are performed in the same manner as the technical feature of usual 3D imaging devices. That is, in the 3D imaging device, which is the target for the test and the adjustment by the result of the test of the test-and-adjusting apparatus pertaining to the fourth embodiment of the present invention, after the pixel-array area are scanned vertically at the respective pixel rows $X_{11}$ to $X_{1m}$; $X_{21}$ to $X_{2m}$; --- ---; $X_{n1}$ to $X_{nm}$ units, the pixel signals of the respective pixel rows $X_{11}$ to $X_{1m}$; $X_{21}$ to $X_{2m}$; --- -- $X_{n1}$ to $X_{nm}$ are read out by the vertical-output signals-lines arranged along the respective pixel columns $X_{11}$ to $X_{n1}$; $X_{12}$ to $X_{n2}$; --- ---; $X_{1j}$ to $X_{nj}$; --- ---; $X_{1m}$ to $X_{nm}$.

The output-difference calculator 738, the interfaces 75 and 77, the control processor 73b, the program memory 76 and the data memory 72, which implement the test-and-adjusting apparatus 7 illustrated in FIG. 15, may be monolithically integrated on the same semiconductor chip, or may be divided into a plurality of portions so that the divided portions are independently integrated in a plurality of chips, respectively. Moreover, the output-difference calculator 738, the interfaces 75 and 77, the control processor 73b, the program memory 76 and the data memory 72, may be implemented by hybrid integrated circuits or modules assembled in different substrates, or the like. Whether the structure is implemented by monolithic integration or hybrid integration is merely the designing matter, based on design specifications. However, the monolithic integrated structure is preferable for the miniaturization of the device.

For example, when a 3D imaging device 45a pertaining to the fourth embodiment is installed in a camera, which will be described later, the 3D imaging device 45a serves as the target for test and adjustment by the result of the testing, the control processor 73b illustrated in FIG. 15 may be assembled in a chip-mounting substrate (package substrate) 46. Wherein, the chip-mounting substrate 46 includes the 3D imaging device 45a illustrated in FIG. 31, and the 3D imaging device 45a can be adjusted, as a part of the operation of the camera. For facilitating the adjustment of the characteristics in the 3D imaging device 45a as the part of the operation of the camera, the control processor 73b illustrated in FIG. 15 may be assembled as a part of any of a timing generator (TG) 51, a drive-circuit 52 and a control-unit 53 which are illustrated in FIG. 31. In a case of an application to the camera, as the strobe 62 illustrated in FIG. 31 can have the function of the light emitter 91 illustrated in FIG. 15. That is, after the strobe 62 emits the light for ranging, the characteristics of the 3D imaging device 45a may be adjusted by the scheme of the test-and-adjusting apparatus pertaining to a fourth embodiment.

In the calibration at pre-shipment test or after-shipment testing of the 3D imaging device, which serve as the main portion of the range-measuring device pertaining to the fourth embodiment and the adjustment, the test-and-adjusting apparatus 7 is connected through the interfaces 75 and 77 to the semiconductor chip 6. By the driving signals transmitted from the test-and-adjusting apparatus 7, the transfer signals TX1 and TX2, for transferring the signal charges from the respective photodiodes of the respective pixels $X_{11}$ to $X_{1m}$; $X_{21}$ to $X_{2m}$; --- ---; $X_{n1}$ to $X_{nm}$ integrated on the semiconductor chip 6, are applied to all of the pixels $X_{11}$ to $X_{1m}$; $X_{21}$ to $X_{2m}$; --- ---; $X_{n1}$ to $X_{nm}$ from the driver 94, at the same time. Since the driving signals from the driver 94 are the signals of high frequencies, switching noise is generated in the period of transmitting the driving signals. Therefore, the signal-readout process from the pixel units are performed, by providing a signals-readout period after the completion of the processes by the noise cancelling circuits $NC_1$ to $NC_m$.

Figure 16:
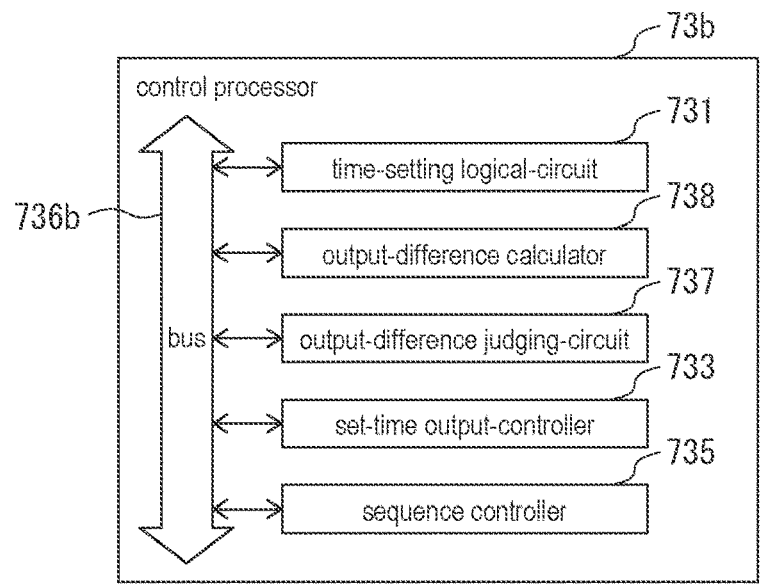
FIG. 16 is a logical block-diagram explaining an inner structure of a control processor included in a test-and-adjusting apparatus pertaining to the fourth embodiment as a hardware resource.

As illustrated in the logical block-diagram FIG. 16, the control processor 73b includes a time-setting logical-circuit 731, an output-difference judging-circuit 737, a set-time output-controller 733, an output-difference calculator 738 and a sequence controller 735 as hardware resources. The time-setting logical-circuit 731 is a logical circuit for setting the values of the repetitive-cycle time $T_c$, the light-projection time $T_o$, the charge-accumulation time $T_a$ and the charge-transfer time $T_{on}$ and others. Or alternatively, the time-setting logical-circuit 731 appropriately modifies the values of the repetitive-cycle time $T_c$, the light-projection time $T_o$, the charge-accumulation time $T_a$ and the charge-transfer time $T_{on}$ and others, using the data of output signals transmitted from the output-difference judging-circuit 737.

The output-difference judging-circuit 737 is a logical circuit for judging whether or not an output difference between the output value on the side of the first charge-transfer gate 16a and the output value on the side of the second charge-transfer gate 16b, the output difference is calculated by the output-difference calculator 738, is larger than a threshold pre-stored in the data memory 72. The set-time output-controller 733 is a logical circuit for feeding the repetitive-cycle time $T_c$, the light-projection time $T_o$, the charge-accumulation time $T_a$ and the charge-transfer time $T_{on}$ and others, the periods of which are set or modified after the setting by the time-setting logical-circuit 731, as the control signals transmitted through the interface 75 to the adjusting-data memory 99.

The sequence controller 735 illustrated in FIG. 16 is a logical circuit for sequentially controlling the respective operations of the time-setting logical-circuit 731, the output-difference judging-circuit 737, the set-time output-controller 733, the output-difference calculator 738, the interface 75, the program memory 76 and the data memory 72, according to a clock signal. Each of the time-setting logical-circuit 731, the output-difference judging-circuit 737, the set-time output-controller 733, the output-difference calculator 738 and the sequence controller 735 can transmit/receive information through a bus 736b. In a computer system implementing the test-and-adjusting apparatus 7 illustrated in FIG. 15, the data memory 72 can be implemented by any combination that is properly selected from a group encompassing a plurality of registers, a plurality of cache memories, main memory and a secondary memory. Although illustration is omitted, in a case that a plurality of registers is included in the data memory 72, the bus 736b may be extended to the interface 75, the program memory 76 and the data memory 72 and others.

The control processor 73b illustrated in FIG. 16 can organize the computer system by using MPUs assembled by microchips. Also, as the control processor 73b implementing the computer system, the control processor 73b can use DSP or a micro controller (microcomputer). Here, the DSP may be specialized for signal processing, by reinforcing arithmetic calculation function. And, the micro controller may be directed to the assembled device control, by assembling memories and peripheral circuits. Or, a main CPU of a current general-purpose computer may be used for the control processor 73b. Moreover, the partial configuration or entire configuration of the control processor 73b may be implemented by PLD such as FPGA.

When a part or whole of the control processor 73b is implemented by the PLD, the data memory 72 can be implemented by memory elements such as memory blocks included in a part of logical blocks implementing the PLD. Moreover, the control processor 73b may be structured by a configuration that arrays like CPU-cores and programmable cores like PLDs are merged in the same chip. Here, the arrays like CPU-cores may include hard macro-CPUs and soft macro-CPUs. The hard macro-CPUs are pre-embedded in the PLD, and the soft macro-CPUs are implemented by the logical blocks of the PLD. In short, a configuration, in which a software process and a hardware process are mixed inside the PLD, can be used as the part or whole of the control processor 73b.

Figure 19:
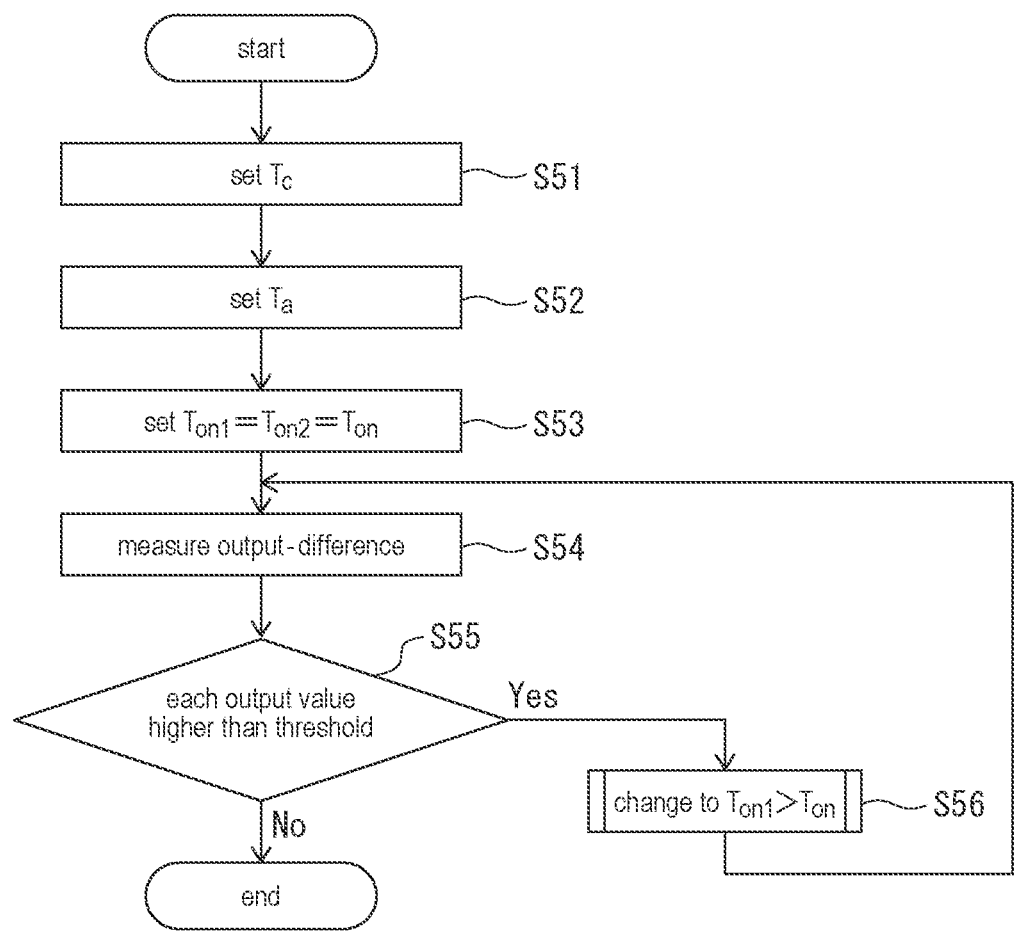
FIG. 19 is a flowchart explaining an outline of a flow of testing-and-adjusting procedures of the solid-state imaging device by the test-and-adjusting apparatus pertaining to the fourth embodiment, focusing to an operation of the control processor illustrated in FIG. 16.

The outline of the operations of the test-and-adjusting apparatus pertaining to the fourth embodiment can be explained in a procedure along a flow of a flowchart illustrated in FIG. 19. At Step S51 in FIG. 19, the time-setting logical-circuit 731 of the control processor 73b Si implementing the test-and-adjusting apparatus 7 sets the repetitive-cycle time $T_c$ to a predetermined test-and-adjustment value. Continuously, at Step S52, the time-setting logical-circuit 731 sets the charge-accumulation time $T_a$ to a predetermined test-and-adjustment value. Moreover, at Step S53, the time-setting logical-circuit 731 sets a charge-transfer time $T_{on1}$ of the first charge-transfer gate 16a and a charge-transfer time $T_{on2}$ of the second charge-transfer gate 16b to the same value. The set-time output-controller feeds the set charge-accumulation time $T_a$, the repetitive-cycle time $T_c$ and the charge-transfer time $T_{on1}=T_{on2}=T_{on}$ as control signals transmitted through the interface 75 and the adjusting-data memory 99, which are illustrated in FIG. 15, to the driver 94.

Figure 20:
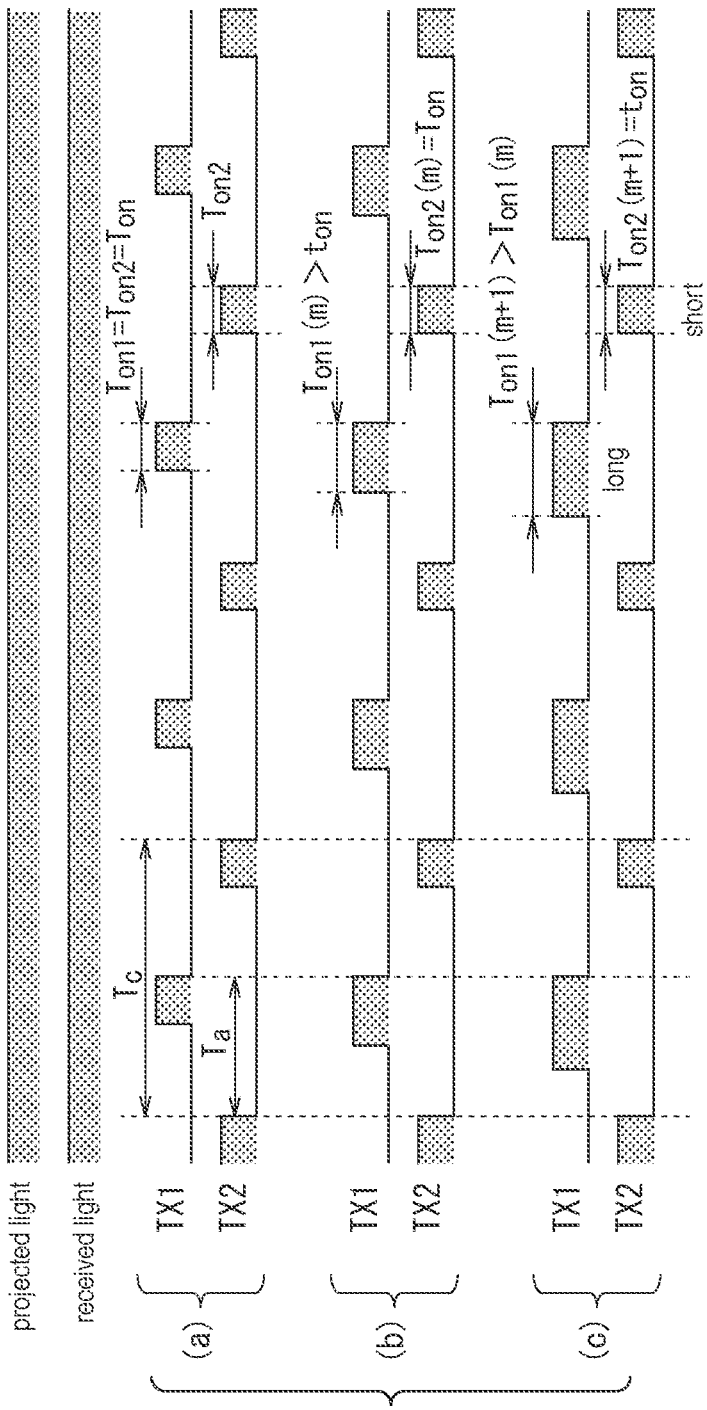
FIG. 20 is a drive-timing chart for adjusting the characteristics of the pixel (range-measuring element) in accordance with the flowchart illustrated in FIG. 19, the pixel having the asymmetric cross-sectional structure, the test-and-adjusting apparatus pertaining to the fourth embodiment.

In response to the control signals transmitted via the driver from the set-time output-controller 733 of the control processor 73b, the light emitter 91 projects a constant light (continuous light), as illustrated in the upper site in FIG. 20. The constant light reflected by the target 92 is irradiated through the lens 93, BPF and others to the pixel-array area ($X_{11}$ to $X_{1m}$; $X_{21}$ to $X_{2m}$; --- ---; $X_{n1}$ to $X_{nm}$) serving as the target area under test. By the way, projected light from the light emitter 91 may be pulsed light. However, the projected light is explained as constant light, in the following explanation. Also, light may not to be emitted from the light emitter 91, but uniform light from a brightness box (uniform light box) or the like may be received by the pixel-array area ($X_{11}$ to $X_{1m}$; $X_{21}$ to $X_{2m}$; --- ---; $X_{n1}$ to $X_{nm}$).

At Step S54 in FIG. 19, the operation of each pixel $X_{ij}$ in the pixel-array area ($X_{11}$ to $X_{1m}$; $X_{21}$ to $X_{2m}$; --- ---; $X_{n1}$ to $X_{nm}$) as the target area under test is controlled by the driver 94. That is, at Step S54, the electrons (photoelectrons) generated by the received-lights in respective pixels $X_{ij}$ are controlled to be driven by the control signals transmitted via the driver 94 from the time-setting logical-circuit 731 of the control processor 73b. Therefore, at Step S54, the output signals from the pixel-array area ($X_{11}$ to $X_{1m}$; $X_{21}$ to $X_{2m}$; --- ---; $X_{n1}$ to $X_{nm}$) are transmitted through the output buffers 97 and 98 to the output-difference calculator 738. At Step S54, the output-difference calculator 738 calculates an output difference between an output value on the side of the first charge-transfer gate 16a and an output value on the side of the second charge-transfer gate 16b, using signals delivered from the respective pixels $X_{ij}$ in the pixel-array area ($X_{11}$ to $X_{1m}$; $X_{21}$ to $X_{2m}$; --- ---; $X_{n1}$ to $X_{nm}$). At Step S54, the output-difference calculator 738 sends the calculated result to the time-setting logical-circuit 731 of the control processor 73b.

At Step S55 in FIG. 19, the output-difference judging-circuit of the control processor 73b judges whether the drive setting is proper, for the calculated result transmitted from the output-difference calculator 738. At Step S55, if "NO" is judged by the output-difference judging-circuit 737, data is transmitted to the time-setting logical-circuit 731 of the control processor 73b. As to the time-setting logical-circuit 731, at Step S56 in FIG. 19, the time-setting logical-circuit 731 sets only the charge-transfer time $T_{on1}$ of the first charge-transfer gate 16a is longer than the charge-transfer time $T_{on}$ of an initial setting. The control signals, by which the drive-condition is modified with the condition of the charge-transfer time $T_{on1}>T_{on2}=T_{on}$, is transmitted from the adjusting-data memory 99 to the driver 94.

At Step S54 in FIG. 19, the output difference between the output value on the side of the first charge-transfer gate 16a and the output value on the side of the second charge-transfer gate 16b in the pixel-array area ($X_{11}$ to $X_{1m}$; $X_{21}$ to $X_{2m}$; --- ---; $X_{n1}$ to $X_{nm}$) is measured using the modified control signals. After that, the loops that return to Step S54 through Steps S54, S55, and S56 are repeated until the output-difference judging-circuit 737 judges the values of drive-settings as "OK", as Step S55. And, if the output-difference judging-circuit 737 judges the values of drive-settings as "OK", the process of the flowchart illustrated in FIG. 19 is finished. In this way, it is possible to achieve the adjustment at the time of the calibration in the pre-shipment test of the 3D imaging device, which serve as the main portion of the range-measuring device as the target under test-and-adjustment. And furthermore, it is possible to achieve the adjustment at the time of the calibration in the after-shipment test of the 3D imaging device. The modified control signals of the driver 94 is stored in the adjusting-data memory 99.

Figure 17:
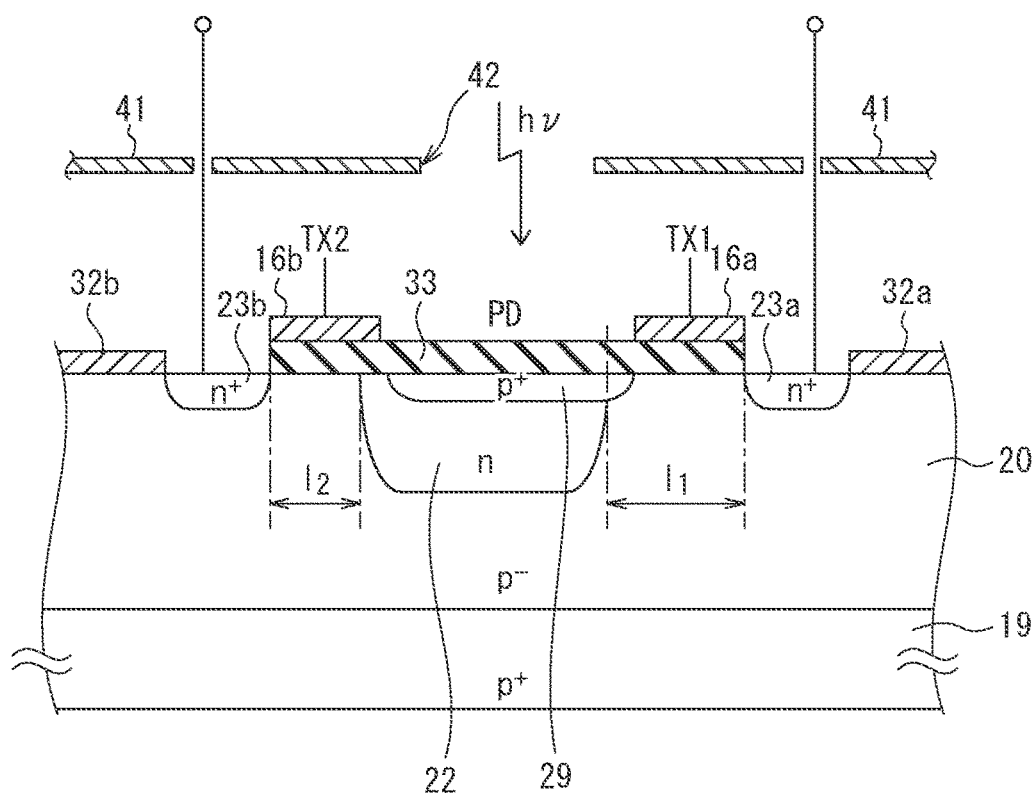
FIG. 17 is a schematic cross-sectional view illustrating an asymmetric cross-sectional structure of a pixel (range-measuring element) in a solid-state imaging device, which serve as an example of the testing-and-adjusting targets of the test-and-adjusting apparatus pertaining to the fourth embodiment, the asymmetric cross-sectional structure has been made by variation and dispersion in a manufacturing process of the pixel.

FIG. 17 illustrates one example of a cross-sectional structure of a range-measuring element serving as the pixel $X_{ij}$ in the 3D imaging device, the 3D imaging device serve as the main portion of the range-measuring device as the target under test-and-adjustment in the test-and-adjusting apparatus pertaining to the fourth embodiment. The first charge-transfer gate 16a and the second charge-transfer gate 16b, which alternately distributes and transfers the signal charges converted photo-electrically in the light-receiving region, are arranged on both sides of the light-receiving region. In the arrangement of the first charge-transfer gate 16a and the second charge-transfer gate 16b, there is a risk that an asymmetric cross-sectional structure may be formed by the variations and dispersions in the manufacturing process, ascribable to the displacement of mask alignment at a photolithography step. FIG. 17 exemplifies the asymmetric structure.

The cross-sectional structure illustrated in FIG. 17 exemplifies the semiconductor substrate 19 of p-type, the functional-substrate layer 20 made of the semiconductor layer of p-type arranged on the semiconductor substrate 19, and the surface-buried region 22 of n-type arranged on the functional-substrate layer 20. The gate insulating film 33 is disposed at the position included in the light-receiving region, which is arranged in the center. The gate insulating film 33, the surface-buried region 22, the functional-substrate layer 20 and the semiconductor substrate implement the physical and essential structure of the photoelectric-conversion element. A part of the functional-substrate layer of p-type located in the light-receiving region serves as the signal-charge generation-region of the photoelectric-conversion element. The carriers (electrons) generated in the signal-charge generation-region are injected into a part of the surface-buried region 22 just on the signal-charge generation-region.

The gate insulating-film 33 extends from just under the light-receiving region to under the first charge-transfer gate 16a and the second charge-transfer gate 16b, which are disposed at the right and left sides, respectively. Under the gate insulating-film 33, the surface-buried region 22 is arranged to extend toward the left and right directions. Namely, the surface-buried region 22 extends from just under the light-receiving region to under the left end of the first charge-transfer gate 16a, and furthermore, extends to the right end of the second charge-transfer gate 16b. And, the first charge-accumulation region 23a for accumulating the signal charges transferred by the first charge-transfer gate 16a is arranged as the floating drain region on the right side in FIG. 17. Similarly, the second charge-accumulation region 23b for accumulating the signal charges transferred by the second charge-transfer gate 16b is arranged as the floating drain region on the left side in FIG. 17.

In the cross-sectional structure illustrated in FIG. 17, the region on the surface side of the functional-substrate layer 20 adjacent to the right side of the surface-buried region 22 located in the light-receiving region serves as a first transfer channel of a transfer length $l_1$. A transfer length $l_2$ of a second transfer channel in the region on the surface side of the functional-substrate layer 20 adjacent to the left side of the surface-buried region 22 located in the light-receiving region is shorter than the transfer length $l_1$ of the first transfer channel ($l_1>l_2$). And, the first charge-transfer gate 16a and the second charge-transfer gate 16b electrostatically control potentials of the first and second transfer channels through the gate insulating-film 33 laminated on the upper portions of these first and second transfer channels, respectively. The electrostatic control causes the signal charges to be alternately transferred by the first and second transfer channels to the n-type first charge-accumulation region 23a and the second charge-accumulation region 23b, respectively. Each of the first charge-accumulation region 23a and the second charge-accumulation region 23b is the semiconductor region having a higher impurity concentration than the surface-buried region 22.

The first transfer signals TX1 in FIG. 17 is applied to the first charge-transfer gate 16a laminated on the gate insulating-film 33, and the second transfer signals TX2 is applied to the second charge-transfer gate 16b. For example, when the first transfer signals TX1=3.3 volts (VDD) is applied to the first charge-transfer gate 16a, and the second transfer signals TX2=zero volt (GND) is applied to the second charge-transfer gate 16b, the potential distribution generated in the surface-buried region 22 causes the electrons generated by optical signals to be transferred to the charge-accumulation region 23a on the right side. Reversely, when the first transfer signals TX1=zero volt (GND) is applied to the first charge-transfer gate 16a, and the second transfer signals TX2=3.3 volts (VDD) is applied to the second charge-transfer gate 16b, the electrons generated by the optical signals is transferred to the charge-accumulation region 23b on the left side.

As illustrated in FIG. 4 in the first embodiment, it is ideal that the first charge-transfer gate 16a and the second charge-transfer gate 16b are structured accurately symmetric with each other, there is no difference between the signal charges which are transferred by the transfer channels just under the first charge-transfer gate 16a and the second charge-transfer gate 16b, and there is no difference between the output value on the side of the first charge-transfer gate 16a and the output value on the side of the second charge-transfer gate 16b. However, in actual manufacturing procedures, as illustrated in FIG. 17, for example, the variation and dispersion in a manufacturing process causes an asymmetry such that the first charge-transfer gate 16a and the second charge-transfer gate 16b are not made accurately symmetric with each other.

Figure 18:
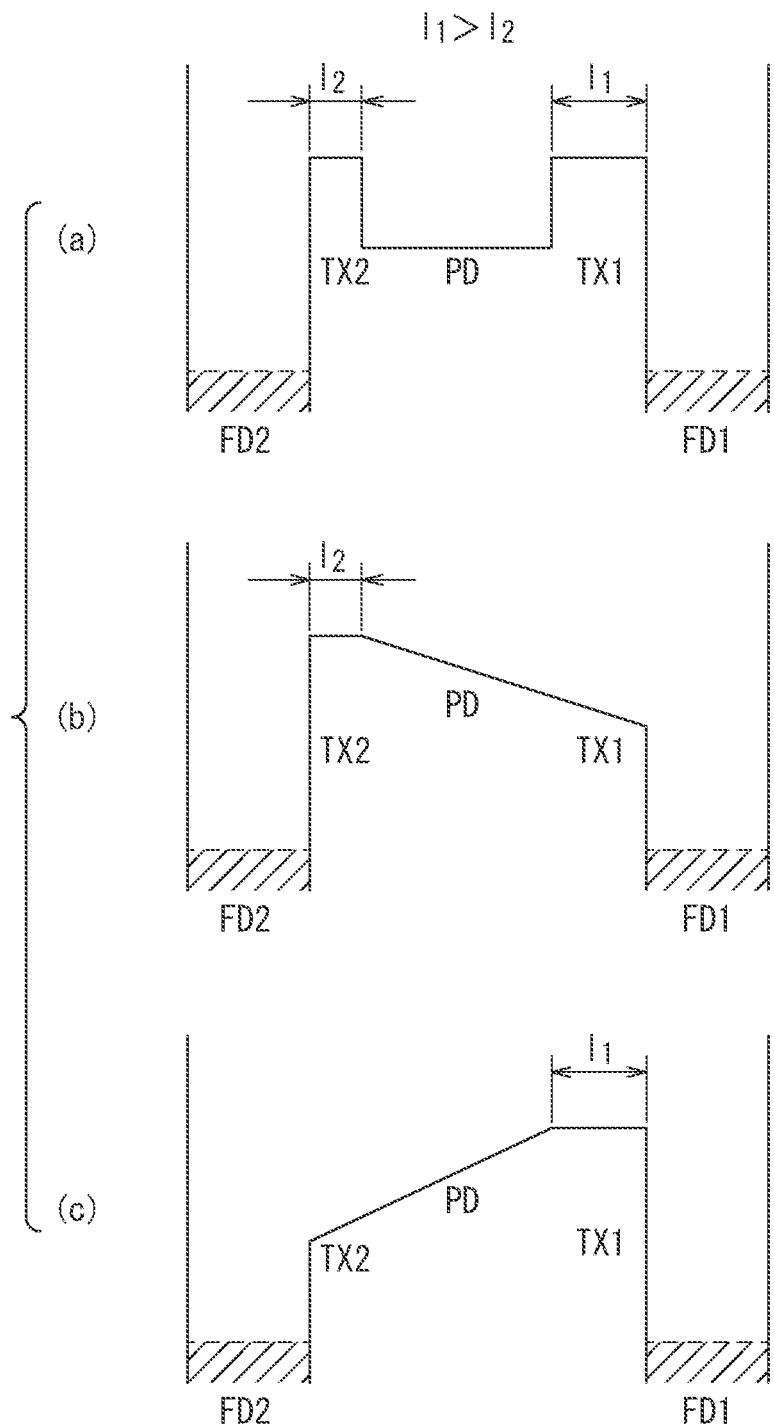
FIG. 18 is a schematic view illustrating a potential profile of the pixel (range-measuring element) that has the asymmetric cross-sectional structure illustrated in FIG. 17.

When the asymmetry is generated, as illustrated in FIG. 18 (a), an effective thickness of a potential barrier corresponding to the transfer length $l_1$ of the first transfer channel just under the first charge-transfer gate 16a is thicker than an effective thickness of a potential barrier corresponding to the transfer length $l_2$ of the second transfer channel just under the second charge-transfer gate 16b. Then, a potential gradient lowering to left, by which the second transfer channel just under the second charge-transfer gate 16b illustrated in FIG. 18(C) is turned on, is steeper than a potential gradient lowering to right, by which the first transfer channel just under the first charge-transfer gate 16a illustrated in FIG. 18 (b) is turned on. Therefore, a transfer speed of the signal charges transported by the first transfer channel becomes slower than a transfer speed of the second transfer channel.

Moreover, since the transfer length $l_1$ of the first transfer channel is longer than the transfer length h of the second transfer channel ($l_1 > l_2$), a transfer period of the signal charges transported through the first transfer channel becomes longer than a transfer period of the signal charges transported through the second transfer channel. Therefore, the variation and dispersion in the manufacturing process generates the difference between the signal-charge amounts, both of which are transported in the transfer channels just under the first charge-transfer gate 16a and the second charge-transfer gate 16b. Thus, the output difference becomes larger between the output values on the side of the first charge-transfer gate 16a and the side of the second charge-transfer gate 16b.

FIG. 20 illustrates an example of the drive-timing chart in which the drive-conditions are modified by the instructions prescribed by the program, in accordance with the flow represented by the flowchart illustrated in FIG. 19. At first, at Step S51 in the flowchart illustrated in FIG. 19, the time-setting logical-circuit 731 of the control processor 73b in FIG. 16 sets the repetitive-cycle time $T_c$ to a predetermined test-and-adjustment value selected as a default value. Continuously, at Step S25, the time-setting logical-circuit 731 sets the charge-accumulation time $T_a$ to a predetermined test-and-adjustment value. Moreover, at Step S53, the charge-transfer time $T_{on1}$ of the first charge-transfer gate 16a and the charge-transfer time $T_{on2}$ of the second charge-transfer gate 16b are set to the same value. Through the interface 75 and the adjusting-data memory 99 illustrated in FIG. 15, the set-time output-controller 733 transmits the set charge-accumulation time $T_a$, the set repetitive-cycle time $T_c$ and the set charge-transfer time $T_{on1} = T_{on2} = T_{on}$ as the control signals to the driver 94. As illustrated in the upper site in FIG. 20, the driver 94 causes the light emitter 91 to emit a constant light, and drives the test-and-adjusting apparatus pertaining to the fourth embodiment.

At Step S54 in FIG. 19, in response to the drive instruction of the test-and-adjusting apparatus pertaining to the fourth embodiment, using data of the difference between the signal charges transferred through the transfer channels just under the first charge-transfer gate 16a and the second charge-transfer gate 16b, with regard to the output value on the side of the first charge-transfer gate 16a and the output value on the side of the second charge-transfer gate 16b, the output-difference calculator 738 calculates the difference between the output value on the side of the first charge-transfer gate 16a and the output value on the side of the second charge-transfer gate 16b. The difference data of the output values calculated by the output-difference judging-circuit 737 is once stored in the data memory 72.

Next, the difference data between the output value of the first charge-accumulation region 23a and the output value of the second charge-accumulation region 23b of each pixel $X_{ij}$ is judged by the output-difference judging-circuit 737 at Step S55. That is, at Step S55, the output-difference judging-circuit 737 in the control processor 73b reads out the difference data of the output values together with data of thresholds from the data memory 72. The output-difference judging-circuit 737 judges whether the drive setting of the firstly-set default value is proper, for the difference data of the output values calculated by the output-difference calculator 738. At Step S55, if the difference data between the output values of the first charge-accumulation region 23a and the second charge-accumulation region 23b of each pixel $X_{ij}$ is larger than the set threshold, the agreed-answer (Yes) is judged by the output-difference judging-circuit 737. If the difference data is smaller, a disagreement-answer (No) is judged.

If a condition indicated by the drive-timing chart in FIG. 20 (a) is judged as the agreed-answer (Yes) in the judgment at Step S55, the sequence controller 735 branches the flow represented by the flowchart to a Step S56 in FIG. 20. At Step S56, the time-setting logical-circuit 731 modifies the drive condition for making the charge-transfer time $T_{on1}$ on the side of the first charge-transfer gate 16a slightly longer, for example, as illustrated in FIG. 20 (b), which is one of the drive-timing charts. The set-time output-controller 733 feeds the modified charge-transfer times $T_{on1}(m)$ and $T_{on2}(m)$ as the control signals though the interface 75 and the adjusting-data memory 99, which are illustrated in FIG. 15, to the driver 94, and the flow represented by the flowchart again returns to Step S54. At Step S54, the output-difference calculator 738 again measures the output difference between the output value on the side of the first charge-transfer gate 16a and the output value on the side of the second charge-transfer gate 16b. By the way, as to the selection of the side making the charge-transfer time longer, the side of a charge-transfer gate, by which the output is smaller ascribable to the signal charges transported through the subject transfer channel just under the first charge-transfer gate 16a or the second charge-transfer gate 16b, is mainly selected, or vice versa.

The difference data of the output values calculated by the output-difference calculator 738 is once stored in the data memory 72. At Step S55, the output-difference judging-circuit 737 in the control processor 73b reads out the difference data of the output values together with data of thresholds from the data memory 72. The output-difference judging-circuit 737 judges whether the setting of the drive condition indicated by the drive-timing chart in FIG. 20 (b), which is modified by the time-setting logical-circuit 731 at Step S56, is proper for the difference data of the output values calculated by the output-difference calculator 738. If the difference data of the output values between the first charge-accumulation region 23a and the second charge-accumulation region 23b of each pixel $X_{ij}$ is larger than the set threshold, the agreed-answer (Yes) is judged, and if the difference data is smaller, the disagreement-answer (No) is judged at Step S55.

If a setting of the drive condition indicated by the drive-timing chart in FIG. 20 (b) is judged as the agreed-answer (Yes) in the judgment at Step S55, the sequence controller 735 branches the flow represented by the flowchart to a Step S56. At Step S56, the time-setting logical-circuit 731 modifies the drive condition for making one of the charge-transfer times. For example, as illustrated in the drive-timing chart in FIG. 20 (c), the time-setting logical-circuit 731 modifies the drive condition by making the charge-transfer time $T_{on1}$ on the side of the first charge-transfer gate 16a slightly longer. The set-time output-controller 733 feeds the modified charge-transfer times $T_{on1}(m+1)$ or $T_{on2}(m+1)$ as the control signals though the interface 75 and the adjusting-data memory 99 to the driver 94, and the flow represented by the flowchart again returns to Step S54. At Step S54, the output-difference calculator 738 again measures the output difference between the output value on the side of the first charge-transfer gate 16a and the output value on the side of the second charge-transfer gate 16b. The difference data of the output values calculated by the output-difference calculator 738 is once stored in the data memory 72.

At Step S55, the output-difference judging-circuit 737 in the control processor 73b reads out the difference data of the output values together with data of thresholds from the data memory 72. The output-difference judging-circuit 737 judges whether the setting of the drive condition indicated by the drive-timing chart in FIG. 20 (c), which is modified by the time-setting logical-circuit 731 at Step S56, is proper, for the difference data of the output values calculated by the output-difference calculator 738. If "OK" is judged for the setting of the drive condition indicated by the drive-timing chart in FIG. 20 (c), namely, if the disagreement-answer (No) is judged at Step S55, the setting of the charge-transfer time $T_{on}$ is completed, and the data stored in the adjusting-data memory 99 is saved, which accordingly results in the completion of the adjustment at the time of the calibration in the pre-shipment test of the 3D imaging device, or the completion of the adjustment at the time of the calibration after the shipment.

According to the test-and-adjusting apparatus pertaining to the fourth embodiment, the precision and accuracy level can be made higher than that of the earlier driving method of the conventional 3D imaging device. In particular, the distance-precision level of a range sensor (range-measuring element) can be improved. And, even if there are variations and dispersions in the manufacturing process and others of the 3D imaging device, it is possible to carry out the high-precision operations using the 3D imaging device. At the same time, it is also possible to make the manufacturing margins in the 3D imaging devices larger. By the way, although FIG. 17 has explained the example in which the 3D imaging device, which serves as the target under test-and-adjustment, has the two charge-transfer gates, it is possible to apply the technical idea of the test-and-adjusting apparatus pertaining to the fourth embodiment to a structure when the 3D imaging device has three charge-transfer gates, if the 3D imaging device serves as the target under test-and-adjustment. More generally, it is possible to apply similarly the technical idea of the test-and-adjusting apparatus pertaining to the fourth embodiment to a structure of the 3D imaging device having N charge-transfer gates, in a case that the 3D imaging device serves as the target under test-and-adjustment, when N is defined as a positive integer of two or more.

First Variation of Fourth Embodiment

Figure 21:
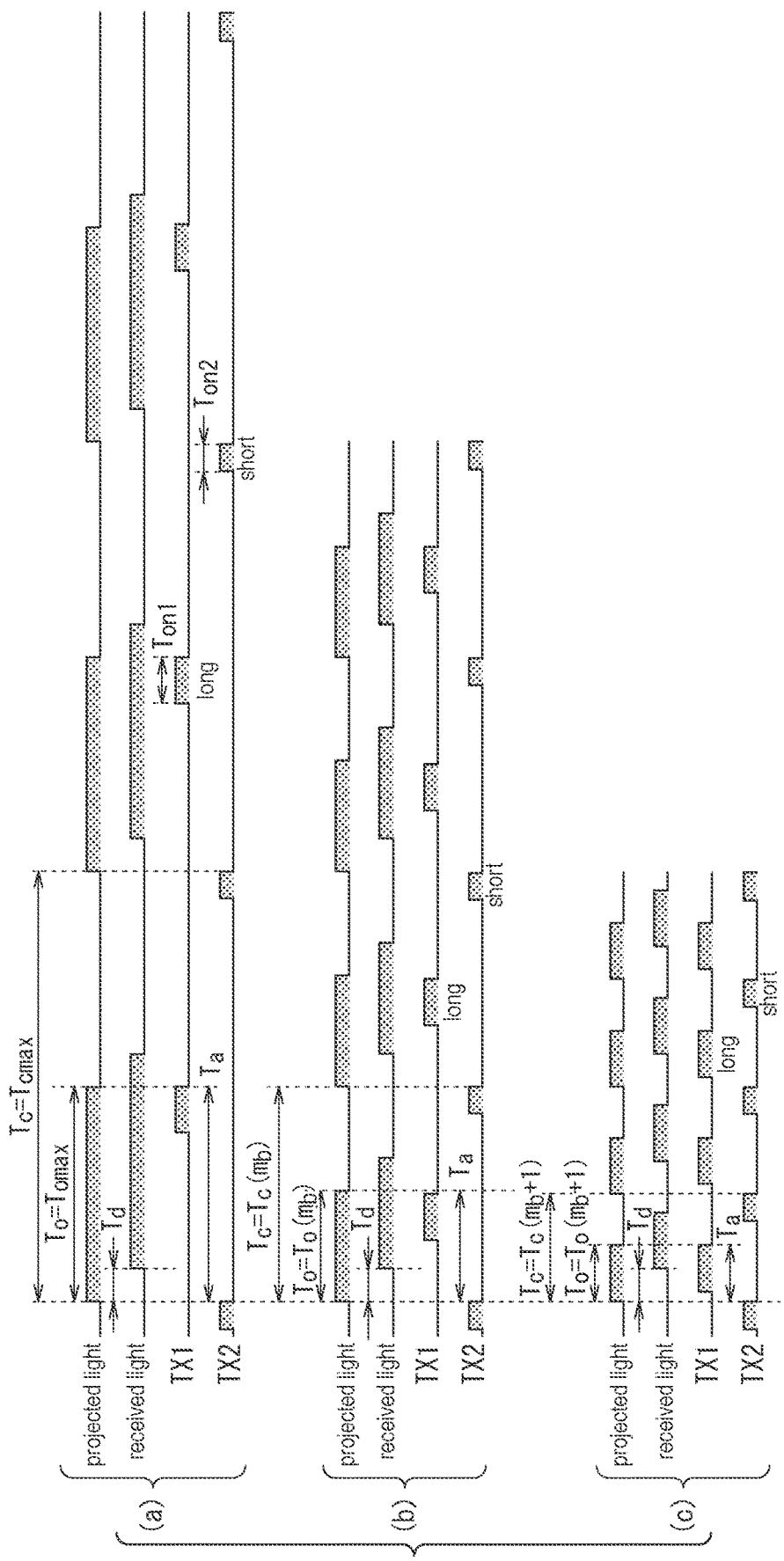
FIG. 21 is a drive-timing chart for adjusting the characteristics of the range-measuring element in accordance with the flowchart illustrated in FIG. 19, by a test-and-adjusting apparatus pertaining to a first variation of the fourth embodiment.

FIGS. 21 (a) to (c) are timing-chart explaining operations, when a range-measuring device of a first variation of the fourth embodiment of the present invention is under adjustment. And, FIGS. 21 (a) to (c) illustrate cases when the charge-transfer time $T_{on}$ in the range-measuring device pertaining to the fourth embodiment is further adjusted, after the timing when the charge-transfer time $T_{on}$ is set. The content of the drive-timing chart in FIG. 21 (c) is equal to the content of the drive-timing chart illustrated in FIG. 20 (c), in which the 3D imaging device according to the fourth embodiment is tested and adjusted using the result of the test. FIG. 21 (a) illustrates the drive-timing chart when the repetitive-cycle time $T_c$ is four times longer than the repetitive-cycle time $T_c$ illustrated in FIG. 21 (c). In FIG. 21 (a), since the range to the target 92 illustrated in FIG. 1 or 15 is short, the delay time $T_d$ of received light is very small. At Step S11 in the flowchart in FIG. 3 which is explained in the range-measuring device of the first embodiment, the time-setting logical-circuit 731 in the control processor 73a in FIG. 2 sets the light-projection time $T_o$ to a maximum value. In the lock-in pixel of optical-pulse synchronized architecture, in many cases, since the charge-accumulation time $T_a$=light-projection time $T_o$, the charge-accumulation time $T_a$ is similarly set to a maximum value.

Continuously, at Step S12, the time-setting logical-circuit 731 sets the repetitive-cycle time $T_c$ to a maximum value. The set-time output-controller 733 feeds the set light-projection time $T_o$ and the repetitive-cycle time $T_c$ as the control signals. And, the control signals are transmitted through the interface 75 illustrated in FIG. 1 to the driver 94, so that the pulsed lights can be emitted from the light emitter 91. And, turning back to the explanation of the range-measuring device of the first embodiment, the range-measuring device is driven, accordingly. At Step S13 in FIG. 3 explained in the adjusting operation of the range-measuring device of the first embodiment, the range calculator 71 calculates the range by Eq. (1), using data of the difference between the signal charges transported through the transfer channel just under the first charge-transfer gate 16a and the second charge-transfer gate 16b, which serve as the distributing gates, respectively. The calculated result of the range, which is ascribable to the range calculator 71, is once stored in the data memory 72.

At Step S14 in FIG. 3, the set-value judging-circuit 732 in the control processor 73a reads out the calculated result of the range, which is ascribable to the range calculator 71, together with data of thresholds from the data memory 72. The set-value judging-circuit 732 judges whether the drive-setting is correct, using the calculated result of the range transmitted from the range calculator 71. As can be understood from the drive-timing chart, the range can be calculated for the condition represented by FIG. 21 (a). However, the rate of the signal-charge amount accumulated in the second charge-accumulation region 23b transferred by the second charge-transfer gate 16b is very smaller than the rate of the signal-charge amount accumulated in the first charge-accumulation region 23a transferred by the first charge-transfer gate 16a. Thus, the distance-precision level becomes low. In advance, by determining the threshold in view of the rates of the signal-charge amounts, and by storing the data of thresholds in the data memory 72, the drive-condition illustrated in FIG. 21 (a) is judged to be not correct, at Step S14.

At Step S 14, if "NO" is judged by the set-value judging-circuit 732 for the condition represented by FIG. 21 (a), namely, if the agreed-answer (Yes) is obtained in the flowchart illustrated in FIG. 3, the data is not transmitted to the output unit 74. If the agreed-answer (Yes) is obtained in the flowchart illustrated in FIG. 3, the light-projection time $T_o$ is reduced at Step S15 in FIG. 3. Continuously, at Step S16, the time-setting logical-circuit 731 reduces the repetitive-cycle time $T_c$. The light-projection time $T_o$ and the repetitive-cycle time $T_c$ are reduced, and the control signals, in which the drive-conditions are modified, are transmitted from the driver 94 illustrated in FIG. 1 to the light emitter 91 and the pixel-array area ($X_{11}$ to $X_{1m}$; $X_{21}$ to $X_{2m}$; --- ---; $X_{n1}$ to $X_{nm}$). Then, at Step S13 in FIG. 3, the range is again measured in the condition illustrated by FIG. 21(b).

FIG. 21 (b) is the drive-timing chart when the repetitive-cycle time $T_c$ is two times longer than the repetitive-cycle time $T_c$ illustrated in FIG. 21 (c). That is, according to the condition represented by FIG. 21 (b), because the half period of the repetitive-cycle time $T_c$ is the light-projection time $T_o$ and the charge-accumulation time $T_a$, the light-projection time $T_o$ and the charge-accumulation time $T_a$ are changed synchronously with the repetitive-cycle time $T_c$. On the other hand, as to the charge-transfer time $T_{on}$, the period is already modified by the test-and-modification method according to the fourth embodiment, for compensating the asymmetry in a pattern layout, which is caused by the variations and dispersions in the manufacturing process in the 3D imaging device. Because the modification of the charge-transfer time $T_{on}$ is already performed in the fourth embodiment, the charge-transfer time $T_{on}$ does not synchronize with the repetitive-cycle time $T_c$, and the charge-transfer time $T_{on}$ is not changed with repetitive-cycle time $T_c$. Even for the condition represented by FIG. 21 (b), the range can be calculated. However, the rate of the signal-charge amount transported just under the second charge-transfer gate 16b and accumulated in the second charge-accumulation region 23b is still smaller than the rate of the signal-charge amount transported just under the first charge-transfer gate 16a and accumulated in the first charge-accumulation region 23a. Thus, the distance-precision level is low. Therefore, at Step S 14, the set-value judging-circuit 732 judges that even the drive-condition illustrated in FIG. 21 (b) is not correct. If "NO" is judged for the condition represented by FIG. 21 (b), namely, if the agreed-answer (Yes) is obtained in the flowchart illustrated in FIG. 3, the data is not transmitted to the output unit 74.

At Step S14, if "NO" is judged by the set-value judging-circuit for the condition represented by FIG. 21 (b), the data is again transmitted to the control processor 73a. At Steps S15 and S16, as indicated by the condition illustrated in FIG. 21 (c), the control processor 73a modifies the drive-condition by further reducing the light-projection time $T_o$ and the repetitive-cycle time $T_c$. After that, again at Step S13, the calculation operation of the range is performed so that the range can be measured. For the condition represented by FIG. 21 (c), because the half period of the repetitive-cycle time $T_c$ is the light-projection time $T_o$ and the charge-accumulation time $T_a$, the light-projection time $T_o$ and the charge-accumulation time $T_a$ are changed synchronously with the repetitive-cycle time $T_c$. On the other hand, as to the charge-transfer time $T_{on}$, the period is already modified by the test-and-modification method according to the fourth embodiment, for compensating the asymmetry in a pattern layout, the charge-transfer time $T_{on}$ does not synchronize with the repetitive-cycle time $T_c$, and the charge-transfer time $T_{on}$ is not changed with repetitive-cycle time $T_c$. Also, here, the condition represented by FIG. 21 (c) is the available minimum repetitive-cycle time $T_c$.

For the condition represented by FIG. 21 (c), as can be understood from the drive-timing chart, the range can be calculated, and the difference between the rates of the signal-charge amount transported just under the first charge-transfer gate 16a and accumulated in the first charge-accumulation region 23a and the signal-charge amount transported just under the second charge-transfer gate 16b and accumulated in the second charge-accumulation region 23b is small, which makes the distance-precision level higher. Therefore, at Step S14 in FIG. 3, the set-value judging-circuit 732 judges that the drive-condition illustrated in FIG. 21 (c) is correct, and the range-image output-controller 734 feeds the calculated result of the range to the output unit 74. By the way, the process steps and architecture in which the repetitive-cycle time $T_c$ is modified to two times or four times as illustrated in the drive-timing charts in FIG. 21 is merely the exemplification. A representation that the repetitive-cycle time $T_c$ is "two times" or "four times" shall not be construed as limiting the technical idea of the present invention, because the multiples represented by FIG. 21 are mere examples, in the meaning that the drive-timing charts can be appropriately explained, by arbitrarily changing the periods of the repetitive-cycle time $T_c$.

Also, FIG. 21 (c) illustrates the available shortest repetitive-cycle time $T_c$, in the first variation of the fourth embodiment. In a TOF range sensor (range-measuring element), it is possible to carry out a measurement in a longer distance by extending the repetitive-cycle time $T_c$. Therefore, the repetitive-cycle times $T_c$ are indicated larger in order from FIG. 21 (c) through FIG. 21 (b) to FIG. 21 (a). The charge-transfer time $T_o$ is adjusted and set up by the method in the same manner as the test-and-adjusting apparatus pertaining to the fourth embodiment. Even in the range-measuring device of the first variation of the fourth embodiment, it is enough that the charge-transfer times $T_o$ may be the same period, regardless of the variations in repetitive-cycle times $T_c$. Thus, in FIG. 21 (c) to FIG. 21 (a), charge-transfer times $T_{on1}$ and $T_{on2}$ are assumed to be constant values, respectively, as already defined fixed periods.

According to the range-measuring device of the first variation of the fourth embodiment, the precision and accuracy level of the 3D imaging device can be made higher than the level of the conventional driving style. Specifically, for the case of the range sensor (range-measuring element), the precision and accuracy level of the range can be improved. Simultaneously, by setting the periods of the charge-transfer time $T_{on1}$ differing from the charge-transfer time $T_{on2}$, it is possible to enlarge the manufacturing margin in the 3D imaging device.

Second Variation of Fourth Embodiment

Figure 22:
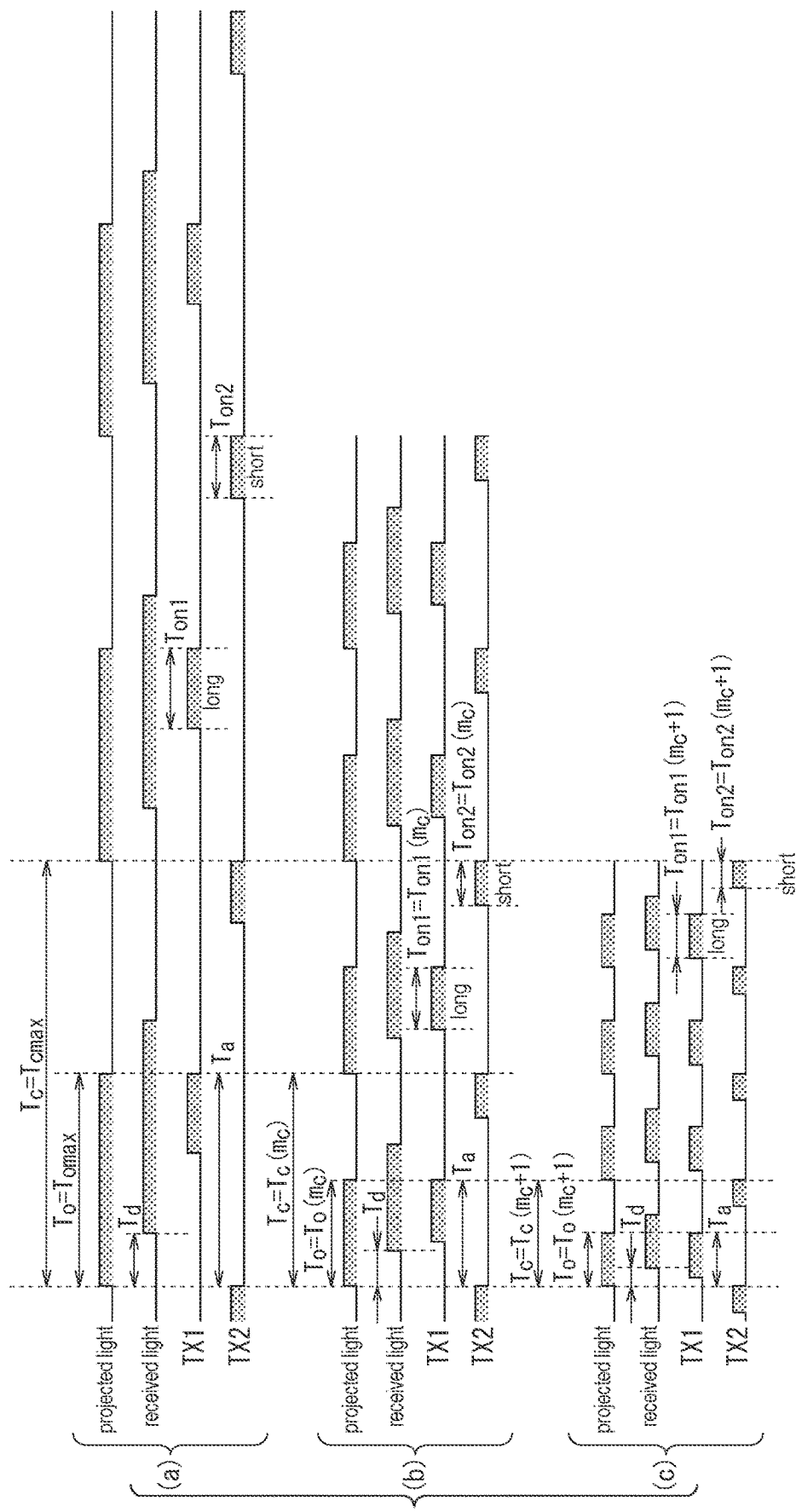
FIG. 22 is a drive-timing chart for adjusting the characteristics of the range-measuring element in accordance with the flowchart illustrated in FIG. 19, by a test-and-adjusting apparatus pertaining to a second variation of the fourth embodiment.

FIGS. 22 (a) to (c) are drive-timing charts explaining operations of a range-measuring device pertaining to a second variation of the fourth embodiment of the present invention, when the performance of the range-measuring device is adjusted. The content of the drive-timing chart in FIG. 22 (c) is equal to the drive-timing chart in illustrated FIG. 20 (c), which has represented the situation in which the test-and-adjustment is completed according to the fourth embodiment. FIG. 22 (a) illustrates the drive-timing chart when the repetitive-cycle time $T_c$ is four times longer than that illustrated in FIG. 22 (c). FIG. 22 (b) illustrates the drive-timing chart when the repetitive-cycle time $T_c$ is two times longer than illustrated in FIG. 22 (c). The technical idea such that the repetitive-cycle time $T_c$ is two times or four times is merely an example. The scheme that the repetitive-cycle time $T_c$ is "two times" or "four times" shall not be construed as limiting the technical idea of the present invention, because the multiples represented by FIGS. 22 (a) to (c) are mere examples, in the meaning that the drive-timing chart can be appropriately modified, by arbitrarily changing the periods of the repetitive-cycle time $T_c$. Here, in the lock-in pixel of optical-pulse synchronized architecture, in many cases, the charge-accumulation time $T_a$=the light-projection time $T_o$. Also, FIG. 22 (c) illustrates the available shortest repetitive-cycle time $T_c$, in the range-measuring device pertaining to the second variation of the fourth embodiment.

In the TOF range sensor (range-measuring element), it is possible to carry out the measurement of longer ranges by extending the repetitive-cycle time $T_c$. Therefore, in the range-measuring device pertaining to the second variation of the fourth embodiment, the delay times $T_d$ of the received light are indicated larger in order from FIG. 22 (c) through FIG. 22 (b) to FIG. 22 (a). The difference from the adjusting operation of the range-measuring device of the first variation of the fourth embodiment illustrated in FIG. 21 lies in a technical subject matter such that high-level periods $T_o$, of the first transfer signals TX1 and the second transfer signals TX2 are not equal regardless of the variations in repetitive-cycle time $T_c$, and the high-level periods $T_{on}$ of the first transfer signals TX1 and the second transfer signals TX2 are gradually made longer in response to the length of the repetitive-cycle time $T_c$. For example, when the repetitive-cycle time $T_c$ is made longer, an exposure amount is increased, and the amount of charges accumulated in the light-receiving region is increased. Accordingly, in many cases, the amount of charges, which wait for timings when the transfer channels just under the first charge-transfer gate 16a and the second charge-transfer gate 16b serving as the distributing gates, respectively become conductive state, is increased. In order to deal with the problem of the increased amount of charges waiting for the timings, it is enough that the charge-transfer time $T_{on}$ is increased a little.

By the way, in FIGS. 22 (a) and (b), the charge-transfer times $T_{on}$ are modified to be approximately proportional to the repetitive-cycle time $T_c$. However, for example, every time the repetitive-cycle time $T_c$ becomes four times, it is enough to use a staircase increasing method by doubling the high-level period $T_{on}$ of each of the first transfer signals TX1 and the second transfer signals TX2. Or alternatively, it is enough to use other various methods, every time the repetitive-cycle time $T_c$ becomes four times. Also, with regard to the upper limit of the length of the high-level period $T_{on}$ of each of the first transfer signals TX1 and the second transfer signals TX2, it is enough that the offset period $T_{off}$ the first transfer signals TX1 is set equal to the offset period $T_{off}$ of the second transfer signals TX2, even if the repetitive-cycle time $T_c$ is modified.

According to the adjusting operation of the range-measuring device pertaining to the second variation of the fourth embodiment, the effectiveness such that the precision and accuracy level can be made higher than that of the driving operation of the conventional 3D imaging device is achieved. Specifically, in the case of the range sensor (range-measuring element), not only it is possible to make the distance-precision level higher, but also, simultaneously, it is possible to achieve the effectiveness such that the manufacturing margin is made larger, by setting the high-level periods of the first transfer signals TX1 and the second transfer signals TX2 to the time regimes (regions) differing from each other.

Third Variation of Fourth Embodiment

Figure 23:
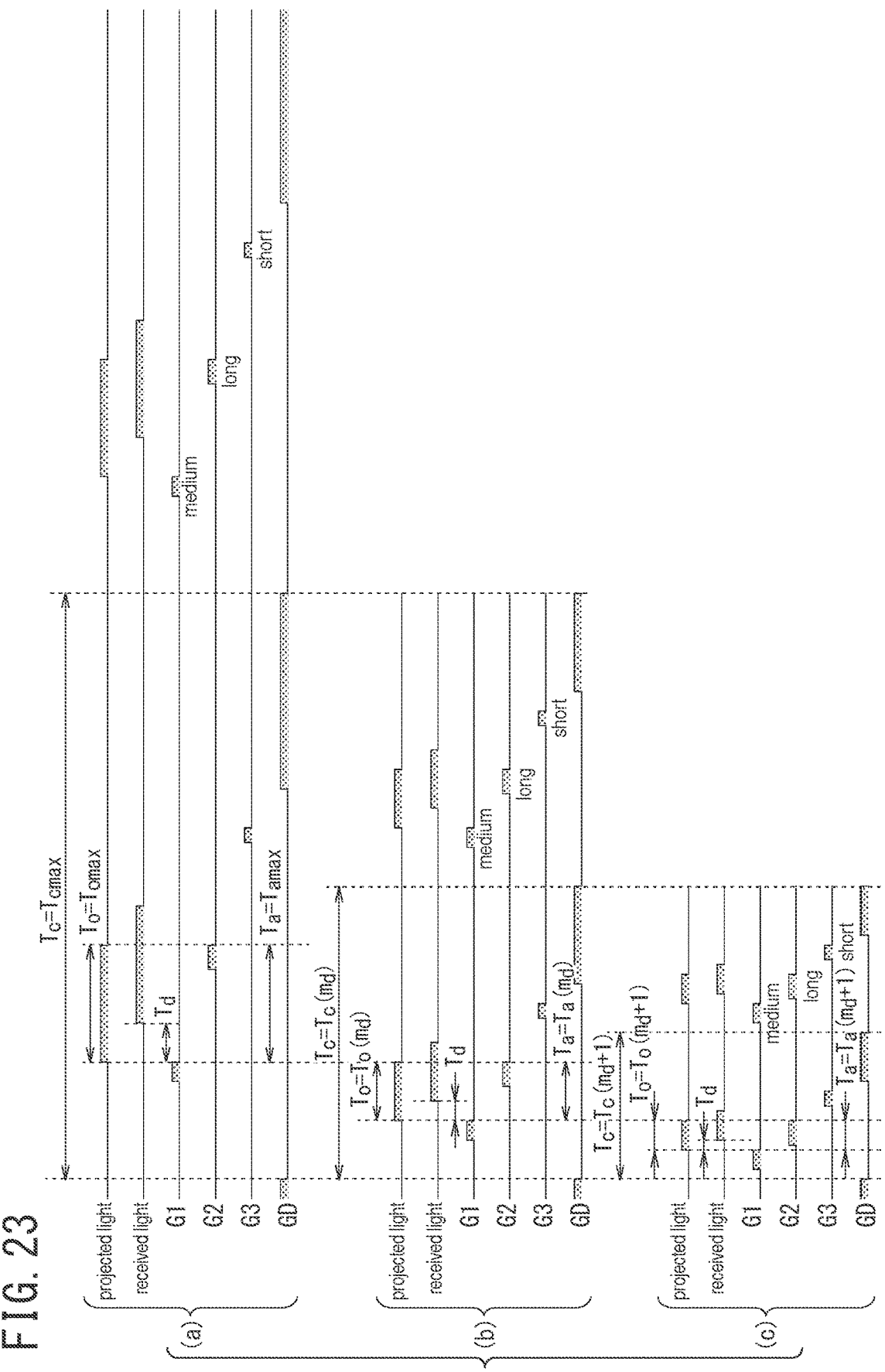
FIG. 23 is a drive-timing chart for adjusting the characteristics of the range-measuring element in accordance with the flowchart illustrated in FIG. 19, by a test-and-adjusting apparatus pertaining to a third variation of the fourth embodiment.

FIGS. 23 (a) to (c) are drive-timing charts explaining adjusting operations of a range-measuring device pertaining to a third variation of the fourth embodiment of the present invention. FIG. 23 illustrates a case that the first variation of the fourth embodiment explained in FIG. 21 is applied to a triple-tap structure. FIG. 23 (a) illustrates the drive-timing chart when the repetitive-cycle time $T_c$ is four times longer than that illustrated in FIG. 23 (c). FIG. 23 (b) illustrates the drive-timing chart when the repetitive-cycle time $T_c$ is two times longer than illustrated in FIG. 23 (c). The technical idea such that the repetitive-cycle time $T_c$ is two times or four times is merely an example. The meaning of "the mere example" is that the repetitive-cycle time $T_c$ can be arbitrarily modified, and the modification is not limited to two times or four times. Here, in the lock-in pixel of optical-pulse synchronized architecture, in many cases, the charge-accumulation time $T_a$=the light-projection time $T_o$. Also, FIG. 23 (c) illustrates the available shortest repetitive-cycle time $T_c$, in the example of the third variation of the fourth embodiment.

In the TOF range sensor (range-measuring element), it is possible to carry out the measurement of longer ranges by extending the repetitive-cycle times $T_c$. Therefore, the delay times $T_d$ of the received light are indicated larger in order from FIG. 23 (c) through FIG. 23 (b) to FIG. 23 (a). It is enough that the charge-transfer time $T_{on}$ is equal regardless of the variations in repetitive-cycle time $T_c$. Thus, in FIGS. 23 (a) to (c), the high-level periods of the first transfer signals TX1, second transfer signals TX2 and third transfer signals TX3 are set equal to each other.

According to the adjusting operation of the range-measuring device pertaining to the third variation of the fourth embodiment, the precision and accuracy level can be made higher than that of the driving operation of the conventional 3D imaging device. Specifically, in the case of the range sensor (range-measuring element), not only it is possible to make the distance-precision level higher, but also it is possible to simultaneously achieve that the manufacturing margin is made larger, by setting the high-level periods of the first transfer signals TX1, second transfer signals TX2 and third transfer signals TX3 to the time regimes differing from each other.

Fourth Variation of Fourth Embodiment

Figure 24:
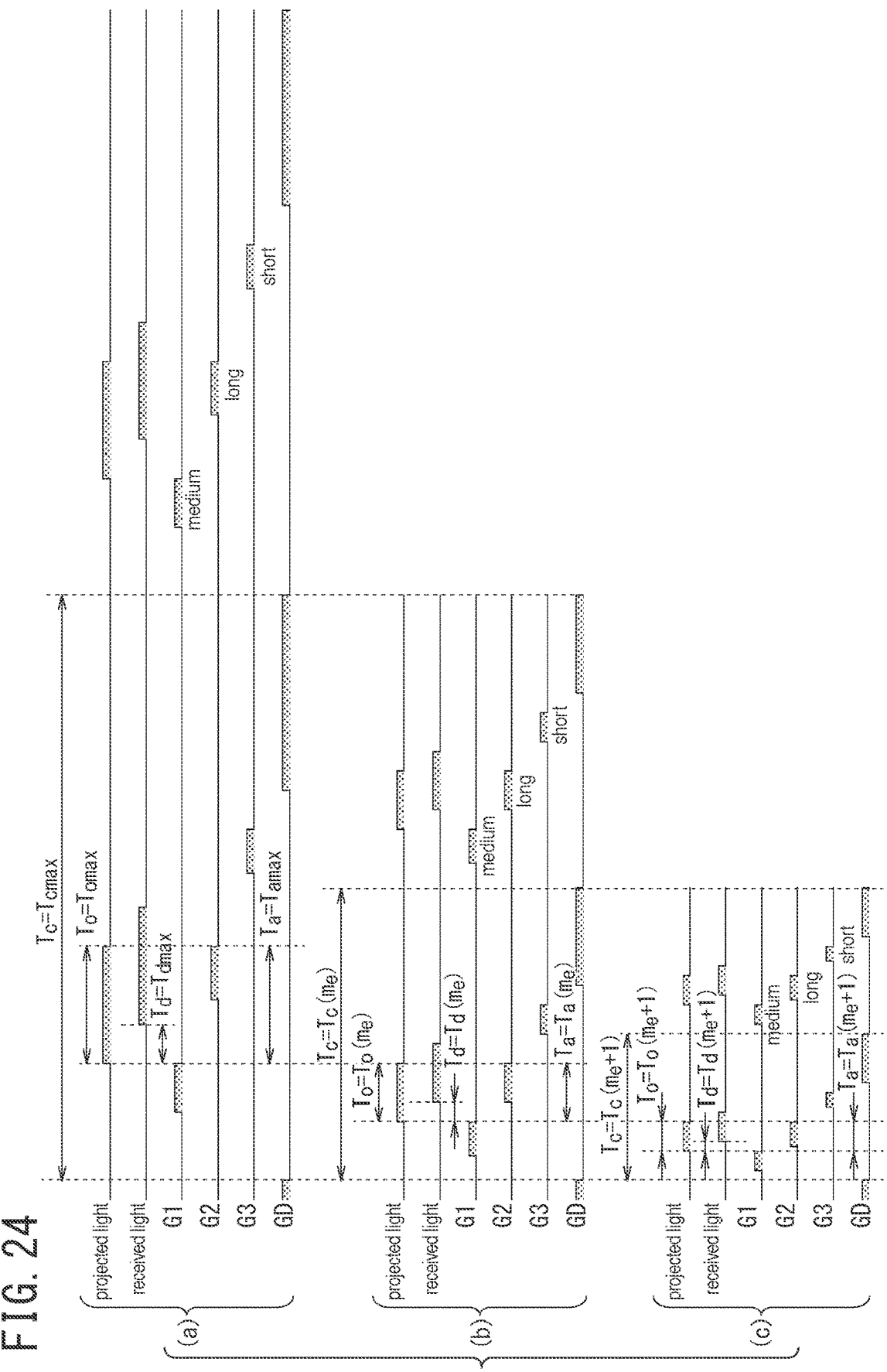
FIG. 24 is a drive-timing chart for adjusting the characteristics of the range-measuring element in accordance with the flowchart illustrated in FIG. 19, by a test-and-adjusting apparatus pertaining to a fourth variation of the fourth embodiment.

FIG. 24 is a drive-timing chart explaining an adjusting operation of a range-measuring device pertaining to a fourth variation of the fourth embodiment of the present invention. FIG. 24 illustrates the drive-timing chart corresponding to the case that the second variation of the fourth embodiment explained in FIG. 22 is applied to the triple-tap structure. FIG. 24 (a) illustrates the drive-timing chart when the repetitive-cycle time $T_c$ is four times longer than that illustrated in FIG. 24 (c). FIG. 24 (b) illustrates the drive-timing chart when the repetitive-cycle time $T_c$ is two times longer than illustrated in FIG. 24 (c). The technical idea such that the repetitive-cycle time $T_c$ is two times or four times is merely an example. The meaning of "the mere example" is that the repetitive-cycle time $T_c$ can be arbitrarily modified, and the modification is not limited to two times or four times.

In the lock-in pixel of optical-pulse synchronized architecture, in many cases, the charge-accumulation time $T_a$=the light-projection time $T_o$. Also, FIG. 24 (c) illustrates the available shortest repetitive-cycle time $T_c$, in the adjusting operation of the range-measuring device pertaining to the fourth variation of the fourth embodiment. In the TOF range sensor (range-measuring element), it is possible to carry out the measurement of longer ranges by extending the repetitive-cycle time $T_c$. Therefore, the delay times $T_d$ of the received light are indicated larger in order from FIG. 24 (c) through FIG. 24 (b) to FIG. 24 (a).

The difference from FIGS. 23 (a) to (c) lies in a technical subject matter such that high-level periods of the first transfer signals TX1, the second transfer signals TX2 and the third transfer signals TX3 are not equal, regardless of the variations in repetitive-cycle time $T_c$, and the high-level periods of the first transfer signals TX1, the second transfer signals TX2 and the third transfer signals TX3 are changed gradually in response to the length of the repetitive-cycle time $T_c$. For example, when the repetitive-cycle time $T_c$ is made longer, the exposure amount is increased, and the amount of the charges accumulated in the light-receiving region is increased. Accordingly, the amount of the charges waiting for the timings when the first transfer signals TX1, the second transfer signals TX2 and the third transfer signals TX3 are changed to the high level is increased, in many cases. In order to deal with the above problem of increased waiting charges, it is enough that each of the high-level periods of the first transfer signals TX1, the second transfer signals TX2 and the third transfer signals TX3 is made slightly longer.

By the way, in FIG. 24, the charge-transfer time $T_{on}$ is modified to be approximately proportional to the repetitive-cycle time $T_c$. However, for example, every time the repetitive-cycle time $T_c$ becomes four times, it is enough to use the staircase increasing method of doubling the high-level period $T_{on}$ of each of the first transfer signals TX1, the second transfer signals TX2 and the third transfer signals TX3 or increase the high-level period by using the other various methods. Also, with regard to the upper limit of the length of the high-level period $T_o$ of each of the first transfer signals TX1, the second transfer signals TX2 and the third transfer signals TX3, it is enough that the offset periods $T_o$ in the high-level periods $T_{on}$ of the first transfer signals TX1, the second transfer signals TX2 and the third transfer signals TX3 are set equal to each other, even if the repetitive-cycle time $T_c$ is changed.

According to the adjusting operation of the range-measuring device pertaining to the fourth variation of the fourth embodiment, the precision and accuracy level can be made higher than that of the driving operation of the conventional 3D imaging device. Specifically, in the case of the range sensor (range-measuring element), not only it is possible to make the distance-precision level higher, but also it is possible to simultaneously achieve that the manufacturing margin is made larger, by setting the high-level periods of the first transfer signals TX1, the second transfer signals TX2 and the third transfer signals TX3 to the time regimes differing from each other. By the way, in the first to fourth variations according of the fourth embodiment, the example of two charge-transfer gates and the example of three charge-transfer gates with one charge-exhausting electrode are explained as the combination of distributing gates. However, the combination of the distributing gates can be similarly constructed and performed even in a case of N charge-transfer gates, which will be described later.

Fifth Embodiment

Figure 25:
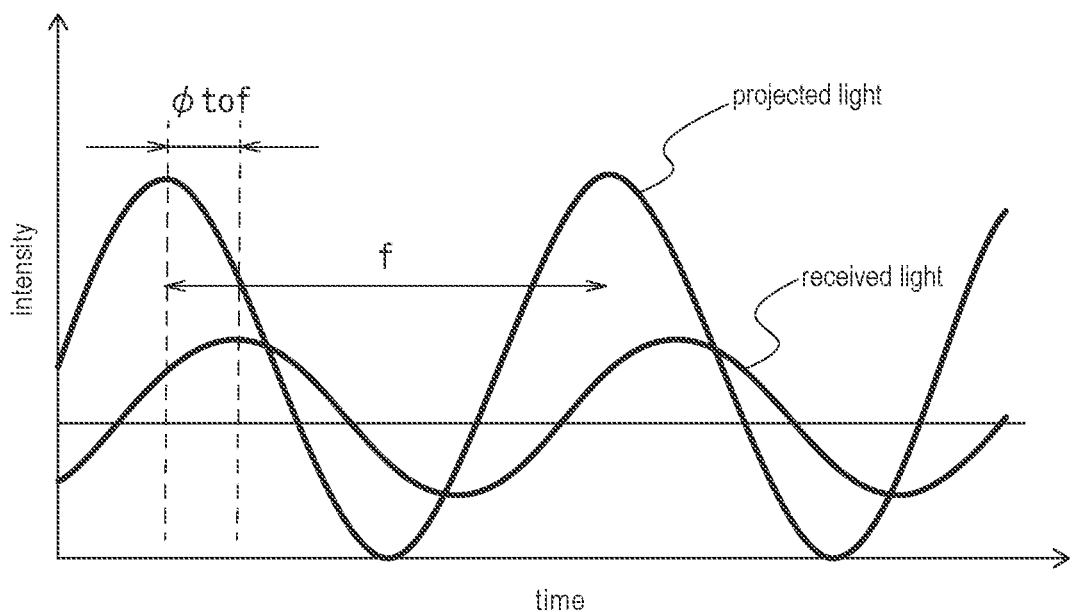
FIG. 25 is a waveform diagram explaining an operation of a range-measuring element with a scheme of a continuous wave (CW) modulation, the range-measuring element pertaining to a fifth embodiment of the present invention.
Figure 26:
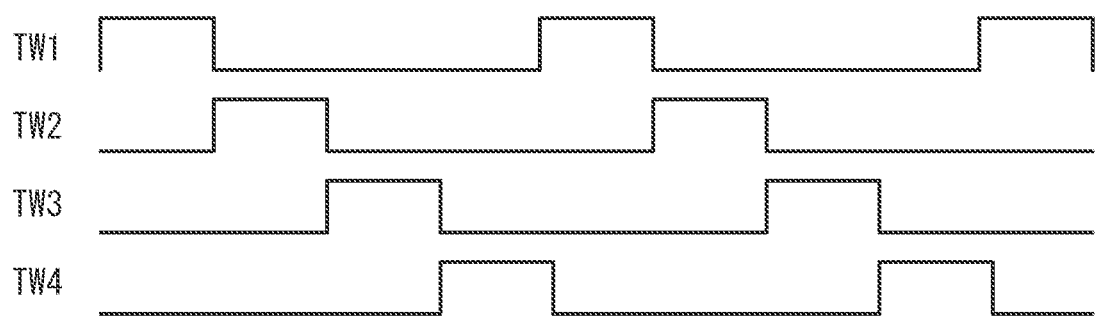
FIG. 26 is a drive-timing chart explaining a conventional operation of an earlier range-measuring element designed by a scheme of the CW modulation, of which the waveforms are illustrated in FIG. 25.

FIGS. 25 and 26 illustrate a conventional driving method of a lock-in pixel of continuous wave (CW) modulation type. As illustrated in FIG. 26, the conventional driving method of CW lock-in pixel also performs the switching, in which the on/off-periods of a plurality of charge-transfer gates are set approximately simultaneous with each other, similarly to the conventional driving method of the lock-in pixel of optical-pulse synchronized architecture. Thus, there is a problem that a precision is reduced because at the timings of the switching, a direction in which charges shall be directed becomes uncertain for a moment, and the charges are sometimes not transferred by the desirable charge-transfer gate.

Figure 27:
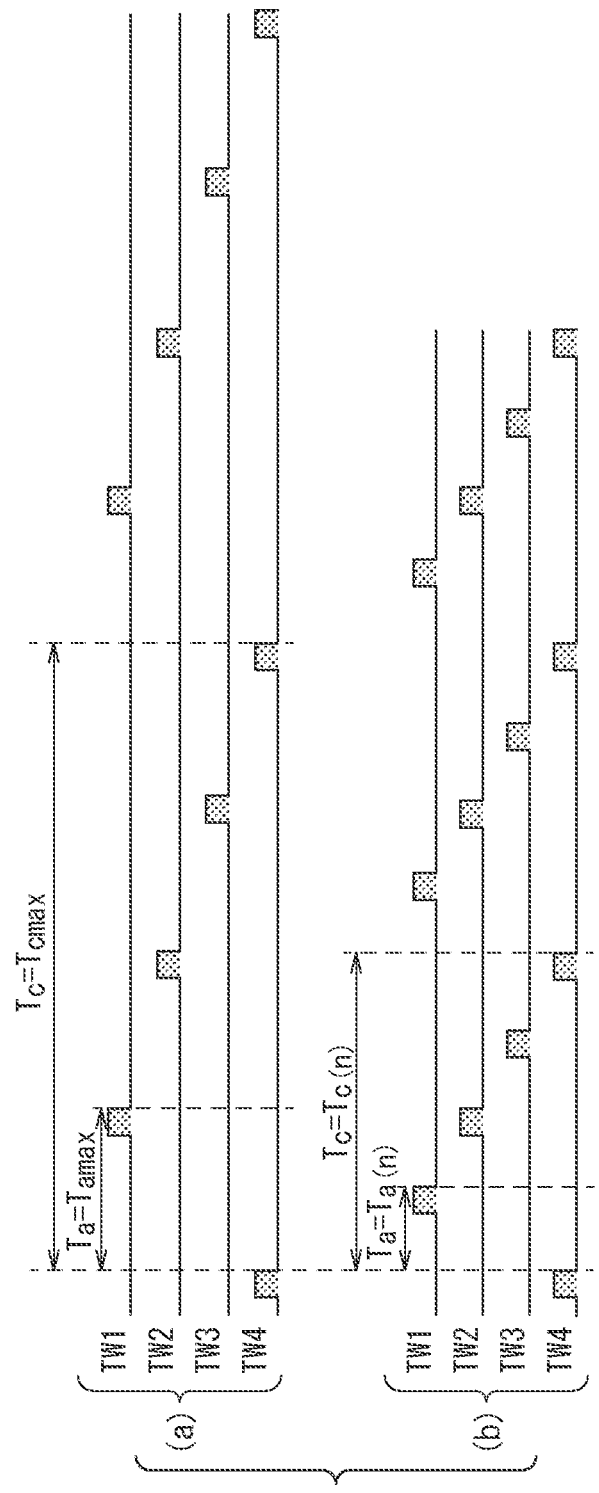
FIG. 27 is a drive-timing chart explaining an adjusting operation of a range-measuring element pertaining to a fifth embodiment of the present invention, the range-measuring element is designed by the scheme of the CW modulation, of which the waveforms are illustrated in FIG. 25.

FIGS. 27 (a) and (b) are drive-timing charts illustrating adjusting operations of a range-measuring device pertaining to a fifth embodiment of the present invention. In order to remove the problem illustrated in FIGS. 25 and 26, as illustrated in FIGS. 27 (a) and (b), it is enough to clearly remove the simultaneous switching of the on/off-periods of four gates, and not to modify the on-periods of the four charge-transfer gates serving as the distributing gates, respectively, even if the repetitive-cycle time $T_c$ determined by on/off of the four gates is increased to, for example, two times or four times longer periods.

By the way, FIGS. 27 (a) and (b) illustrate the charts in which the on-periods of the four charge-transfer gates are not changed even if the repetitive-cycle time $T_c$ is increased to, for example, two times or four times longer periods. However, as mentioned above, the on-period may be gradually made longer, in response to the length of the repetitive-cycle time $T_c$. When the on-period made gradually longer, with regard to the upper limit of the length of the high-level period of each of a first transfer signals TW1, a second transfer signals TW2, a third transfer signals TW3 and a fourth transfer signals TW4, the offset periods $T_{off}$ in between the first transfer signals TW1, the second transfer signals TW2, the transfer signals TW3 and the fourth transfer signals TW4 should be set equal to each other, even if the repetitive-cycle time $T_c$ is changed. Also, in FIGS. 27 (a) and (b), although the high-level periods of the first transfer signals TW1, the second transfer signals TW2, the third transfer signals TW3 and the fourth transfer signals TW4 are set equal to each other, the respective high-level periods may be modified at the respective gates.

Sixth Embodiment

Figure 28:
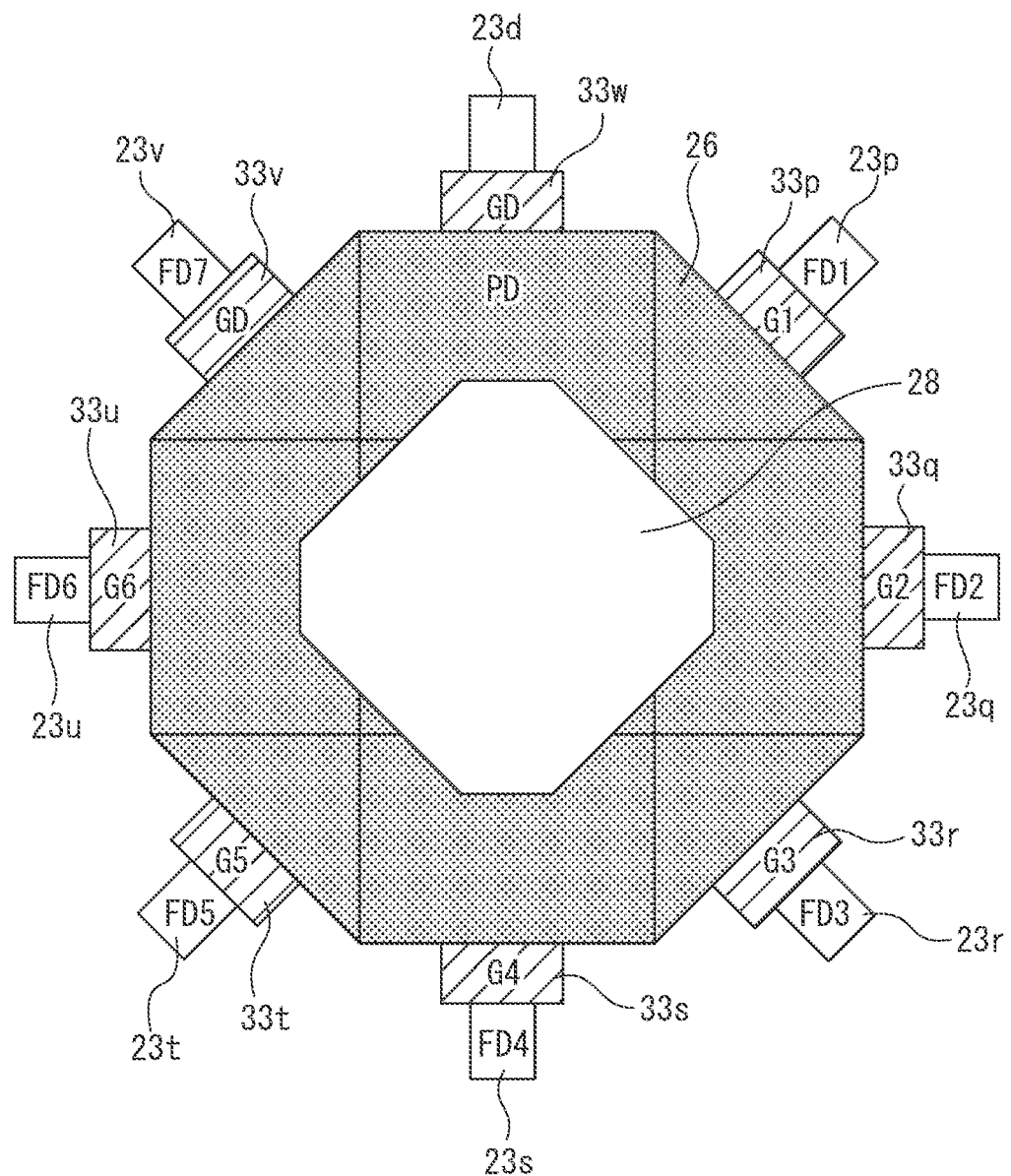
FIG. 28 is a plan view explaining an outline of a structure of a pixel of a ring structure of a range-measuring device pertaining to a sixth embodiment of the present invention.

FIG. 28 is a schematic plan view explaining a structure of a pixel of a range-measuring device pertaining to a sixth embodiment of the present invention. In the range-measuring devices pertaining to the first to fifth embodiments, their explanations are carried out by including the case when the number of the charge-transfer gates serving as the distributing gates is two or three and the case when the exhausting gate is one. The number of the charge-transfer gates and the exhausting gates cannot be made infinite actually and physically, due to the limitations of pixel size and layout and others. But, in principle, the number of the charge-transfer gates and the exhausting gates can be increased infinitely. That is, when "N" is a positive integer (natural number) of two or more, and "M" is a positive integer one or more, it is possible to design a pixel structure that has N charge-transfer gates and M exhausting gates.

In FIG. 28, in respective sides of an outer circumference of a perforated octagonal light-receiving region (photodiode) 26 in which light is shielded by light shielding film whose illustration is omitted, seven MOS charge-transfer gates 33p, 33q, 33r, --- ---, 33v and one MOS exhausting gate 33w are arranged continuously adjacent to each other, respectively. The arrangement on a planar pattern can be regarded as a structure in which charge-accumulation regions 23p, 23q, 23r, --- ---, 23v are arranged on respective radial outer ends of the septuple charge-transfer gates 33p, 33q, 33r, --- ---, 33v serving as the distributing gate, and an exhaust-drain region 23d is arranged in the outer ends of the exhausting gate 33w. Although illustration is omitted, a capacitor and a readout-amplifier of source-follower type are electrically connected through wirings and others to each of the septuple charge-accumulation regions 23p, 23q, 23r, --- ---, 23v.

Figure 29:
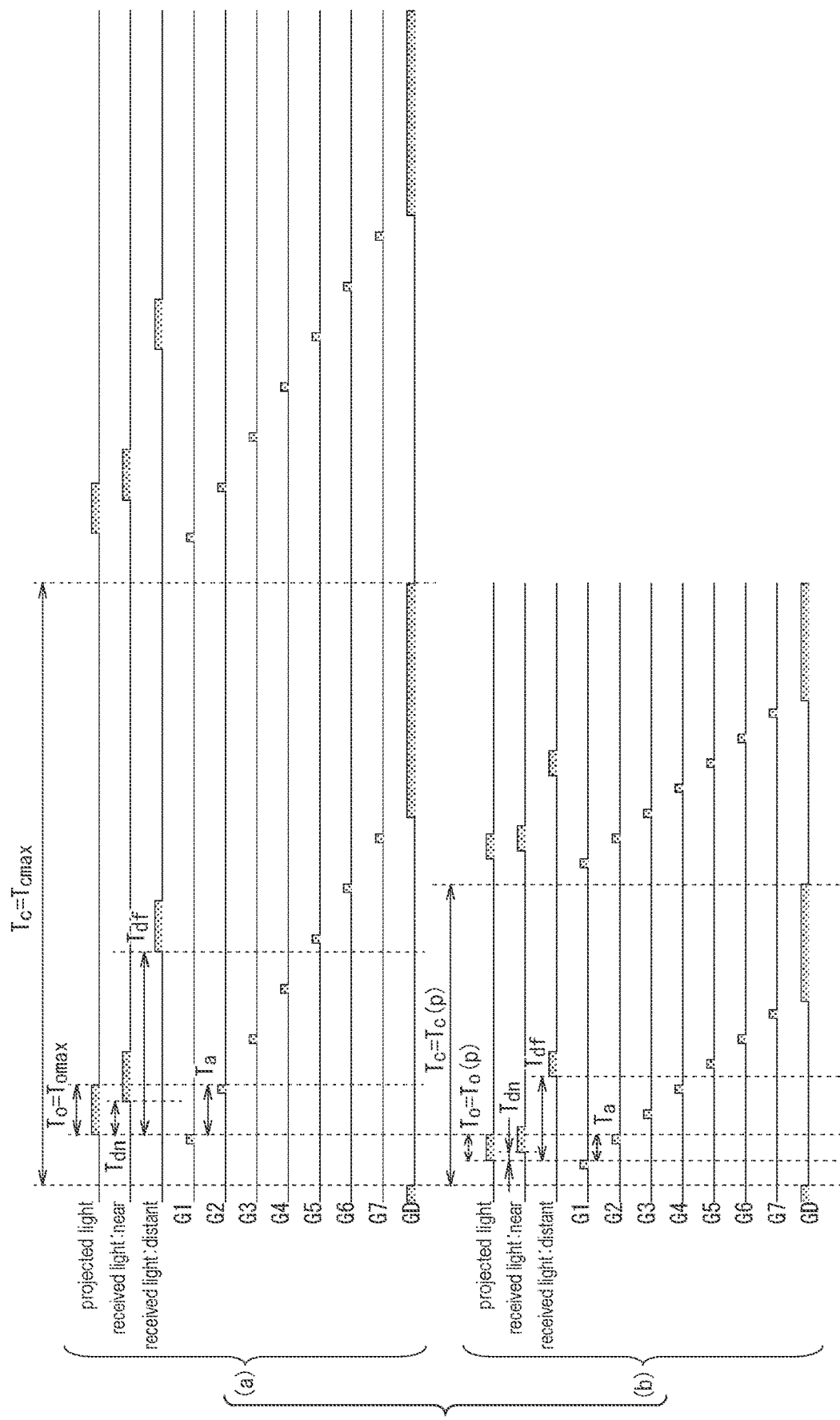
FIG. 29 is a drive-timing chart explaining an operation of adjusting the characteristics of a solid-state imaging device pertaining to the sixth embodiment illustrated in FIG. 28 is adjusted.

FIGS. 29 (a) and (b) are drive-timing charts illustrating operations of the range-measuring device pertaining to the sixth embodiment. FIG. 29 (a) is the drive-timing chart when the repetitive-cycle time $T_c$ is two times longer than the case illustrated in FIG. 29 (b). The technical idea such that the repetitive-cycle time $T_c$ is two times is merely the exemplification. The meaning of "the mere example" is that the repetitive-cycle time $T_c$ can be arbitrarily modified, and the modification is not limited to two times or four times. As mentioned above, even in the case, it is enough that the periods in which the first transfer signals G1, the second transfer signals G2, the third transfer signals G3, --- ---, the seventh transfer signals G7 are at high level may be equal to each other, regardless of the variations in repetitive-cycle time $T_c$. Also, in FIGS. 29 (a) and (b), the high-level periods of the first transfer signals G1, the second transfer signals G2, the third transfer signals G3, --- ---, the seventh transfer signals G7 are equal to each other. However, the above high-level periods may be changed in the first charge-transfer gate 33p, the second charge-transfer gate 33q, the third charge-transfer gate 33r, --- ---, the seventh charge-transfer gate 33v.

The first transfer signals G1, the second transfer signals G2, the third transfer signals G3, --- --- the seventh transfer signals G7 are applied to the septuple charge-transfer gates 33p, 33q, 33r, --- ---, 33v, respectively, in sequence as illustrated in FIGS. 29 (a) and (b). Also, exhausting signals GD are applied to the exhausting gate 33w. Even in a case of a pixel structure of the range-measuring device pertaining to the sixth embodiment illustrated in FIG. 28, as illustrated in the drive-timing charts in FIGS. 29 (a) and (b), it is enough that the simultaneous switching of the on/off-periods of the plurality of first transfer signals G1, second transfer signals G2, third transfer signals G3, --- ---, seventh transfer signals G7 and the gate exhausting signals GD is clearly removed by sandwiching the offset period in between the above two signals adjacent to each other. More concretely, it is enough that the on-periods of the first transfer signals G1, second transfer signals G2, third transfer signals G3, --- ---, seventh transfer signals G7 and gate exhausting signals GD are clearly separated from each other by installing the offset period in between the above octuple signals adjacent to each other.

Under the condition that the signal charges are collected in the perforated light-receiving region, which is surrounded by the septuple charge-transfer gates 33p, 33q, 33r, --- ---, 33v, for example, if the first transfer signals G1 of high level is applied to the first charge-transfer gate 33p, as one of the septuple charge-transfer gates 33p, 33q, 33r, --- ---, 33v, the signal charges are transported in radial direction from the light-receiving region to the first charge-accumulation region 23p disposed outer side of the light-receiving region. Similarly, when the second transfer signals G2 of high level is applied to the second charge-transfer gate 33q, the signal charges are transported in the radial direction from the light-receiving region to the second charge-accumulation region 23q, and when the third transfer signals G3 of high level is applied to the third charge-transfer gate 33r, the signal charges are transported in the radial direction from the light-receiving region to the third charge-accumulation region 23r. And, when the fourth transfer signals G4, the fifth transfer signals G5, the sixth transfer signals G6 and the seventh transfer signals G7 each of which is at high level are applied in sequence to the fourth charge-transfer gate 33s, the fifth charge-transfer gate 33t, the sixth charge-transfer gate 33u and the seventh charge-transfer gate 33v, respectively, the signal charges are transported radially from the light-receiving region to the fourth charge-accumulation region 23s, the fifth charge-accumulation region 23t, the sixth charge-accumulation region 23u and the seventh charge-accumulation region 23v, each of which is located on the outside of the light-receiving region.

The movement of the signal charges causes the potentials of the septuple charge-accumulation regions 23p, 23q, 23r, --- ---, 23v, the potentials of the wirings, which are electrically connected to the septuple charge-accumulation regions 23p, 23q, 23r, --- ---, 23v, respectively, and the potentials of the gate electrodes of the signal-readout transistors (FIG. 4 should be referred) implementing the readout-amplifiers connected to these wirings to be changed. That is, the potentials of first to seventh vertical-output signals-lines whose illustrations are omitted are changed, respectively, by the charges accumulated in the septuple charge-accumulation regions 23p, 23q, 23r, --- ---, 23v.

Similarly to the exemplification in FIG. 1, from a position approximately equal to the range explained in the range-measuring device pertaining to the sixth embodiment, pulsed light is emitted from the light emitter 91 (projected light), and reflected light from the target 92 is received at the respective pixels of the range-measuring device pertaining to the sixth embodiment. As the pulsed light, which is projected from the light emitter 91, for example, light emission diode (LED) or semiconductor LD are used, and the pulsed light of ultra-short pulse width, for example, from nano-second (ns) level to femto-second (fs) level is projected. The lights received by the respective pixels of the range-measuring device pertaining to the sixth embodiment are slightly delayed behind the projected light, depending on the position of the target 92. For example, when the target is relatively close, the received light is delayed by delay time $T_{dn}$, and when the target 92 is relatively distant, the received light is delayed by delay time $T_{df}$.

By synchronizing the light-projection time $T_o$ of the projected light with the on/off voltage pulses to the first charge-transfer gate 33p, the second charge-transfer gate 33q, the third charge-transfer gate 33 r, --- ---, the seventh charge-transfer gate 33v, in a case that the target 92 is relatively close, depending upon the range to the target 92, differences are generated between the output levels corresponding to the respective gates. That is, to a second vertical-output signals-line (whose illustration is omitted) in response to the pulse applied to the second charge-transfer gate 33q, and to a third vertical-output signals-line (whose illustration is omitted) in response to the pulse applied to the third charge-transfer gate 33r, the delays of the received light (delay time $T_{dn}$) are provided. And therefore, depending upon the range to the target 92, differences are generated between the output levels corresponding to the respective gates. Thus, it is possible to calculate the range to the target 92.

Similarly, in a case that the target 92 is relatively distant, to a fifth vertical-output signals-line (whose illustration is omitted) in response to the pulse applied to the fifth charge-transfer gate 33t and to a sixth vertical-output signals-line (whose illustration is omitted) in response to the pulse applied to the sixth charge-transfer gate 33u, on the basis of the delays of the received light (delay time $T_{df}$). Namely, depending on the range to the target 92, because differences are generated between the output levels corresponding to the respective gates, it is possible to calculate the range to the target 92. In this scheme, because the first charge-transfer gate 33p is designed such that the received light is not entered, the output from the first charge-transfer gate 33p will include only signals of charges other than the received light such as noise. That is, the output of signals including only charges other than the signal charges generated by the received light is obtained at an output (whose illustration is omitted) from the first vertical-output signals-line.

That is, it is possible to obtain an output representing the measurement environment. Thus, in the case that the target 92 is relatively close, by subtracting the output of the first vertical-output signals-line from the output of the second vertical-output signals-line and the output of the third vertical-output signals-line, it is possible to obtain the actual signal charges generated by only the received lights, even when the measurement environment is bright. Thus, it is possible to accurately obtain the range to the target 92 in a bright case. In the case that the target 92 is relatively distant, by subtracting the output of the first vertical-output signals-line from the output of the fifth vertical-output signals-line and the output of the sixth vertical-output signals-line, because it is possible to obtain the actual signal charges generated by only the received lights, even when the measurement environment is bright, it is possible to accurately obtain the range to the target 92 in the bright case.

Moreover, the exhausting gate 33w can exhaust the charges, which are collected in the light-receiving region, to the exhaust-drain region 23d, in a period other than the duration of $7T_a$, the duration of $7T_a$ corresponding to an interval when the first charge-transfer gate 33p, the second charge-transfer gate 33q, the third charge-transfer gate 33r, --- ---, the seventh charge-transfer gate 33v are turned on/off for imaging the received light. According to the range-measuring device pertaining to the sixth embodiment, because a rate of the photoelectrons other than the electrons generated by received lights, which are included in the signal charges, can be further decreased, the range to the target 92 can be accurately calculated, even in a brighter environment. As the configuration of the range-measuring device pertaining to the sixth embodiment, by a scheme for increasing the number of the charge-transfer gates, it is possible to improve the resolution of the measured range. That is, under the condition that the charge-accumulation time $T_a$ is set to be the same period, depending on the increased number of the charge-transfer gates, because it is possible to measure longer ranges, and when the same range is tried to be measured, it is possible to improve the resolution of the measured range by the increased number of the charge-transfer gates for the same range.

First Variation of Sixth Embodiment

Figure 30:
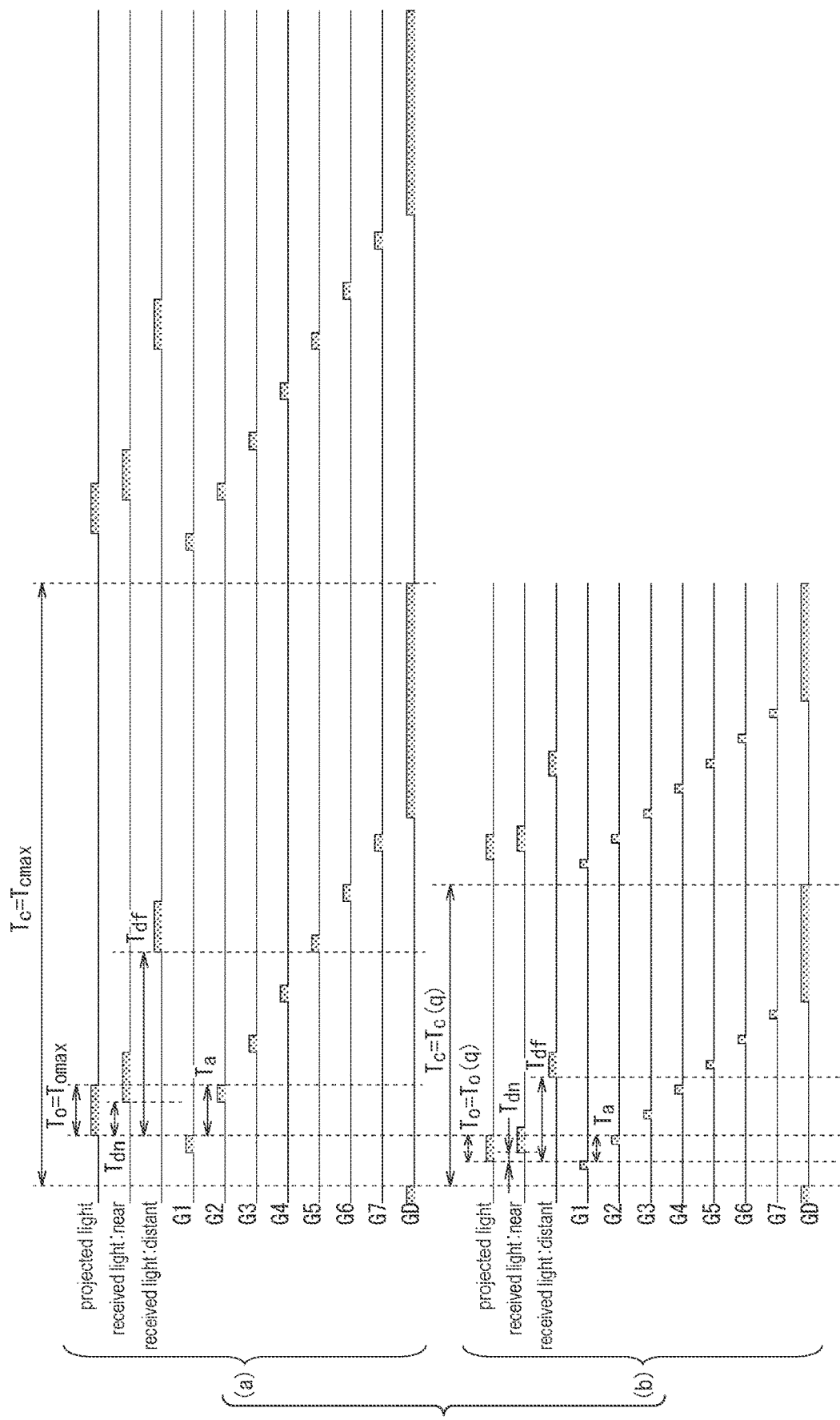
FIG. 30 is a drive-timing chart explaining an operation of adjusting the characteristics of a solid-state imaging device pertaining to a first variation of the sixth embodiment illustrated in FIG. 28 is adjusted.

FIGS. 30 (a) and (b) are drive-timing charts illustrating the operation of a range-measuring device of a first variation of the sixth embodiment of the present invention. FIG. 30 (b) is equal to the drive-timing chart recited in FIG. 29 (b) for explaining the sixth embodiment. FIG. 30 (a) is a drive-timing chart when the repetitive-cycle time $T_c$ is two times longer than the case illustrated in FIG. 30 (b). The technical idea such that the repetitive-cycle time $T_c$ is two times is merely the exemplification. The meaning of "the mere example" is that the repetitive-cycle time $T_c$ can be arbitrarily modified, and the modification is not limited to two times or four times. As already explained in the range-measuring devices pertaining to the second and third embodiments, when the repetitive-cycle time $T_c$ is increased, the on-periods of the first transfer signals G1, the second transfer signals G2, the third transfer signals G3, --- ---, the seventh transfer signals G7 may be made longer. When the repetitive-cycle time $T_c$ is scheduled to be increased, with regard to the upper limit of the duration of the on-period of each of the first transfer signals G1, the second transfer signals G2, the third transfer signals G3, --- ---, the seventh transfer signals G7, even if the repetitive-cycle time $T_c$ is modified, the offset periods $T_a$ in between the first transfer signals G1, the second transfer signals G2, the third transfer signals G3, --- ---, the seventh transfer signals G7 should be set to be equal for each other.

Also, in FIGS. 30 (a) and (b), although the respective on-periods of the first transfer signals G1, the second transfer signals G2, the third transfer signals G3, --- ---, the seventh transfer signals G7 are set equal to each other, the durations of the on-periods of the first transfer signals G1, the second transfer signals G2, the third transfer signals G3, --- ---, the seventh transfer signals G7 may be individually modified to specific values at the respective gates.

Therefore, according to the range-measuring device of the first variation in the sixth embodiment, by increasing the number of the charge-transfer gates serving as the distributing gates, respectively, it is possible to measure longer ranges, depending on the increased number of the charge-transfer gates, when the charge-accumulation times $T_a$ are set to be a same duration. Also, when the same range is tried to be measured, it is possible to improve the resolution of the measured range, depending on the increased number of the charge-transfer gates.

Second Variation of Sixth Embodiment

As to the range measurement suppressing the influence of the measurement environment, as the distributing gates, a triple gate structure embracing double charge-transfer gates, which are successively arranged, and a single charge-transfer gate is enough in principle, by the charge-transfer gate the output of only the measurement environment is obtained. In other words, in a case of triple charge-transfer gate structure, the first (initial) gate or the third (last) gate may be used as the gate for obtaining the output of only the signals of the measurement environment. However, actually, ascribable to a problem that there are the light-emission time-delay of the emitted light and the delays of charge-transport times until the photoelectrons, after the photoelectric conversion of the received light, are accumulated in the light-receiving region, in the case of the triple charge-transfer gate structure, the first (initial) gate should be used as the single gate for obtaining the output of only the signals of the measurement environment. On the other hand, in a case of quadruple or more charge-transfer gates, the single gate for obtaining the output of only the signals of the measurement environment becomes better when the first (initial) gate or the fourth or more (final) gate is used.

Thus, although the illumination of the drive-timing chart is omitted, as the drive-adjustment method of the range-measuring device pertaining to a second variation of the sixth embodiment of the present invention, the projected lights may be emitted synchronously with the first transfer signals G1 applied to the first charge-transfer gate 33a. Consequently, under the same configuration and structure, the number of the charge-transfer gates that can be used for the range measurement can be increased by one. For example, in a case that the target 92 is relatively close, because the outputs of the received lights exist in the first vertical-output signals-line and the second vertical-output signals-line, as mentioned above, by skipping one charge-transfer gate, the fourth vertical-output signals-line may be regarded as the output line of only the signals of the measurement environment is scheduled to be transmitted. Similarly, in a case that the target 92 is relatively distant, because the outputs of the received lights exist in the fourth vertical-output signals-line and the fifth vertical-output signals-line, as mentioned above, by skipping one charge-transfer gate, the seventh vertical-output signals-line may be regarded as the output line of only the signals of the measurement environment is scheduled to be transmitted.

And, in the case that the target 92 is relatively close, by subtracting the output of the fourth vertical-output signals-line from the output of the first vertical-output signals-line and the output of the second vertical-output signals-line, it is possible to obtain the actual signal charges generated by only the received lights, even when the measurement environment is bright. Thus, it is possible to accurately obtain the range to the target 92 in the bright case. In the case that the target 92 is relatively distant, by subtracting the output of the seventh vertical-output signals-line from the outputs of the fourth vertical-output signals-line and fifth vertical-output signals-line, it is possible to obtain the actual signal charges generated by only the received lights, even when the measurement environment is bright. Hence, it is possible to accurately obtain the range to the target 92 in the bright case.

In addition, when a plurality of charge-transfer gates is provided as the distributing gates, various methods in calculating the outputs of the signals of the measurement environment can be used. For example, a method such that, after comparing the outputs of the first to seventh vertical-output signals-lines, simply regarding the smallest output as the output of the signals of the measurement environment can be used. Moreover, the exhausting gate 33w evacuates the charges, which are collected in the light-receiving region, to the exhaust-drain region 23d, in the period other than the duration of $7T_a$, when the first charge-transfer gate 33p, the second charge-transfer gate 33q, the third charge-transfer gate 33r, --- ---, the seventh charge-transfer gate 33v are turned on/off for obtaining the images of the received lights. According to the range-measuring device pertaining to the second variation of the sixth embodiment, because the rate of unrequired photoelectrons other than the signal charges generated by the received lights can be further decreased, the range to the target 92 can be accurately calculated, even in the brighter environment.

Other Embodiments

While the present invention has been described above with reference to the first to sixth embodiments, it should be understood that discussion and Drawings which are incorporated herein are not intended to limit the present invention. Various alternative embodiments, examples, and operational techniques will be apparent to those skilled in the art from the description above. For example, in the above explanations of the first to sixth embodiments of the present invention, the case when the first conductivity type is "p-type" and the second conductivity type is "n-type" is exemplified. However, it will be apparent to those skilled in the art that, by assigning the first conductivity type to the n-type, and the second conductivity type to the p-type, the similar effectiveness can be achieved, if inversely selecting the electrical polarity conductivity type.

In the explanation of the range-measuring device pertaining to the variation of the first embodiment of the present invention, the example has been indicated in which "the distributing gates" of the present invention can be implemented by LEFM, referring to the drawing illustrated in FIG. 9. And, many of the explanations of the range-measuring devices pertaining to the first to sixth embodiments in the present invention exemplify the cases when the distributing gates are the gate electrode structures provided by MOS architecture or MIS architecture. However, the distributing gates and the charge-exhausting electrode are not limited to the gate electrode structures provided by MOS or MIS architecture. For example, LEFM may be used, and in addition, various similar configurations having functions for transporting or transferring the signal charges may be used. In the descriptions of the first to sixth embodiments, the photoelectric-conversion element is explained by using the light-receiving region implementing the p-n junction photodiode. However, the photoelectric-conversion element is not limited to the p-n junction photodiode, and, for example, a configuration may be used which has a structure of so-called "photo-gate (PG)", which has a MOS structure for a photoelectric-conversion element. In the structure of PG, a transparent electrode is used as a gate electrode of the MOS architecture. In addition, a various configuration having the similar photoelectric conversion function explained above may be used.

In this way, it is obvious that the present invention includes various embodiments and the like that are not detailed above. Thus, the technical scope of the present invention is determined only by the technical features specifying the invention prescribed by following Claims, reasonable from the above explanations.

INDUSTRIAL APPLICABILITY

The range-measuring devices pertaining to the first to sixth embodiments in the present invention can be used as the 3D imaging device in a technical field of a camera, which is, for example, exemplarily illustrated in FIG. 31. As exemplarily illustrated in FIG. 31, a camera such as a video camera that has the applicability of a technical field of the present invention may include a single imaging-optical tool (43, 44), a 3D imaging device 45a, which obtains an image of the target 92 (FIG. 1 should be referred) entered along an optical axis of the imaging-optical tool (43, 44) and implements the main portion of the range-measuring device pertaining to each of the first to sixth embodiments, and a range sensor (range-measuring element) 55, which is adapted for autofocus (AF), using the range-measuring device pertaining to each of the first to sixth embodiments.

The camera having an industrial applicability of the present invention may include an A/D converter 47 for converting an image data, which is transmitted from the 3D imaging device 45a implementing the main portion of the range-measuring device pertaining to each of the first to sixth embodiments, into a digital data, a memory (semiconductor storage) 48 for storing the image data which is converted into the digital data by the A/D converter 47, a control-unit 53 for receiving the image data from the storage-unit 48, and an image processor 54 for receiving the image data through the control-unit 53 and processing the image data. And, the 3D imaging device 45a and an adjusting-data memory $99_{ext}$ for storing an adjustment data of the range sensor (range-measuring element) 55 are connected to the image processor 54 so that it is possible to perform the adjustment-and-setting operations in accordance with the flowchart exemplified in FIG. 19. By the way, FIG. 31 is merely the exemplification. Thus, any other structure may be used in which the 3D imaging device 45a or the range sensor (range-measuring element) 55 are arranged on the semiconductor chip, the adjusting-data memory 99 for storing the adjustment data transmitted from the control-unit 53 is connected, similarly to the structure illustrated in FIG. 15, and the adjustment data is transmitted to a driver on the semiconductor chip. The camera having the possibility of using the present invention can further include a drive-circuit 52 connected to the control-unit 53, a memory-card interface 59 such as a media controller or the like, an operation unit 58, an LCD driver 56, motor drivers S1b, 51c and 51d, and a strobe controller 61. A display 57 composed of LCD is connected to the LCD driver 56, and a strobe 62 is connected to the strobe controller 61. The strobe 62 can serve as the light emitter 91 illustrated in FIGS. 1 and 15.

The control-unit 53 of the camera exemplified in FIG. 31 delivers various instructions and various electric signals for controlling the respective operations and processes of the image processor 54, the drive-circuit 52, the storage-unit 48, the memory-card interface 59, the operation unit 58, the LCD driver 56, the range sensor (range-measuring element) 55, the motor drivers S1b, S1c and 51d and the strobe controller, which are connected to the control-unit 53. Although the illustration is omitted, various logical circuits such as a white balance (WB) adjustment-instruction output-circuit for performing an auto white balance (AWB) adjustment are assembled as logical hardware resources in the control-unit 53. Furthermore, various instruction output-circuits for instructing the operations of each of the image processor 54, the drive-circuit 52, the storage-unit 48, the memory-card interface 59, the operation unit 58, the LCD driver 56, the range sensor (range-measuring element) 55, the motor drivers S1b, S1c and 51d and the strobe controller are also assembled as the logical hardware resources in the control-unit 53.

As illustrated in FIG. 31, an imaging lens 43 implementing the imaging-optical tool (43, 44) can include, for example, a main lens 43a, a zoom lens 43b adjacent to the main lens 43a, a focus lens 43c adjacent to the zoom lens 43b and others. In the structure exemplified in FIG. 31, a zoom motor 49b is connected to the zoom lens 43b, and a focus motor 49c is connected to the focus lens 43c. A throttling device 44 implementing the imaging-optical tool (43, 44) is arranged between the focus lens 43c and the 3D imaging device 45a. For example, to the throttling device 44 composed of five throttling vanes, an iris motor 50 for driving the throttling vanes is connected. The zoom motor 49b, the focus motor 49c and the iris motor 50 are composed of stepping motors and operationally controlled by drive pulses transmitted from the motor drivers S1b, S1c and 51d connected to the control-unit 53. Then, an imaging preparation process is carried out by signals from the operation unit 58 such as a release button and the like.

The zoom motor 49b moves the zoom lens 43b to a wide side or tele side, for example, at 43 stages and zooms the imaging lens 43. The focus motor 49c moves the focus lens 43c in response to a distance from the target 92 or a variable power of the zoom lens 43b, and adjusts a focus of the imaging lens 43 so that the imaging condition of the camera becomes optimal. The iris motor 50 changes an open area of the throttling device 44 by operating the throttling vanes of the throttling device 44, and adjusts the exposure of the imaging lens 43, for example, at five steps from F2.8 to F43 in 1AV increments.

The imaging lens 43 is not limited to the configuration exemplified in FIG. 31. For example, the imaging lens 43 may be an interchangeable lens that can be attached to and detached from the camera. Since the imaging lens 43 is implemented by a plurality of optical lens groups, such as the main lens 43a, the zoom lens 43b, the focus lens 43c and others, the image of luminous flux from the target 92 is focused on the surface in the 3D imaging device 45a arranged at the vicinity of the focal plane of the luminous flux.

The 3D imaging device 45a implementing the main portion of the range-measuring device of each of the first to sixth embodiments is assembled on a chip-mounting substrate (package substrate) 46. A timing generator (TG) 51 is connected to the 3D imaging device 45a. The timing generator 51 is connected through the drive-circuit 52 to the control-unit 53. A signals transmitted through the drive-circuit 52 from the control-unit 53 causes the timing generator 51 to generate a timing signals (clock pulse), and the timing signals is sent through the chip-mounting substrate 46 to the pixel on each row, as a signals for an electronic shutter from a driver arranged in a peripheral circuit, which is merged in a semiconductor chip implementing the 3D imaging device 45a.

That is, the control-unit 53 controls the timing generator 51 through the drive-circuit 52, and controls a shuttering speed of the electronic shutter in the 3D imaging device 45a. By the way, the timing generator 51 may be monolithically integrated as a peripheral circuit on the semiconductor chip implementing the 3D imaging device 45a.

Imaging signals transmitted from the pixel-array area at the center of the semiconductor chip implementing the 3D imaging device 45a are entered to correlated double sampling circuits (CDSs) formed in a peripheral circuit of the semiconductor chip. Then, the imaging signals are transmitted from the 3D imaging device 45a as the image data of R, G and B that accurately corresponds to the accumulated charge amounts of each pixel in the 3D imaging device 45a. The image data transmitted from the 3D imaging device 45a is amplified by an amplifier whose illustration is omitted, and converted into a digital data by the A/D converter 47. The 3D imaging device 45a converts an image of the target 92, which is timing-controlled by the drive-circuit 52 and imaged on a light-receiving plane in the 3D imaging device 45a. Then, the image of the target 92 is converted to image signals, and the image signals are transmitted to the A/D converter 47.

Although illustration is omitted, the image processor 54 of the camera exemplified in FIG. 31 can include a WB control-amount calculator for calculating a WB control-amount that is used for white balance adjustment, a logical calculator for automatic exposure (AE) detection, which integrates the green (G) signals of the entire screen or integrates the G signals in which different weight settings are performed on the center and periphery of the screen and transmits its integrated value. The image processor 54 can further include an exposure value Ev calculator for calculating a brightness (exposure value Ev) of the target 92 necessary for the (AE) from the integration value delivered by the logical calculator for AE detection, and various logical circuits (hardware, module) for performing various image processing and calculations associated with the various image processing, on the image data, such as a gradation conversion processor, a white balance compensation processor and a gamma compensation processor, as hardware resources on logical configuration.

The image processor 54 pertaining to the first embodiment can be organized if there is an image-processing engine and the like. Also, when a calculation load is high for feature amount extractions and identifying processes of the specific features, the image processor 54 may be assembled in any of hardware resources. For example, it is possible to implement the image processor 54 in a computer system by using MPUs assembled as microchips. Also, as the image processor 54 implementing the computer system, it can use DSP specialized for signal processing in which an arithmetic calculation function is strengthened, or to use a microcomputer whose purpose is to control an installed device by including memory and a peripheral circuit. Or, the main CPU of a current general-purposed computer may be used in the image processor 54. Moreover, the partial configuration or entire configuration of the image processor 54 may be implemented by PLD such as FPGA.

What is claimed is:

1. A range-measuring device comprising:
a light emitter for projecting a pulsed light to a target;
a light-receiving region for receiving a reflected light of the pulsed light from the target;
a plurality of charge-accumulation regions arranged around the light-receiving region;
a plurality of distributing gates for transferring to distribute signal charges in sequence to the plurality of charge-accumulation regions, the signal charges are photo-electrically converted in the light-receiving region;
a driver for transmitting control signals to the light emitter and for transmitting transfer signals in sequence to each of the plurality of distributing gates, the transfer signals transmitted to different distributing gates are provided at different timings, providing offset periods in between on-periods of the transfer signals transmitted to the different distributing gates;
a readout-amplifier for independently reading out each of the signal charges accumulated in the plurality of charge-accumulation regions;
a range calculator configured to calculate ranges to the target, by entering the signals transmitted from the readout-amplifier; and
a control processor configured to generate control signals for controlling operations of the driver from calculated result delivered from the range calculator, and to transmit the control signals to the driver,
wherein the control processor has:
a set-value judging-circuit configured to judge whether a drive-condition of the driver is correct, by comparing the calculated result delivered from the range calculator with a threshold, and
a time-setting logical-circuit configured to set maximum values of light-projection time, repetitive-cycle time of the pulsed light, and on-periods of the transfer signals, respectively, and to reduce the light-projection time and the on-periods from the corresponding maximum values independently from each other, the repetitive-cycle time changes synchronously with the light-projection time, using judged result of the set-value judging-circuit.

2. A range-measuring device comprising:
a light emitter for projecting a pulsed light to a target;
a light-receiving region for receiving a reflected light of the pulsed light from the target;
a plurality of charge-accumulation regions arranged around the light-receiving region;
a plurality of distributing gates for transferring to distribute signal charges in sequence to the plurality of charge-accumulation regions, the signal charges are photo-electrically converted in the light-receiving region;
a driver for transmitting control signals to the light emitter and for transmitting transfer signals in sequence to each of the plurality of distributing gates, the transfer signals transmitted to different distributing gates are provided at different timings, providing offset periods in between on-periods of the transfer signals transmitted to the different distributing gates;
a readout-amplifier for independently reading out each of the signal charges accumulated in the plurality of charge-accumulation regions;
a range calculator configured to calculate ranges to the target, by entering the signals transmitted from the readout-amplifier; and
a control processor configured to generate control signals for controlling operations of the driver from calculated result delivered from the range calculator, and to transmit the control signals to the driver,
wherein the control processor has:
a set-value judging-circuit configured to judge whether a drive-condition of the driver is correct, by comparing the calculated result delivered from the range calculator with a threshold, and
a time-setting logical-circuit configured to keep the on-periods of the transfer signals constant, when modifying the light-projection time and the repetitive-cycle time, the repetitive-cycle time changes synchronously with the light-projection time, using judged result of the set-value judging-circuit.

3. A camera comprising:
an imaging-optical tool;
a light emitter for projecting a pulsed light to a target;
a solid-state imaging device including:
a light-receiving region for receiving a reflected light of the pulsed light from the target through the imaging-optical tool,
a plurality of charge-accumulation regions arranged around the light-receiving region,
a plurality of distributing gates for transferring to distribute signal charges in sequence to the plurality of charge-accumulation regions, the signal charges are photo-electrically converted in the light-receiving region,
a driver for transmitting control signals to the light emitter and for transmitting transfer signals in sequence to each of the plurality of distributing gates, the transfer signals transmitted to different distributing gates are provided at different timings, providing offset periods in between on-periods of the transfer signals transmitted to the different distributing gates, and
a readout-amplifier for independently reading out each of the signal charges accumulated in the plurality of charge-accumulation regions, and a control-unit including:
- a range calculator configured to calculate ranges to the target, by controlling the imaging-optical tool, and by entering the signals transmitted from the readout-amplifier, and
- a control processor configured to generate control signals for controlling operations of the driver from a calculated result delivered from the range calculator, and to transmit the control signals to the driver, wherein the control processor has
- a set-value judging-circuit configured to judge whether a drive-condition of the driver is correct, by comparing the calculated result delivered from the range calculator with a threshold, and,
- a time-setting logical-circuit configured to set maximum values of light-projection time, repetitive-cycle time of the pulsed light and on-periods of the transfer signals, respectively, and to reduce the light-projection time and the on-periods from the corresponding maximum values independently from each other, the repetitive-cycle time changes synchronously with the light-projection time, using judged result of the set-value judging-circuit.

4. A test-and-adjusting apparatus for testing and adjusting a solid-state imaging device including a light-receiving region, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to a light emitter and transmitting transfer signals in sequence to each of the plurality of distributing gates, the transfer signals transmitted to different distributing gates are provided at different timings, providing offset periods in between on-periods of the transfer signals transmitted to the different distributing gates, and a plurality of readout-amplifiers for independently reading out each of the signal charges accumulated in the plurality of charge-accumulation regions, respectively, the test-and-adjusting apparatus comprising:
- the light emitter driven by the driver, configured to project a pulsed light to a target for entering a reflected light of the pulsed light from the target to the light-receiving region;
- an output-difference calculator configured to calculate a difference between outputs delivered respectively from the readout-amplifiers;
- an output-difference judging-circuit configured to compare a calculated result of the output difference with a threshold and to judge whether the calculated result is correct, and
- a time-setting logical-circuit configured to modify the on-periods of transfer signals to be applied to a particular distributing gate among the plurality of distributing gates, from judged result of the output-difference judging-circuit, and to transmit control signals to the driver, so that the driver can deliver the modified transfer signals.

5. A drive-adjusting method of a range-measuring device including a light emitter for projecting a pulsed light to a target, a light-receiving region for receiving a reflected light of the pulsed light from the target, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to a light emitter and transmitting transfer signals in sequence to each of the plurality of distributing gates, the transfer signals transmitted to different distributing gates are provided at different timings, providing offset periods in between on-periods of the transfer signals transmitted to the different distributing gates, a readout-amplifier for independently reading out each of the signal charges accumulated in the plurality of charge-accumulation regions, and a range calculator for entering the control signals transmitted from the readout-amplifier and calculating ranges to the target, the drive-adjusting method including:
- comparing a calculated result delivered from the range calculator with a threshold, and judging whether a drive-condition of the driver is correct, and
- setting maximum values of a light-projection time, a repetitive-cycle time of the pulsed light and the on-periods of the transfer signals, respectively, and reducing the light-projection time and the on-periods from the corresponding maximum values independently from each other, the repetitive-cycle time changes synchronously with the light-projection time, using a judging result of a set-value judging-circuit.

6. A drive-adjusting method a range-measuring device including a light emitter for projecting a pulsed light to a target, a light-receiving region for receiving a reflected light of the pulsed light from the target, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to the light emitter and transmitting transfer signals in sequence to each of the plurality of distributing gates, the transfer signals transmitted to different distributing gates are provided at different timings, providing offset periods in between on-periods of the transfer signals transmitted to the different distributing gates, a readout-amplifier for independently reading out each of the signal charges accumulated in the plurality of charge-accumulation regions, and a range calculator for entering the signals transmitted from the readout-amplifier and calculating ranges to the target, the drive-adjusting method including:
- comparing a calculated result delivered from the range calculator with a threshold, and judging whether a drive-condition of the driver is correct, and
- keeping the on-periods of the transfer signals constant when the light-projection time and the repetitive-cycle time are changed, the repetitive-cycle time changes synchronously with the light-projection time.

7. A test-and-adjustment method for testing and adjusting a solid-state imaging device including a light-receiving region, a plurality of charge-accumulation regions arranged around the light-receiving region, a plurality of distributing gates for transferring to distribute signal charges in sequence to the plurality of charge-accumulation regions, the signal charges are photo-electrically converted in the light-receiving region, a driver for transmitting control signals to a light emitter and transmitting transfer signals in sequence to each of the plurality of distributing gates, the transfer signals transmitted to different distributing gates are provided at different timings, providing offset periods in between on-periods of the transfer signals transmitted to the different distributing gates, and a plurality of readout-amplifiers for independently reading out each of the signal charges accumulated in the plurality of charge-accumulation regions, respectively, the test-and-adjusting method including:

projecting a pulsed light to a target, and driving the driver so that a reflected light of the pulsed light from the target is entered to the light-receiving region;

calculating a difference between outputs delivered respectively from the readout-amplifiers;

comparing a calculated result of the output difference with a threshold and judging whether the calculated result is correct, and modifying the on-periods of transfer signals to be applied to a particular distributing gate among the plurality of distributing gates, from the judged result, and transmitting control signals to the driver so that the modified transfer signals can be delivered.

* * * * *